(12) United States Patent
Karp et al.

(10) Patent No.: US 12,473,537 B2
(45) Date of Patent: Nov. 18, 2025

(54) THREE-DIMENSIONAL CELL CULTURE, DEVICES, AND USE THEREOF

(71) Applicants: THE BROAD INSTITUTE, INC., Cambridge, MA (US); THE BRIGHAM AND WOMEN'S HOSPITAL, INC., Boston, MA (US)

(72) Inventors: Jeffrey Karp, Boston, MA (US); Amit Choudhary, Boston, MA (US); Kisuk Yang, Boston, MA (US); Miseon Lee, Cambridge, MA (US); Peter Jones, Cambridge, MA (US)

(73) Assignees: THE BROAD INSTITUTE, INC., Cambridge, MA (US); THE BRIGHAM AND WOMEN'S HOSPITAL, INC., Boston, MA (US)

(*) Notice: Subject to any disclaimer, the term of this patent is extended or adjusted under 35 U.S.C. 154(b) by 199 days.

(21) Appl. No.: 17/349,646

(22) Filed: Jun. 16, 2021

(65) Prior Publication Data

US 2022/0010282 A1 Jan. 13, 2022

Related U.S. Application Data

(60) Provisional application No. 63/039,863, filed on Jun. 16, 2020.

(51) Int. Cl.
*C12N 5/071* (2010.01)
*C12M 1/04* (2006.01)
(Continued)

(52) U.S. Cl.
CPC ........... *C12N 5/0677* (2013.01); *C12M 23/12* (2013.01); *C12M 23/24* (2013.01); *C12M 23/48* (2013.01);
(Continued)

(58) Field of Classification Search
CPC .............. C12N 5/0677; C12N 2513/00; C12N 2533/30; C12N 2533/52; C12N 2533/54;
(Continued)

(56) References Cited

U.S. PATENT DOCUMENTS 5,468,638 A * 11/1995 Barker .................. C12M 25/04
435/297.1
5,776,748 A * 7/1998 Singhvi .................. C12N 5/067
435/395
(Continued)

FOREIGN PATENT DOCUMENTS

WO 2014/201167 A1 12/2014
WO 2015/002724 A2 1/2015
(Continued)

OTHER PUBLICATIONS

Stützer et al., The pancreatic beta cell surface proteome, Diabetologia (2012) 55:1877-1889 (Year: 2012).*
(Continued)

*Primary Examiner* — Holly Kipouros
(74) *Attorney, Agent, or Firm* — Johnson, Marcou, Isaacs & Nix, LLC; F. Brent Nix, Esq.

(57) ABSTRACT

3D cell cultures and devices for 3D cell culture, and methods of use thereof are provided. In some embodiments, the 3D cell culture comprise pancreatic β cells and can be generated in multi-well plates, allowing for high throughput assays on the cell culture.

33 Claims, 24 Drawing Sheets

(51) Int. Cl.
    C12M 1/12      (2006.01)
    C12M 1/32      (2006.01)
    C12M 3/00      (2006.01)
(52) U.S. Cl.
    CPC ......... C12M 25/04 (2013.01); *C12N 2513/00* (2013.01); *C12N 2533/30* (2013.01); *C12N 2533/52* (2013.01); *C12N 2533/54* (2013.01); *C12N 2533/90* (2013.01)
(58) Field of Classification Search
    CPC ... C12N 2533/90; C12M 23/24; C12M 23/48; C12M 25/04
    USPC ........................................................ 435/303.2
    See application file for complete search history.

(56) References Cited

U.S. PATENT DOCUMENTS

| | | | | |
|---|---|---|---|---|
| 9,828,576 | B2* | 11/2017 | Viasnoff | C12M 25/02 |
| 2010/0056390 | A1* | 3/2010 | Fischbach | C40B 60/08 |
| | | | | 506/10 |
| 2012/0009590 | A1* | 1/2012 | Rand | C12N 15/87 |
| | | | | 435/7.1 |
| 2014/0099717 | A1* | 4/2014 | Fraker | C12M 23/20 |
| | | | | 435/297.5 |
| 2018/0153941 | A1 | 6/2018 | Melton et al. | |
| 2019/0002834 | A1* | 1/2019 | Tanabe | C12N 5/0696 |
| 2019/0169575 | A1* | 6/2019 | Peterson | A61P 3/10 |
| 2019/0185801 | A1* | 6/2019 | Frank | C12M 23/12 |
| 2020/0384115 | A1* | 12/2020 | Choudhary | C07K 14/7051 |
| 2022/0372419 | A1* | 11/2022 | Hori | C12M 21/08 |

FOREIGN PATENT DOCUMENTS

| | | | | |
|---|---|---|---|---|
| WO | WO-2016069892 | A1 * | 5/2016 | ............ C12M 1/268 |
| WO | 2018/195486 | A1 | 10/2018 | |

OTHER PUBLICATIONS

Gerbin et al., Enhanced Electrical Integration of Engineered Human Myocardium via Intramyocardial versus Epicardial Delivery in Infarcted Rat Hearts, PLoS One 10(7) 2015 (Year: 2015).*

Amin, et al., "A Simple, Reliable Method for High-Throughput Screening for Diabetes Drugs Using 3D β-Cell Spheroids", Journal of Pharmacology Toxicology Methods, vol. 82, 2016, 83-89.

Blencowe, et al., "Self-Immolative Base-Mediated Conjugate Release from Triazolylmethylcarbamates", Organic Biomolecular Chemistry, 2015, vol. 13, Jul. 9, 5 pages.

Carpenter, et al., "Techniques for Measuring Cellular Zinc", Archives of Biochemistry Biophysics, vol. 611, 2016, 10 pages.

Chang, et al., "Multilayer Architecture Microfluidic Network Array for Combinatorial Drug Testing on 3D-Cultured Cells", Biofabrication, vol. 11, No. 3, Jun. 4, 2019, 13 pages.

Dewit, et al., "A Cascade Biodegradable Polymer Based on Alternating Cyclization and Elimination Reactions", Journal of the American Chemical Society, vol. 131, No. 51, Dec. 30, 2009, 18327-18334.

Friedrich, et al., "Spheroid-Based Drug Screen: Considerations and Practical Approach", Nature Protocols, vol. 4. No. 3, 2009, 309-324.

Jin, et al., "Vascularized Liver Organoids Generated Using Induced Hepatic Tissue and Dynamic Liver-Specific Microenvironment as a Drug Testing Platform", Advanced Functional Materials, vol. 1801954, 2018, 15 pages.

Kim, et al., "3D Cell Printing of Islet-Laden Pancreatic Tissue-Derived Extracellular Matrix Bioink Constructs for Enhancing Pancreatic Functions", Journal of Materials Chemistry B, Jan. 5, 2019, 9 pages.

Li, et al., "Development of In Vitro 3D TissueFlex® Islet Model for Diabetic Drug Efficacy Testing", PLoS One, vol. 8, No. 8, Aug. 2013, 10 pages.

Li, et al., "Zinc and Insulin in Pancreatic Beta-Cells", Endocrine, vol. 45, No. 2, Mar. 2014, 178-189.

Sheng, Wei, "Self-Immolative Chemistry: Structural Features and Applications in Designing Smart Materials", S.T.J. Journal of the American Chemical Society, vol. 132, 2010, 43 pages.

Stendahl, et al., "Extracellular Matrix in Pancreatic Islets: Relevance to Scaffold Design and Transplantation", Cell Transplant, vol. 18, 2009, 1-12.

Velazco-Cruz, et al., "Advances Toward Engineering Functionally Mature Human Pluripotent Stem Cell-Derived B Cells", Frontiers Bioengineering Biotechnology, vol. 8, No. 786, Jul. 2020, 7 pages.

Wang, et al., "Induction of human pancreatic beta cell replication by inhibitors of dual specificity tyrosine regulated kinase", Nature Medicine, vol. 21, No. 4, Apr. 2015, 383-388.

* cited by examiner

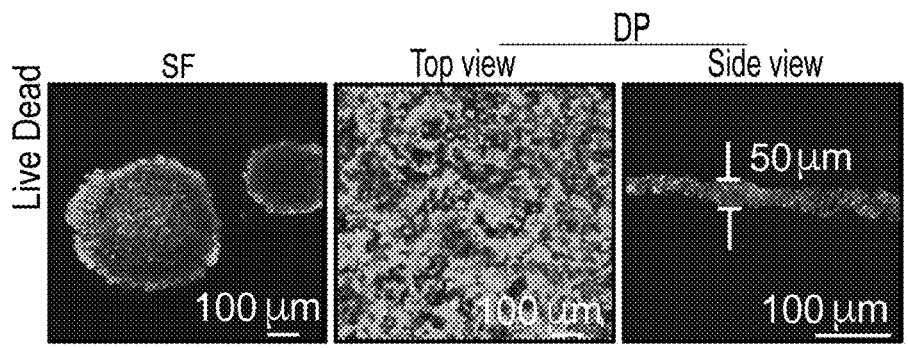
FIG. 3F
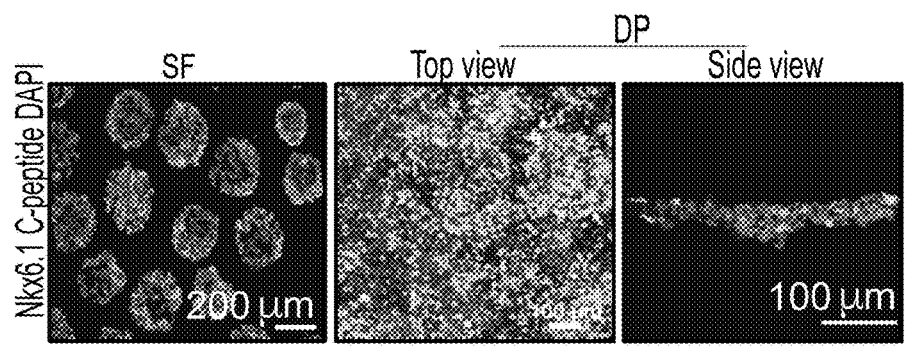
FIG. 3H
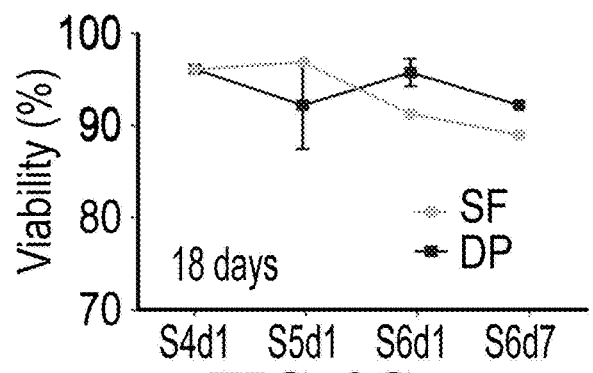
FIG. 3G
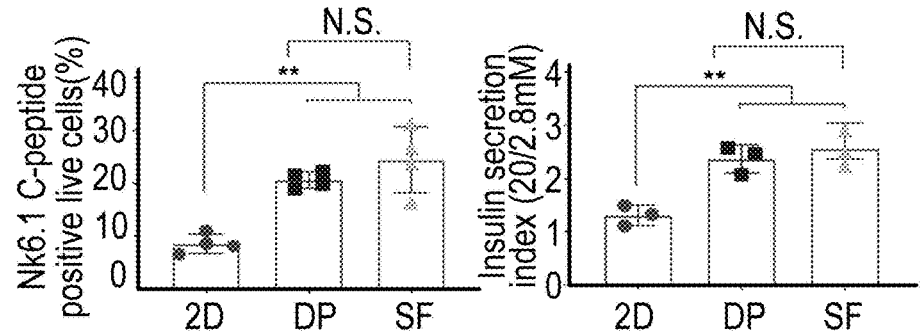
FIG. 3I  FIG. 3J

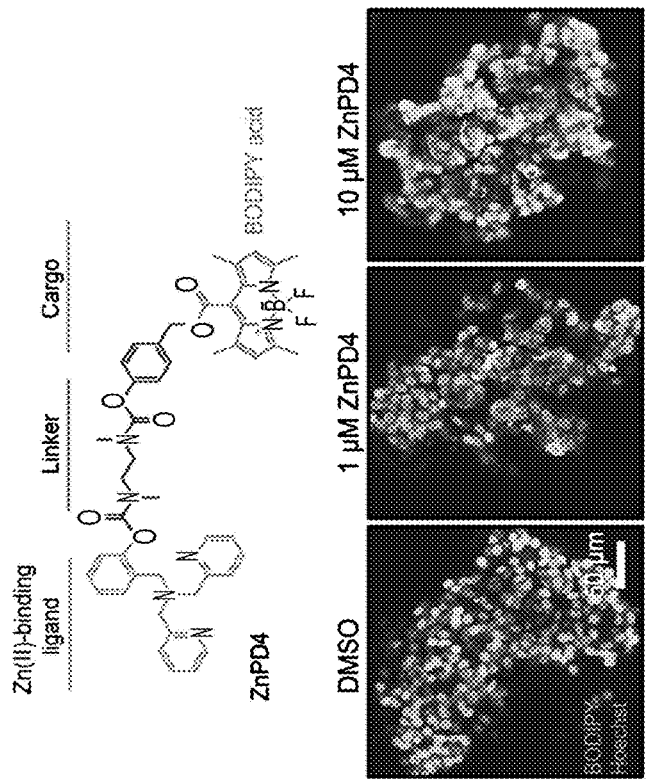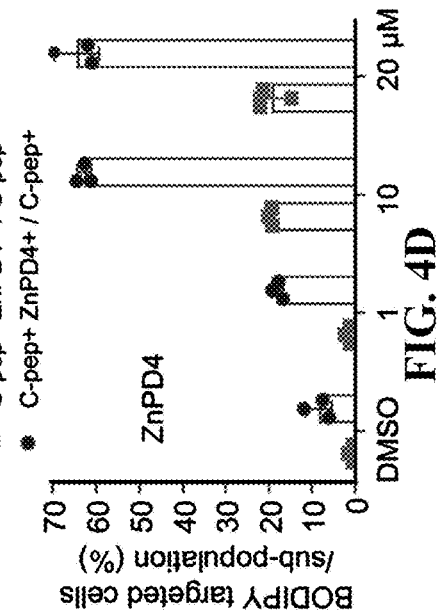
FIG. 4A
FIG. 4B
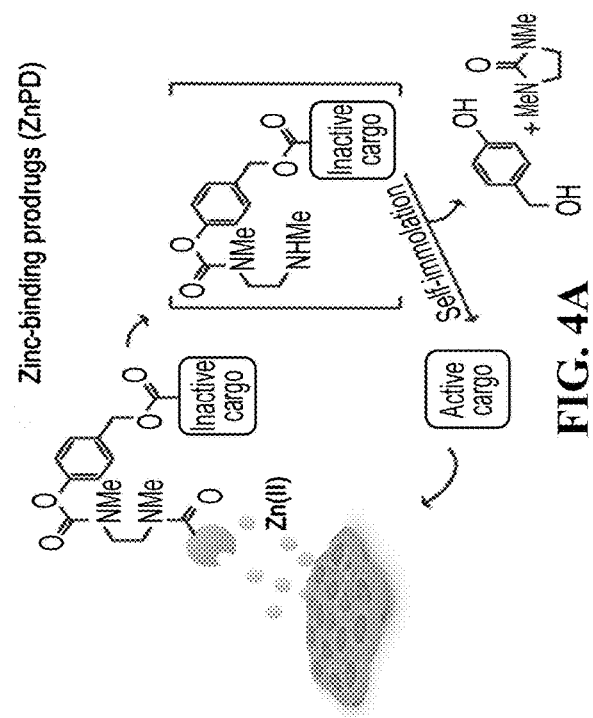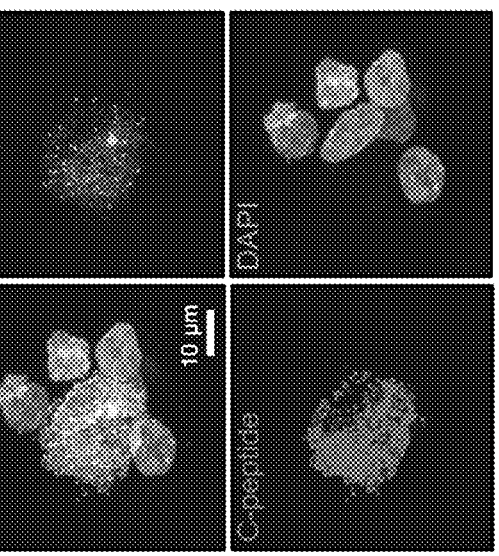
FIG. 4C
FIG. 4D

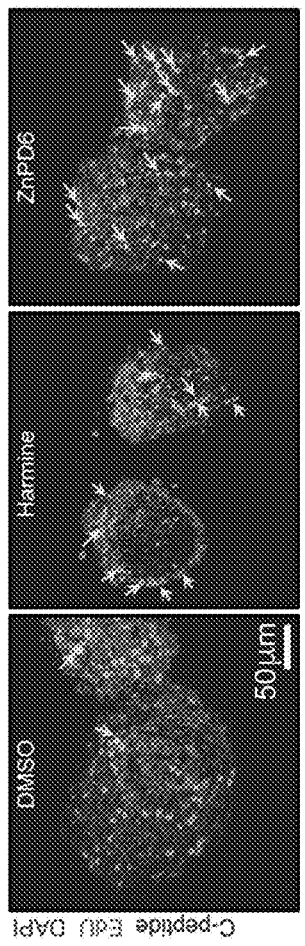
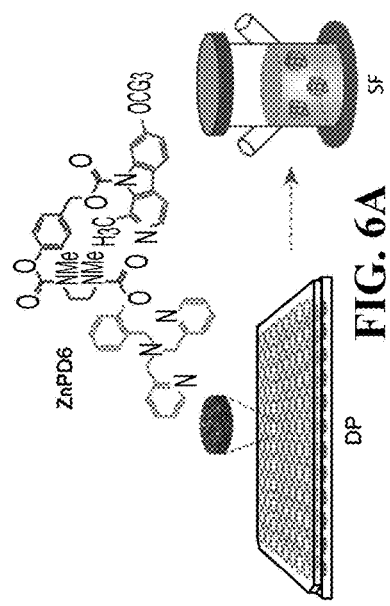
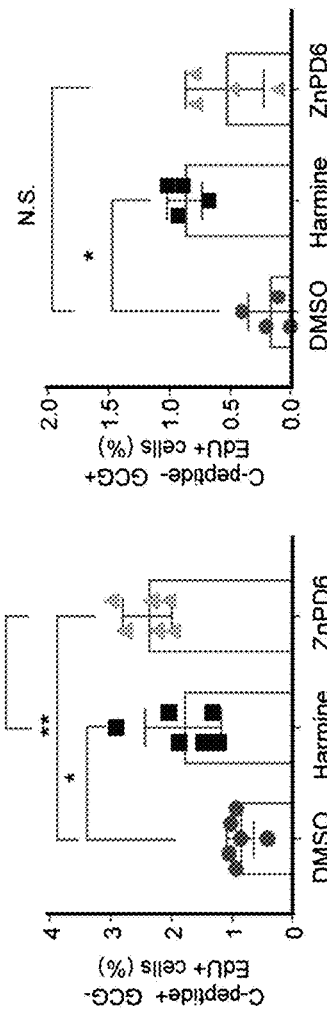
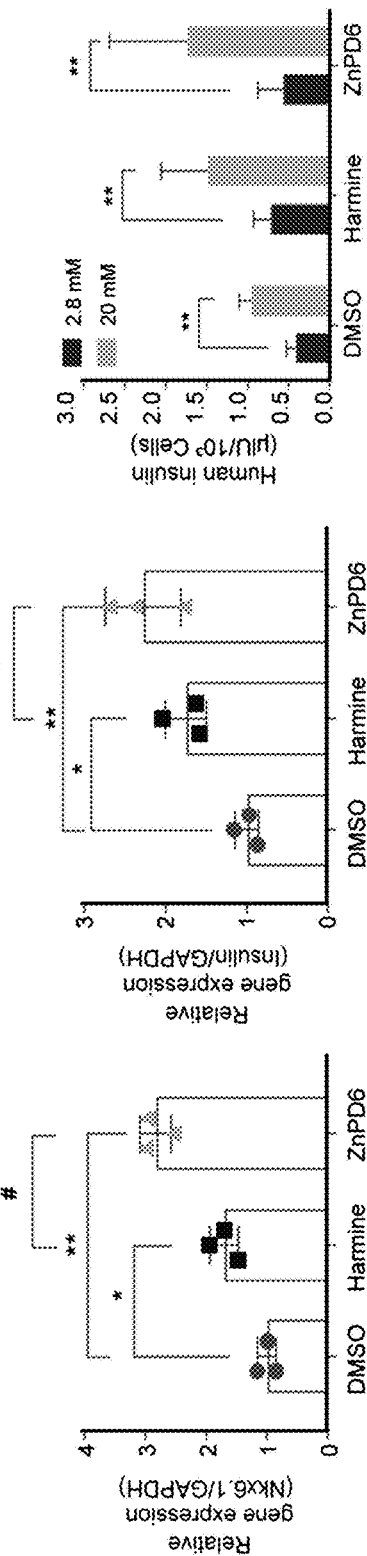
FIG. 6A
FIG. 6B
FIG. 6C
FIG. 6D
FIG. 6E

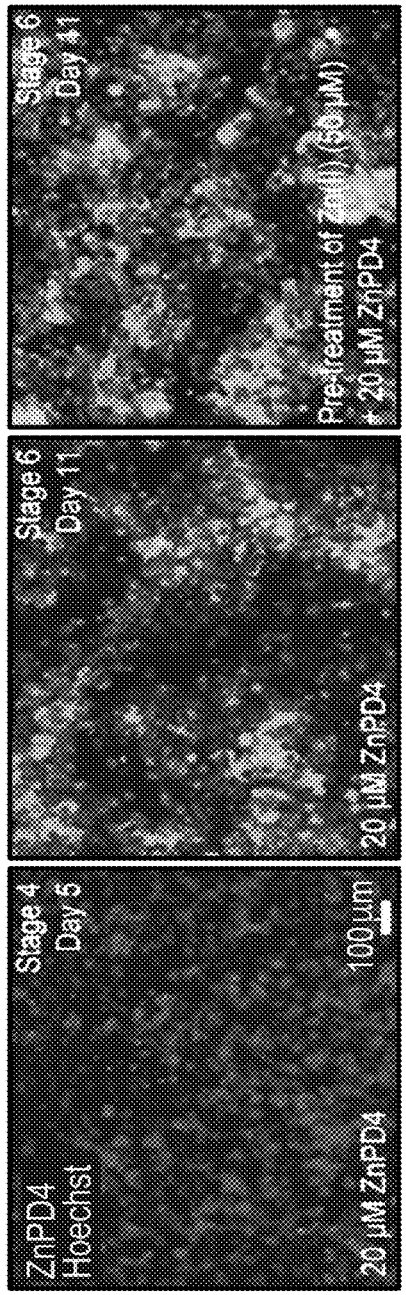
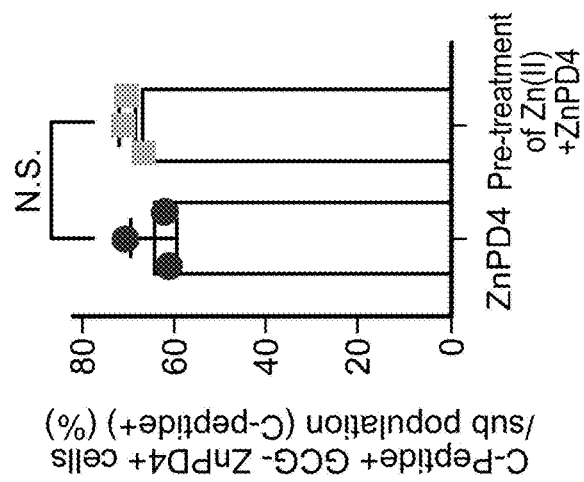
FIG. 9A
FIG. 9B

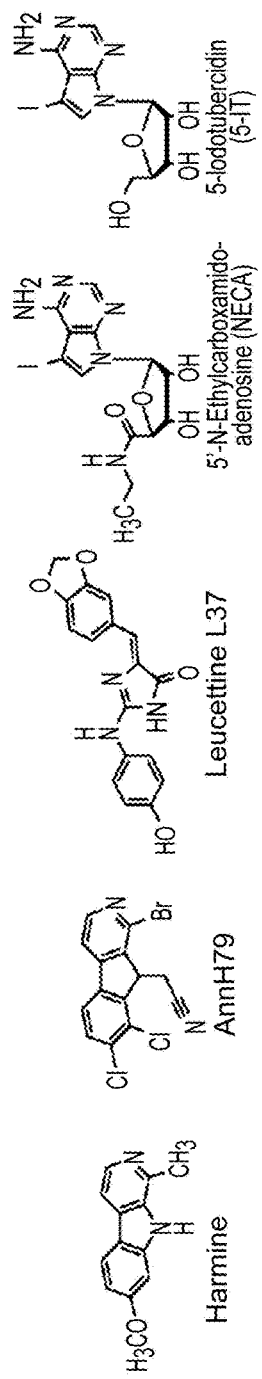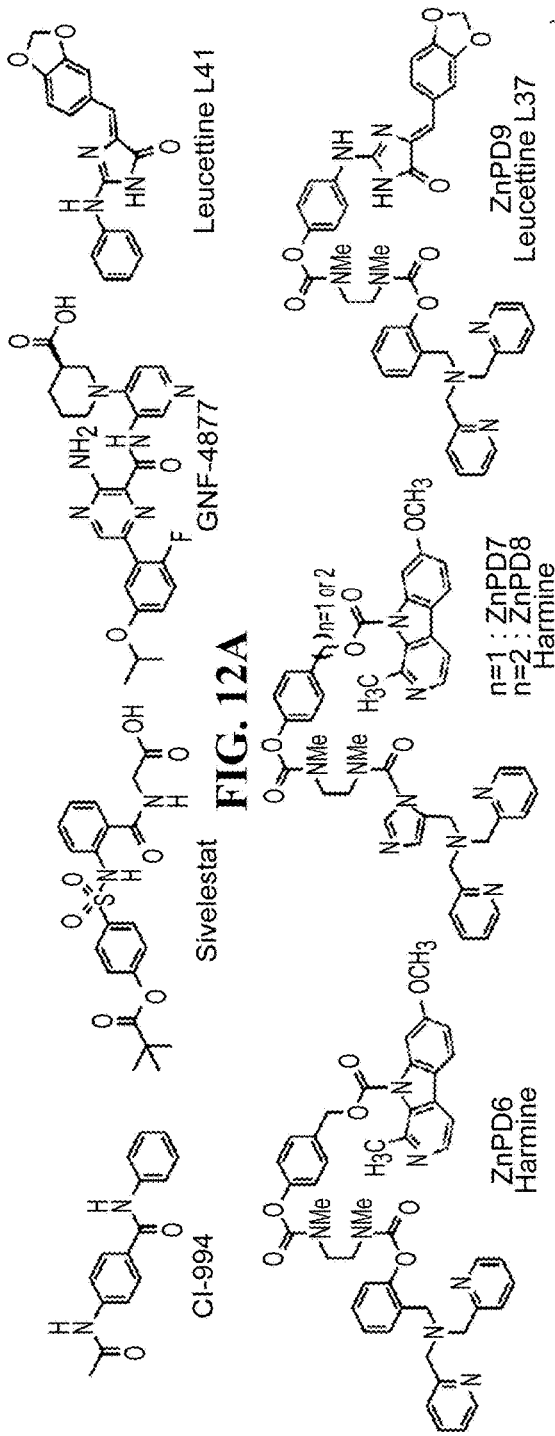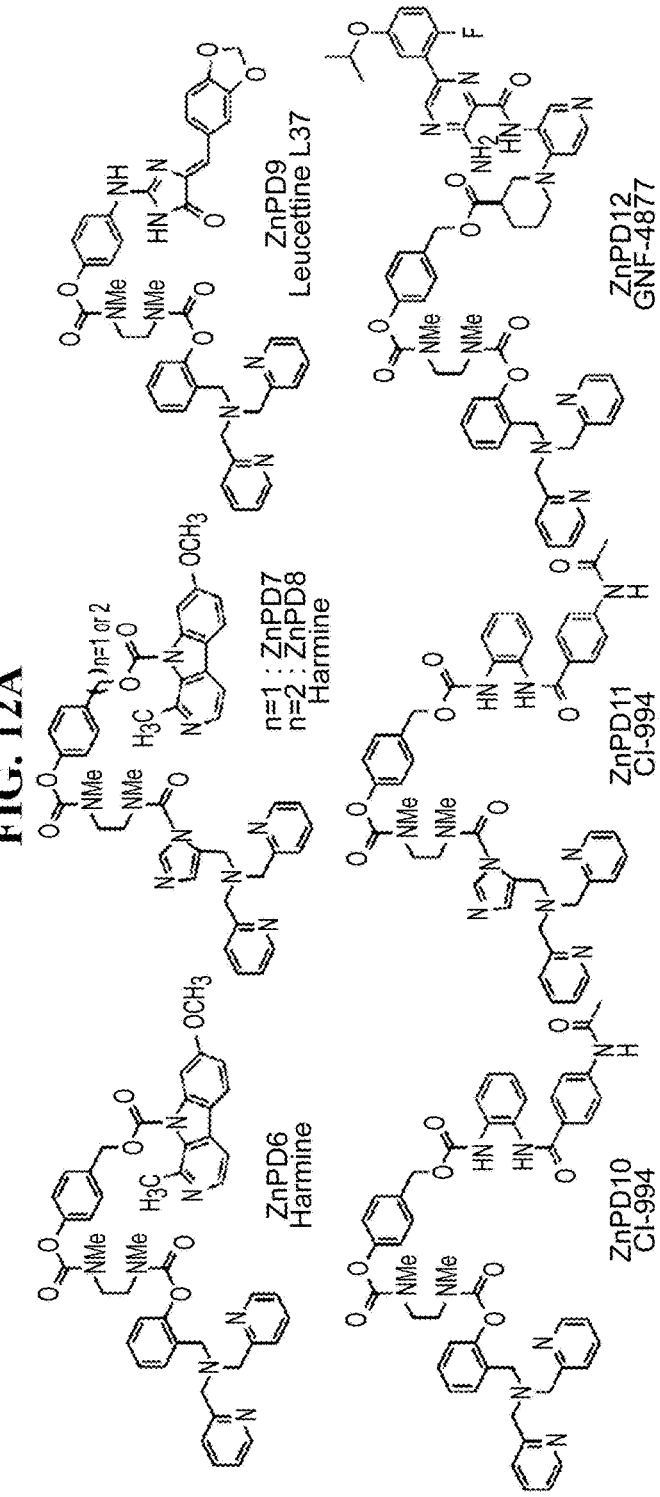
FIG. 12A
FIG. 12B

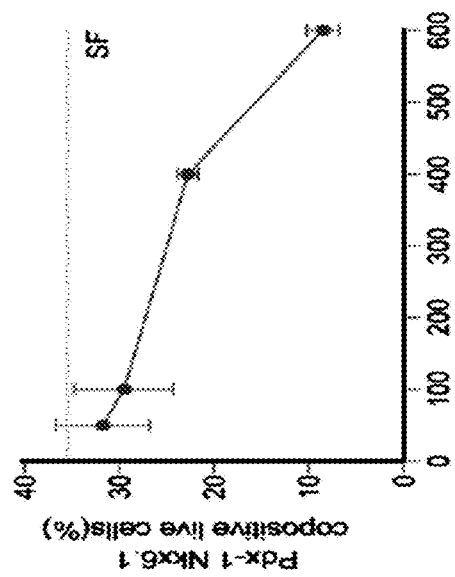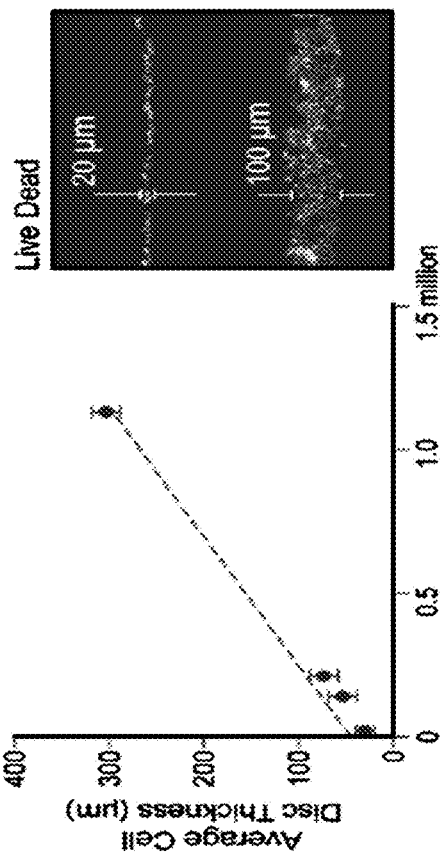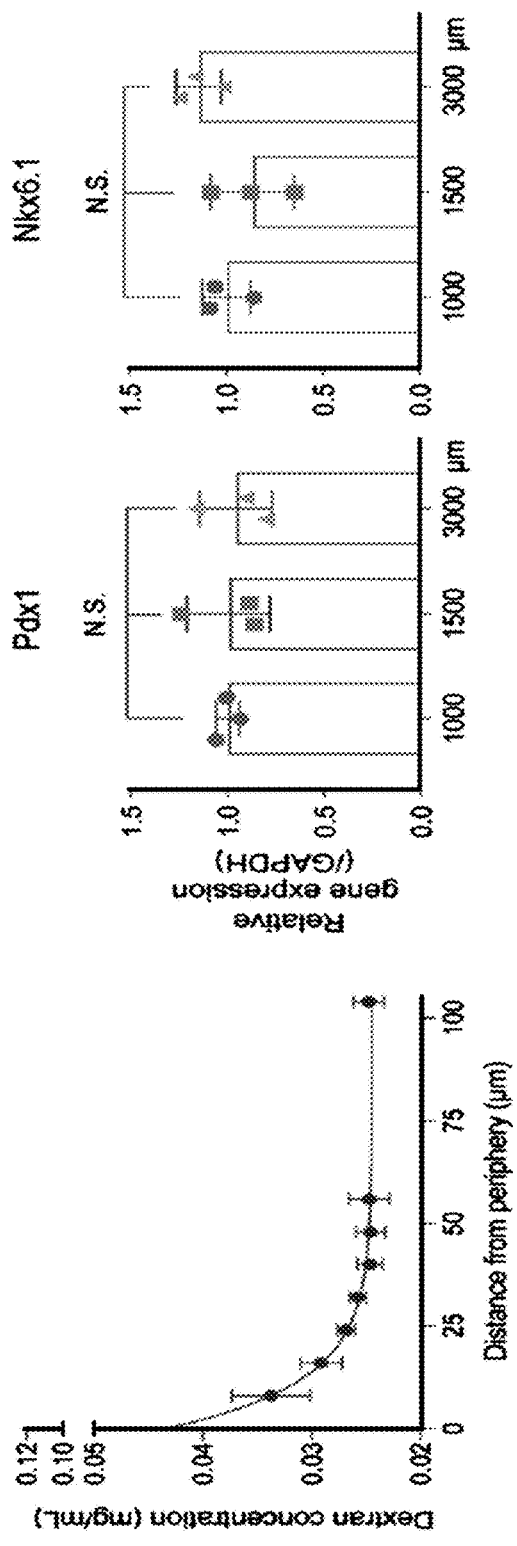
FIG. 14A
FIG. 14B
FIG. 14C
FIG. 14D

FIG. 21

THREE-DIMENSIONAL CELL CULTURE, DEVICES, AND USE THEREOF

CROSS-REFERENCE TO RELATED APPLICATIONS

This application claims the benefit of U.S. Provisional Application No. 63/039,863, filed Jun. 16, 2020. The entire contents of the above-identified applications are hereby fully incorporated herein by reference.

STATEMENT REGARDING FEDERALLY SPONSORED RESEARCH

This invention was made with government support under Grant Nos. DK113597 and DK104165 awarded by the National Institutes of Health. The government has certain rights in the invention.

TECHNICAL FIELD

The subject matter disclosed herein is generally directed to a three-dimensional cell culture and methods of use thereof.

BACKGROUND

Standard two-dimensional (2D) cell-culture systems may not mimic in vivo conditions. Conventional three dimensional (3D) culture systems (e.g., spinner flasks and microfluidic devices), alternatively, may preserve the morphological and biological complexity of the environment and cells. However, these platforms lack the simplicity and throughput necessary to screen large quantities of compounds. Therefore, there is a need for a cell culture system that mimic the in vivo environment in a tissue or organ, and at the same time allows high throughput assays, e.g., for screening potential therapeutic agents.

SUMMARY

In certain example embodiments, the present disclosure provides a device for high-throughput analysis and screening of perturbations in three-dimensional cell-culture environment, comprising a plurality of individual discrete volumes, each individual discrete volume comprising a three-dimensional (3D) cell culture.

In some embodiments, the 3D cell culture has a diameter of up to 15 mm, up to 7 mm, up to 3 mm, or up to 1 mm. In some embodiments, the 3D cell culture comprises up to $0.8 \times 10^6$ or up to 90,000 cells. In some embodiments, the 3D cell culture has a thickness of from about 5 µm to about 600 µm, or from about 20 µm to about 200 µm. In some embodiments, the 3D cell culture has a cell density of up to $115 \times 10^3$ cells/mm² or $38 \times 10^3$ cells/mm². In some embodiments, the 3D cell culture comprises less than 10% apoptotic or hypoxic cells. In some embodiments, the 3D cell culture has a disc shape. In some embodiments, the device further comprises a multi-well plate. In some embodiments, the multi-well plate is a 48-well plate, 96-well plate, or 384-well plate.

In some embodiments, each individual discrete volume further comprises a cell culture device comprising: a polymer membrane; a mold attached to a first surface of the membrane and having a diameter of up to 15 mm; and a pedestal attached to a second surface of the membrane, wherein the cell culture derive is configured to culture cells on the membrane within the mold.

In another aspect, the present disclosure provides a method for high-throughput screening of perturbations in a 3D cell-culture environment comprising: introducing individual perturbations or combinations of perturbations of a set of perturbations into the individual discrete volumes of the device herein; and determining a change in an initial cell state or phenotype of the 3D cell culture in each individual discrete volume, wherein the change in the initial state or phenotype of the 3D cell culture identifies a perturbation or combination of perturbations that result in a desired state or phenotype of the 3D cell culture.

In some embodiments, the set of perturbations comprises genetic perturbations, chemical agents, environment factors, or a combination thereof. In some embodiments, the set of perturbations comprises chemical agents affecting cell proliferation. In some embodiments, the set of perturbations comprises pancreatic B cell mitogens. In some embodiments, the set of perturbations comprise a library of chemical agents comprising a Zinc-chelating group.

In some embodiments, the 3D cell culture comprises one or more of: trichocytes, keratinocytes, gonadotropes, corticotropes, thyrotropes, somatotropes, lactotrophs, chromaffin cells, parafollicular cells, *glomus* cells melanocytes, nevus cells, merkel cells, odontoblasts, cementoblasts corneal keratocytes, retina muller cells, retinal pigment epithelium cells, neurons, glias, ependymocytes, pinealocytes, pneumocytes, clara cells, goblet cells, G cells, D cells, Enterochromaffin-like cells, gastric chief cells, parietal cells, foveolar cells, K cells, D cells, I cells, goblet cells, paneth cells, enterocytes, microfold cells, hepatocytes, hepatic stellate cells, cholecystocytes, centroacinar cells, pancreatic stellate cells, pancreatic α cells, pancreatic β cells, pancreatic δ cells, pancreatic F cells, pancreatic ε cells, thyroid, parathyroid, oxyphil cells, urothelial cells, osteoblasts, osteocytes, chondroblasts, chondrocytes, fibroblasts, fibrocytes, myoblasts, myocytes, myosatellite cells, tendon cells, cardiac muscle cells, lipoblasts, adipocytes, interstitial cells of cajal, angioblasts, endothelial cells, mesangial cells, juxtaglomerular cells, macula densa cells, stromal cells, interstitial cells, telocytes simple epithelial cells, podocytes, kidney proximal tubule brush border cells, sertoli cells, leydig cells, granulosa cells, peg cells, germ cells, spermatozoon ovums, lymphocytes, myeloid cells, endothelial progenitor cells, endothelial stem cells, angioblasts, mesoangioblasts, pericyte mural cells, and any combination thereof.

In some embodiments, at least 10% or at least 20% of cells in the 3D cell cultures express C-peptide. In some embodiments, at least 80% of cells in the 3D cell cultures express Pdx-1. In some embodiments, at least 60% of cells in the 3D cell cultures express Pdx-1 and Nkx6. In some embodiments, at least 60% of cells in the 3D cell cultures express Pdx-1, Nkx6, and Chromogranin-A. In some embodiments, at least 7% of cells in the 3D cell cultures express Pdx-1, Nkx6.1, Chromogranin-A, and C-peptide. In some embodiments, the 3D cell cultures comprise cells that have a glucose-stimulated insulin secretion index of at least 2. In some embodiments, the 3D cell cultures comprise cells that express E-cad, CX36, and Zinc transporter 8. In some embodiments, a Zn(II) ion level in the one or more 3D cell culture is higher than a Zn(II) ion level in a single layer culture of counterpart cells. In some embodiments, the 3D cell cultures comprising one or more insulin vesicles.

In some embodiments, determining a change in an initial state or phenotype of the 3D cell culture comprises performing gene and/or genome sequencing, a gene expression analysis, an epigenetic analysis, a cell phenotype analysis, a cell morphology analysis, a growth analysis, a differentiation analysis, a cell volume analysis, a cell viability analysis, a cell metabolism analysis, a cell communication or signal transduction analysis, a cell reproduction analysis, a cell response analysis, a cell production or secretion analysis, a cell function analysis, an insulin secretion analysis, assessment of architecture of the 3D cell culture, or a combination thereof.

In an embodiment, the present disclosure provides a three-dimensional (3D) cell culture comprising cells in an aggregate on a surface, wherein the aggregate has a diameter up to 15 mm. In some embodiments, the 3D cell culture has a diameter of up to 7 mm, up to 3 mm, or up to 1 mm. In some embodiments, the 3D cell culture comprises up to $0.8 \times 10^6$ or up to 90,000 cells. In some embodiments, the 3D cell culture has a thickness of from about 5 μm to about 600 μm. In some embodiments, the thickness is from about 20 μm to about 200 μm.

In an embodiment, the present disclosure provides a three-dimensional (3D) cell culture comprising at least 10 million cells in an aggregate on a surface, wherein the 3D cell culture has a thickness of from about 5 μm to about 600 μm. In some embodiments, the thickness is from about 20 μm to about 200 μm. In some embodiments, the 3D cell culture comprises at least 100 million cells. In some embodiments, at least 7% of the cells express C-peptide. In some embodiments, the 3D cell culture has a cell density of up to about $115 \times 10^3$ cells/mm$^2$ or $38 \times 10^3$ cells/mm$^2$. In some embodiments, at least 10% or at least 20% cells express C-peptide. In some embodiments, at least 80% of the cells express Pdx-1. In some embodiments, at least 60% of the cells express Pdx-1 and Nkx6. In some embodiments, at least 60% of the cells express Pdx-1, Nkx6, and Chromogranin-A. In some embodiments, at least 7% of the cells express Pdx-1, Nkx6.1, Chromogranin-A, and C-peptide. In some embodiments, the cells have a glucose-stimulated insulin secretion index of at least 2. In some embodiments, the cells express E-cad, CX36, and Zinc transporter 8. In some embodiments, a Zn(II) ion level in the cell culture is higher than a Zn(II) ion level in a single layer culture of counterpart cells. In some embodiments, the 3D cell culture comprises one or more insulin vesicles. In some embodiments, the 3D cell culture has a less than 10% apoptotic or hypoxic cells.

In one embodiment, the present disclosure provides a library of 3D cell cultures comprising a plurality of the 3D cell cultures herein. In some embodiments, the library is on a multi-well plate. In some embodiments, the multi-well plate is a 48-well plate, 96-well plate, or 384-well plate.

In one embodiment, the present disclosure provides a device for three-dimensional cell culture, comprising: a polymer membrane; a mold attached to a first surface of the membrane and having a diameter of less than 15 mm; and a pedestal attached to a second surface of the membrane, wherein the device is configured to culture cells on the membrane within the mold. In some embodiments, the mold has a diameter of up to 7 mm, up to 3 mm, or up to 1 mm.

In an embodiment, the present disclosure provides a device for three-dimensional cell culture, comprising: a polymer membrane; a mold attached to a first surface of the membrane and having a diameter of at least 25 mm; and a pedestal attached to a second surface of the membrane, wherein the device is configured to culture cells on the membrane within the mold. In some embodiments, the membrane is a semi-permeable hydrophilic PTFE membrane. In some embodiments, the membrane has a pore of less than 3 μm. In some embodiments, the membrane is coated with one or more components of extracellular matrices. In some embodiments, the membrane is coated with laminin and/or collagen IV.

In one embodiment, the present disclosure provides a cell culture system comprising the cell culture herein cultured in the device herein. In some embodiments, the device is in a container with a cell culture medium. In some embodiments, the container is a well of a multi-well container.

In another aspect, the present disclosure provides a system comprising a multi-well container, one or more wells of the multi-well container comprises the cell culture herein cultured in the device herein, the device herein, or the cell culture system herein.

In another aspect, the present disclosure provides a method of making a three-dimensional cell culture, the method comprising: seeding a plurality of cells to the device herein; and aggregating the seeded cells on the membrane of the device to form a three-dimensional cell culture. In some embodiments, the plurality of cells comprise primary or stem cell-derived pancreatic β cells. In some embodiments, the plurality of cells are in a single-cell suspension.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

FIGS. 3A-3J: An exemplary Disque Platform (DP). (FIG. 3A) Schematic illustration of 3D reconstructed pluripotent stem cell-derived β-cells (SC β-cells) in DP and gross view of the DP with individual Disques. Each Disque can be accommodated within a 96 well culture plate providing a simple design that integrates the high-throughput capability of 2D culture methods and the 3D environments essential for β cells. (FIG. 3B) Morphology of a cell disc in the DP, shown through bright-field (left) and confocal microscopy [NK6 homeobox 1 (Nkx6.1)] and C-peptide-positive cells (right). (FIG. 3C) Representative images show expression of E-cadherin (E-cad), Connexin-36 (CX36), and DAPI in cell discs (stage 6, S6). (FIG. 3D) 3D culture (DP and SF) showed significantly higher levels of Zn(II) ions compared to a conventional 2D system, measured through signal intensity from a fluorescent indicator for intracellular free Zn(II) ions in S6 cells. (n=3; **p<0.01 vs. 2D). (FIG. 3E) SC β cells cultured in DP show a significantly higher gene expression profile of E-cad, CX36, and zinc transporter 8 (ZnT8) using qRT-PCR analysis. Graphs show relative gene expression of Ecad and CX36 in S6 cells cultured in 2D, DP, and in SF. (n=3; *p<0.05, p<0.01 vs. 2D). (FIG. 3F) Cell discs in the DP show a uniform and homogenous distribution of viable cells via fluorescent imaging. Images show the viability distribution of SC β cells following 5-day differentiation (pancreatic progenitor cells; stage 4 day 1 [S4d1] to S4d5) in SF and DP by live/dead assay. (FIG. 3G) DP achieved a high percentage of viable cells comparable to SF culture during pancreatic progenitor differentiation to mature SC β cells (S6) using flow cytometry analysis. Cell viability was quantified following 18-day differentiation (S4d1 to S6d7) by Zombie Aqua™ Fixable Viability Kit. (n=3). (FIG. 3H) DP shows similar expression of β-cell differentiation markers C-peptide and Nkx6.1 to SF through immunocytochemistry. (FIG. 3I) DP and SF show similar co-positive propensity of C-peptide and Nkx6.1 via flow cytometry analysis. (n=4; p<0.01 vs. 2D). (FIG. 3J) DP supports glucose stimulated insulin secretion from SC β cells as shown through similar glucose stimulated insulin secretion index (GSISI, 20 mM/2.8 mM glucose) of SC β cells (S6) between DP and SF (n=3; **p<0.01 vs. 2D).

FIGS. 4A-4D A zinc prodrug (ZnPD) system was developed to enable longer intracellular exposure of drug targeting β cells. (FIG. 4A) Scheme of the ZnPD system: ZnPD comprises a zinc chelating group, a linker, and an inactive cargo. Zinc ions selectively catalyze the bond cleavage and release the active form of a drug in β cells. This ZnPD system completely releases the active cargo as the carbamate linkage hydrolyzes and triggers self-immolation. (FIG. 4B) A fluorescent dye, BODIPY acid, was used as the first cargo to visually confirm that the drug releases in C-peptide-positive SC β cells. Representative images show the dose-dependent ZnPD4 unmasking in SC β cells and nuclear staining (Hoechst). (FIG. 4C) Fluorescent signal from activated ZnPD4 is selective in C-peptide-positive SC β cells (stage 6) as shown through confocal images. (FIG. 4D) ZnPD system was more selective toward C-peptide-producing cells, compared to C-peptide negative, cells (e.g., α cells, δ cells, pp cells), measured by ZnPD4 fluorescence signal through flow cytometry (n=3).

(FIG. 5A) Chemical structure of harmine and ZnPDs conjugated with harmine (ZnPD6-8). ZnPD8 acts as a negative control due to a non-cleavable linker. (FIG. 5B) Co-expression of C-peptide and Nkx6.1 in SC β cells treated in the DP successfully identified harmine and ZnPD6 as viable candidates for increasing β-cell proliferation via imaging for C-peptide/Nkx6.1 co-positive SC β cells (n=3; *p<0.05, **p<0.01 vs. DMSO). (FIG. 5C) Cell viability was measured by AlamarBlue assay and normalized to untreated group (n=3). Harmine and ZnPD6 were treated at 5-fold serial dilutions (0.032~500 μM). (FIG. 5D) ZnPD6 is more efficacious than harmine at higher dosages (10 and 20 μM), measured by dose-dependent relationship of proliferation in SC β cells (C-peptide+EdU+) after treatments with harmine and ZnPD6 at 2-fold serial dilutions (n=3) (0.625~20 μM). (FIG. 5E) ZnPD6 exhibits increased and prolonged proliferation profile of the SC β cells (C-peptide+GCGKi67+) compared to harmine treatment and DMSO over 6 days of treatment (n=3; *p<0.05, **p<0.01 vs. DMSO). (FIG. 5F) Treatment of ZnPD6 to primary human islets in DP reveals a higher inductive effect compared to DMSO control and unmodified harmine. In addition, ZnPD6 in the DP shows higher proliferating β cells compared to DMSO. Results were obtained by flow cytometry analysis of C-peptide+GCG-EdU+ cells after treatment with harmine and ZnPD6 in human primary islets in DP (n=3, *p<0.05, p<0.01 vs. DMSO, #p<0.05 vs. harmine). (FIG. 5G) Validation of DP with ZnPD6. ZnPD6 in the DP induces a greater increase in the population of proliferating β cells compared to DMSO and harmine, while in a conventional 2D system, ZnPD6 does not show any significant differences in proliferation compared to DMSO via flow cytometry analysis. Populations of C-peptide+GCG-EdU+SC β cells in both 2D and DP were measured [n=4, p<0.01, ***p<0.001 vs. DMSO (DP), ##p<0.01, ###p<0.001 vs. DMSO (2D), |p<0.05 vs. harmine (DP), ++p<0.01 vs. ZnPD6 (2D)]. (FIG. 5H) Representative images show increased NFAT1 nuclear translocation with ZnPD6 treatment vs. harmine treatment. Yellow arrows indicate C-peptide and NFAT1 (in nucleus) co-positive cells. ZnPD6 treatment can sustain a longer duration of NFAT1 nuclear translocation compared to harmine treatment which shows decreased NFAT1 nuclear translocation after 4 hours (n=4; *p<0.05, p<0.01, *p<0.001 vs. DMSO, #p<0.05, ###p<0.001 vs. harmine). (FIG. 5I) Insulin secretion of SC β cells in response to glucose stimulation (n=6, **p<0.01 vs. 2.8 mM).

FIGS. 6A-6E—ZnPD6's proliferation and differentiation capacity were validated in a SF. ZnPD shows higher efficacy than unmodified harmine in a scaled-up culture of SC β cells. (FIG. 6A) ZnPD6 identified from the DP was validated in SF for scaled-up SC β-cell culture. (FIG. 6B) Treatment with ZnPD6 increases propensity of C-peptide and EdU co-positive (GCG-) SC β cells as seen through representative immunofluorescent images of SC β cells with C-peptide (red), EdU (green), and nuclear staining (DAPI). White arrows indicate coincident cells (yellow). (FIG. 6C) EdU incorporation in monohormonal β cells treated with ZnPD6 is significantly higher compared to DMSO and harmine. Population of C-peptide+GCG-EdU+ (SC β cells) and C-peptide-GCG+EdU+ (SC α cells) treated in SF were obtained using flow cytometry (n=6; *p<0.05, **p<0.01 vs. DMSO, #p<0.05 vs. harmine). (FIG. 6D) ZnPD6 treatment in SF increases Nkx6.1 and insulin gene expression compared to DMSO and harmine group (n=3; *p<0.05, p<0.01 vs. DMSO, #p<0.05 vs. harmine). (FIG. 6E) Insulin secretion in response to glucose stimulation (n=7, p<0.01 vs. 2.8 mM).

(FIG. 8A) Immunofluorescent staining for Pdx1 and Nkx6.1 markers. (FIG. 8B) The relative proportion of Pdx1 positive cells in the DP (n=4, *; p<0.05 vs. control). (FIG. 8C) Quantitative real-time polymerase chain reaction (qRT-PCR) analysis to determine the gene expression of Pdx1 marker in SC β cells cultured in DP (n=3, ; p<0.01 vs. control). (FIG. 8D) Gene expression profiles for hairy and enhancer of split-1 (Hes1) in the cells in both 2D and DP (n=3, ; p<0.01 vs. DP control).

FIGS. 9A-9B Selective unmasking of ZnPD4 in mature SC β cells. (FIG. 9A) Representative images showing the selective unmasking of ZnPD4 (20 μM) in pancreatic progenitor cells (S4d5) and SC β cells (S6d11). The cells (S6d11) in the rightmost panel was pre-treated with Zn(II) (50 μM) 1 day before in culture media. Hoechst nuclear back stain. (FIG. 9B) Propensity of SC β cells (S6d11, C-peptide+, GCG−, and ZnPD4+) treated with ZnPD4 with or without pre-treatment of Zn(II) (50 μM) 1 day before in culture media, quantified by flow cytometry (n=3).

FIGS. 12A-12B—Chemical structure of small molecules and ZnPDs. (FIG. 12A) List of known β cell proliferating small molecules. (FIG. 12B) List of ZnPDs: exemplary known β cell proliferating small molecules appended to zinc chelating system.

(FIG. 13A) 3D culture system (e.g., SF) shows increased β-cell expression of junction markers, E-cad and CX36, and nuclear back stain (DAPI). (FIG. 13B) SC β cells cultured in 3D systems show a significantly higher gene expression profile of E-cad, CX36, and ZnT8 versus 2D systems using qRT-PCR analysis (n=3; *p<0.05 vs. 2D, p<0.01). (FIG. 13C) 3D system (SF) for SC β cell culture contain higher zinc levels than 2D group as seen by representative images and fluorescence intensity measured by Fluozin-3 indicator (n=3, *p<0.001).

FIGS. 14A-14D—Optimization of thickness and diameter of the cell discs in DP for nutrient diffusion and differentiation of the cells. (FIG. 14A) Correlation between the seeding density and the estimated disc thickness (n=3), with representative immunofluorescent images showing the side views of cell discs stained with Live/Dead assay. (FIG. 14B) Correlation between the estimated disc thickness and the percentage of viable cells in the disc after 6 day-differentiation (S6d8 to S6d14). A one-phase exponential model gives R2=0.98 (n=3). (FIG. 14C) Correlation between the estimated thickness in cell disc and the percentage of cells that became pancreatic endocrine progenitors with co-expression of Pdx1 and Nkx6.1 after 5 day differentiation (S4d1 to S4d5). A one-phase exponential fit gives R2=0.8047 (n=3). (FIG. 14D) Dextran diffusion within SC islets taken from SF suspension culture, after a 4 hour incubation in 0.125 mg/ml 10-kDa Texas Red dextran (n=3). Gene expression of SC β cells for pancreatic and duodenal homeobox 1 (Pdx1) and Nkx6.1 after 5 days (S4d1 to S4d5) grown in 1000, 1500, 3000 μm diameter DPs (n=3).

FIG. 21. $^1$H NMR spectrum of ZnPD8.

Figure 1:
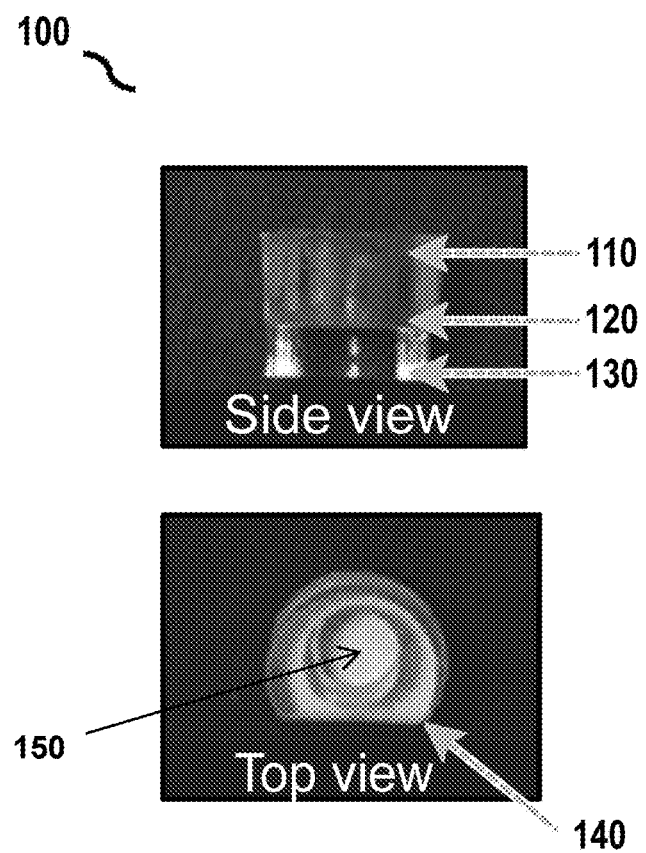
FIG. 1 shows an exemplary device for 3D cell culture.

The figures herein are for illustrative purposes only and are not necessarily drawn to scale.

DETAILED DESCRIPTION OF THE EXAMPLE EMBODIMENTS

General Definitions

Unless defined otherwise, technical and scientific terms used herein have the same meaning as commonly understood by one of ordinary skill in the art to which this disclosure pertains. Definitions of common terms and techniques in molecular biology may be found in Molecular Cloning: A Laboratory Manual, $2^{nd}$ edition (1989) (Sambrook, Fritsch, and Maniatis); Molecular Cloning: A Laboratory Manual, $4^{th}$ edition (2012) (Green and Sambrook); Current Protocols in Molecular Biology (1987) (F. M. Ausubel et al. eds.); the series Methods in Enzymology (Academic Press, Inc.): PCR 2: A Practical Approach (1995) (M. J. MacPherson, B. D. Hames, and G. R. Taylor eds.): Antibodies, A Laboratory Manual (1988) (Harlow and Lane, eds.): Antibodies A Laboratory Manual, $2^{nd}$ edition 2013 (E. A. Greenfield ed.); Animal Cell Culture (1987) (R. I. Freshney, ed.); Benjamin Lewin, Genes IX, published by Jones and Bartlett, 2008 (ISBN 0763752223); Kendrew et al. (eds.), The Encyclopedia of Molecular Biology, published by Blackwell Science Ltd., 1994 (ISBN 0632021829); Robert A. Meyers (ed.), Molecular Biology and Biotechnology: a Comprehensive Desk Reference, published by VCH Publishers, Inc., 1995 (ISBN 9780471185710); Singleton et al., Dictionary of Microbiology and Molecular Biology 2nd ed., J. Wiley & Sons (New York, N.Y. 1994), March, Advanced Organic Chemistry Reactions, Mechanisms and Structure 4th ed., John Wiley & Sons (New York, N.Y. 1992); and Marten H. Hofker and Jan van Deursen, Transgenic Mouse Methods and Protocols, $2^{nd}$ edition (2011).

As used herein, the singular forms "a", "an", and "the" include both singular and plural referents unless the context clearly dictates otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

The term "about" in relation to a reference numerical value and its grammatical equivalents as used herein can include the numerical value itself and a range of values plus or minus 10% from that numerical value. For example, the amount "about 10" includes 10 and any amounts from 9 to 11. For example, the term "about" in relation to a reference numerical value can also include a range of values plus or minus 10%, 9%, 8%, 7%, 6%, 5%, 4%, 3%, 2%, or 1% from that value.

As used herein, a "biological sample" may contain whole cells and/or live cells and/or cell debris. The biological sample may contain (or be derived from) a "bodily fluid". The present invention encompasses embodiments wherein the bodily fluid is selected from amniotic fluid, aqueous humour, vitreous humour, bile, blood serum, breast milk, cerebrospinal fluid, cerumen (earwax), chyle, chyme, endolymph, perilymph, exudates, feces, female ejaculate, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, urine, vaginal secretion, vomit and mixtures of one or more thereof. Biological samples include cell cultures, bodily fluids, cell cultures from bodily fluids. Bodily fluids may be obtained from a mammal organism, for example by puncture, or other collecting or sampling procedures.

The terms "subject," "individual," and "patient" are used interchangeably herein to refer to a vertebrate, preferably a mammal, more preferably a human. Mammals include, but are not limited to, murines, simians, humans, farm animals, sport animals, and pets. Tissues, cells and their progeny of a biological entity obtained in vivo or cultured in vitro are also encompassed.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention. For example, in the appended claims, any of the claimed embodiments can be used in any combination.

All publications, published patent documents, and patent applications cited herein are hereby incorporated by reference to the same extent as though each individual publication, published patent document, or patent application was specifically and individually indicated as being incorporated by reference.

Overview

The present disclosure provides for three-dimensional (3D) cell cultures, devices for 3D cell culture, and methods of making and using thereof. In general, the approach can generate cells growing under a condition mimicking in vivo microenvironment. In some cases, the 3D cell culture provides a platform for high throughput screening of agents on cells resembling in vivo characteristics and functions. In some other cases, the approach can be used to culture a large number of cells, e.g., for using in cell therapy.

In one aspect, the 3D cell cultures may be in small sizes and/or comprise small number of cells, while at the same time recapitulate in vivo microenvironment and cell-to-cell interactions, so that the cells exhibit important characteristics and functions. In some embodiments, the present disclosure provides 3D cell cultures comprising an aggregate of cells. The aggregate may have a small size, e.g., a diameter of less than 7 mm, 3 mm, or 1 mm. In some cases, the cell cultures mimic the in vivo environment and characteristics of pancreatic β cells. For example, at least 20% of the cells in the culture may express Pdx-1, Nkx6, and c-peptide.

In another aspect, the 3D cell culture, devices, and methods may be used for culturing a large amount cells in a condition mimicking in vivo microenvironment and cell-to-cell interactions, so that the cultured cells exhibit important characteristics and functions. In some examples, the 3D cell culture may comprise at least 10 million cells in an aggregate on a surface, wherein the 3D cell culture has a thickness of from about 5 μm to about 600 μm.

In another aspect, the present disclosure provides devices for 3D cell culture. The device may be capable of culturing a small number of cells to make a 3D culture in small size. In some embodiments, the devices comprise a polymer membrane, a mold attached to a first surface of the membrane and having a small diameter such as less than 15 mm, and a pedestal attached to a second surface of the membrane. The cell culture may grow on the membrane within an inner compartment of the mold. The device may be placed in a well of a multi-well plate with culture media in contact with the cells.

In another aspect, the present disclosure provides systems comprising both the cultured cells and the devices. In some examples, such systems may be used for high throughput assessment of the cells (e.g., screening effects of a library of compounds) performed on multi-well plates.

In another aspect, the present disclosure provides systems comprising multi-well plates with the devices in the wells. Such systems may be used for generating a large number of 3D cell cultures in a high throughput manner.

In another aspect, the present disclosure provides methods of screening agents such as chemical compounds using the 3D cell cultures. In some embodiments, such method comprises contacting a library of candidate compounds with the cell cultures; and assessing the effect of the candidates on the cells. Desired compounds may be selected based on the assessment. Thanks to the small size and capability of mimicking in vivo tissues comprising the cells, the 3D cultures and devices herein can be used for accurate and high-throughput screenings.

In another aspect, the present disclosure provides methods of generating 3D cell cultures using the devices. In some embodiments, the method comprises seeding a plurality of cells to the device; and aggregating the cells on the membrane of the device to form a 3D cell culture. The device may generate 3D cell cultures in small sizes but still mimic the in vivo situation of corresponding tissues or organs.

3D Cell Culture

The present disclosure provides in vitro or ex vivo 3D cell cultures. The 3D cell culture may be organoids. The 3D cell cultures may be in small sizes so that they fit into wells in multi-well containers such as 96 well plates, allowing for performing high-throughput assays on the cells. In the meantime, the cell culture may recapitulate the microenvironment and important characteristics of cells in in vivo situations. In some examples, the 3D cell culture is in a disc shape, having a diameter and thickness larger than a single cell layer. In some cases, the 3D cell culture has sufficient thickness allowing enhanced cell-cell junction compared to 2D single layer cultures, and in the meantime has low or no hypoxic cells or substantial hypoxic zone within the 3D cell culture.

In some embodiments, the 3D cell cultures are in small sizes. For example, the cell cultures may have a diameter of up to 25 mm, up to 22 mm, up to 21 mm, up to 20 mm, up to 19 mm, up to 18 mm, up to 17 mm, up to 16 mm, up to 15 mm, up to 14 mm, up to 13 mm, up to 12 mm, up to 11 mm, up to 10 mm, up to 9 mm, up to 8 mm, up to 7 mm, up to 6 mm, up to 5 mm, up to 4 mm, up to 3 mm, up to 2 mm, up to 1 mm, up to 0.9 mm, up to 0.8 mm, up to 0.7 mm, up to 0.6 mm, up to 0.5 mm, up to 0.4 mm, up to 0.3 mm, up to 0.2 mm, or up to 0.1 mm. As used herein, a diameter refers to the length of the longest line that can be drawn to connect two points on the boundary of a structure, shape or opening, e.g., the cell culture. It is understood that the structure, shape or opening does not need to be in a circular or cylindric shape. In one example, the cell culture has a diameter of up to 7 mm. In another example, the cell culture has a diameter of up to 3 mm. In one example, the cell culture has a diameter of up to 1 mm.

In some cases, the 3D cell culture has a thickness of from 1 μm to 1000 μm, from 5 μm to 600 μm, from 20 μm to 200 μm, from 5 μm to 200 μm, from 5 μm to 100 μm, from 5 μm to 50 μm, from 50 μm to 100 μm, from 100 μm to 150 μm, from 150 μm to 200 μm, from 1 μm to 10 μm, from 5 μm to 15 μm, from 10 μm to 20 μm, from 15 μm to 25 μm, from 20 μm to 30 μm, from 25 μm to 35 μm, from 30 μm to 40 μm, from 35 μm to 45 μm, from 40 μm to 50 μm, from 45 μm to 55 μm, from 50 μm to 60 μm, from 55μ m to 65 μm, from 60 μm to 70 μm, from 65 μm to 75 μm, from 70 μm to 80 μm, from 75 μm to 85 μm, from 80 μm to 90 μm, from 85 μm to 95 μm, from 90 μm to 100 μm, from 49 μm to 51 μm, from 48 μm to 52 μm, from 46 μm to 54 μm, from 44 μm to 56 μm, from 42 μm to 58 μm, or from 40 μm to 60 μm.

In some cases, the 3D cell culture comprise less than 50%, less than 40%, less than 35%, less than 30%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, less than 1%, less than 0.9%, less than 0.8%, less than 0.7%, less than 0.6%, less than 0.5%, less than 0.4%, less than 0.3%, less than 0.2%, less than 0.1%, less than 0.05%, or less than 0.01% apoptotic or hypoxic cells.

Cells

In some embodiments, the 3D cell cultures comprise pancreatic cells, e.g., pancreatic islet cells. For example, the cell cultures may comprise pancreatic β cells, the progenitors of pancreatic β cells, or a mixture thereof. The term "progenitor" cell refer to cells that have a cellular phenotype that is more primitive and is at an earlier step along a developmental pathway or progression relative to a cell which it can give rise to by differentiation.

Pancreatic β Cells

In some examples, the 3D cell cultures comprise pancreatic β cells. The pancreatic β cells include cells obtained or derived from pancreatic islets and capable of synthesizing and secreting insulin. In some examples, the pancreatic β cells may be primary cells or progenies thereof.

In certain examples, the pancreatic β cells are stem cell-derived β cells, which are derived (e.g., differentiated) from stem cells and expresses at least one marker indicative of a pancreatic β cell, and display at least one characteristic of an endogenous mature β cell (e.g., expressing insulin, displaying a Glucose-stimulated insulin secretion (GSIS)). Strategies for the engineering of functionally mature stem cell derived cells are reviewed in Front. Bioeng. Biotechnol., 9 Jul. 2020 doi: 10.3389/fbioe.2020.00786, incorporated herein by reference. The stem-derived β cells may exhibit one or more characteristics of an endogenous pancreatic β cell, for example, secretion of insulin in response to glucose, and expression of β cell markers, such as for example, c-peptide, Pdx1 and glut-2. In one embodiment, the stem-derived β cells is not an immortalized cell (e.g. proliferate indefinitely in culture). In one embodiment, the SC-β cell is not a transformed cell, e.g., a cell that exhibits a transformation property, such as growth in soft agar, or absence of contact inhibition.

The pancreatic β cells may exhibit one or more characteristic features important for normal β cell function. In some embodiments, the pancreatic β cells exhibit a glucose stimulated insulin secretion (GSIS) response in vitro. In some embodiments, the pancreatic β cells exhibit a GSIS response in vivo. In some embodiments, the pancreatic β cells exhibit in vitro and in vivo GSIS responses. In some embodiments, the GSIS responses resemble the GSIS responses of an endogenous mature pancreatic β cell. In some embodiments, the pancreatic β cells exhibit a GSIS response to at least 1, at least 2, or at least 3, sequential glucose challenge(s). In some embodiments, the GSIS responses resemble the GSIS response of endogenous human islets to multiple glucose challenges. In some embodiments, the GSIS response is observed immediately upon transplanting the cell into a human or animal. In some embodiments, the GSIS response is observed within approximately 24 hours of transplanting the cell into a human or animal. In some embodiments, the GSIS response is observed within approximately one week of transplanting the cell into a human or animal. In some embodiments, the GSIS response is observed within approximately two weeks of transplanting the cell into a human or animal.

In some embodiments, a glucose-stimulated insulin secretion index of the cell as characterized by the ratio of insulin secreted in response to high glucose concentrations compared to low glucose concentrations is similar to the glucose-stimulated insulin secretion index of an endogenous mature pancreatic β cell. As used herein, the glucose-stimulated insulin secretion index is calculated by the ratio of insulin secreted in high glucose (20 mM) to low glucose (2 mM). For example, one or more cells in the cell culture may exhibit a glucose-stimulated insulin secretion index of at least 1, at least 1.1, at least 1.2, at least 1.3, at least 1.4, at least 1.5, at least 1.6, at least 1.7, at least 1.8, at least 1.9, at least 2.0, at least 2.1, at least 2.2, at least 2.3, at least 2.4, at least 2.5, at least 2.6, at least 2.7, at least 2.8, at least 2.9, at least 3.0, at least 3.1, at least 3.2, at least 3.3, at least 3.4, at least 3.5, at least 3.6, at least 3.7, at least 3.8, at least 3.9, at least 4.0, at least 4.1, at least 4.2, at least 4.3, at least 4.4, at least 4.5, at least 4.6, at least 4.7, at least 4.8, at least 4.9, or at least 5.0. In some examples, the 3D cell cultures comprise cells that have a glucose-stimulated insulin secretion index of at least 2.0.

In general, every six insulin molecules need two zinc ions to form a hexametric complex that is crystallized in the insulin secretory granules. As a result, pancreatic β-cells have one of the highest zinc concentrations among mammalian cells, which can reach ~30 mM (~100 μM "free or loosely bound"). By contrast, most cells' Zn2+ concentration is ~400 μM, while plasma [Zn2+] is ~1 nM. Thus, the pancreatic β-cells may have over a million-fold higher Zn2+ concentration than other cell types and plasma.

In some embodiments, the pancreatic β cells exhibit cytokine-induced apoptosis in response to cytokines. In some embodiments, the pancreatic β cells exhibit cytokine-induced apoptosis in response to a cytokine selected from the group consisting of interleukin-1β (IL-β), interferon-γ (INF-γ), tumor necrosis factor-α (TNF-α), and combinations thereof.

In some embodiments, the pancreatic β cells are monohormonal. In some embodiments, the pancreatic β cells exhibit a morphology that resembles the morphology of an endogenous mature pancreatic β cell. In some embodiments, the pancreatic β cells encapsulates crystalline insulin granules. In some embodiments, the pancreatic β cells exhibit encapsulated crystalline insulin granules under electron microscopy that resemble insulin granules of an endogenous mature pancreatic β cell. In some embodiments, the pancreatic β cells exhibit a low rate of replication. In some embodiments, the pancreatic β cells exhibit a low rate of replication. In some embodiments, the pancreatic β cells exhibit a low, but increased rate of replication as measured by staining for C-peptide and Ki67 in response to treatment with prolactin. In some embodiments, the pancreatic β cells comprise one or more insulin vesicles (e.g., at least 1, at least 2, at least 4, at least 6, at least 8, at least 10, at least 20, at least 40, at least 60, or at least 80 insulin vesicles).

In some embodiments, the pancreatic β cells increase intracellular $Ca^{2+}$ in response to glucose. In some embodiments, the pancreatic β cells exhibit a glucose stimulated $Ca^{2+}$ flux (GSCF) that resembles the GSCF of an endogenous mature pancreatic β cell. In some embodiments, the pancreatic β cells exhibit a GSCF response to at least three sequential glucose challenges in a manner that resembles the GSCF response of an endogenous mature pancreatic β cell to multiple glucose challenges.

The stem-derived β cells may be derived directly from stem cells. Alternatively or additionally, the stem-derived β cells may be derived indirectly from stem cells, e.g., from progenitor cells derived from stem cells. Examples of stem cell-derived β cells, and methods of obtaining such cells include those described in WO 2015/002724 and WO 2014/201167, both of which are incorporated herein by reference in their entirety.

In some embodiments, the cells in the 3D cell culture express one or more marker of pancreatic β cells. In some embodiments, the cell function and transcriptomic profile approximates that of tissue (e.g. pancreatic islet). The markers of pancreatic β cells include proteins, peptides, nucleic acids, polymorphism of proteins and nucleic acids, splice variants, fragments of proteins or nucleic acids, elements, and other analytes which are specifically expressed or present in pancreatic β cells. Examples of markers of pancreatic β cells include pancreatic and duodenal homeobox 1 (Pdx1), insulin, c-peptide, amylin, E-cadherin, Hnf313, PCI/3, B2, Nkx2.2, NKX6-1, GLUT2, PC2, ZnT-8, Isll, Pax6, Pax4, PH3, NeuroD, Hnf1b, Hnf-6, Hnf-3beta, and MafA, and those described in Zhang et al., Diabetes. 50 (10): 2231-6 (2001). In some embodiment, a marker of pancreatic β cells is a nuclear β-cell marker.

Additional examples of markers of pancreatic β cells include INS, NKX6.1, ISL1, PAX4, PDX1, chromogranin-A, C-peptide, IAPP, PCDH7, PCP4, ASB9, NEFM, NPTX2, PRPH, TBX3, ITGA1, ACVR1C, INS, ER01B, CALB2, G6PC2, BACE2, CCSER1, EDARADD, PLXNA2, EPAS1, LZTS1, ERMN, TMEM196, CRTAC1, LRFN2, NTNG2, TBX3, EPAS1, ISL1, HOPX, PAX4, PDX1, RXRG, BNC2, POET2F2, and ONECETT2. In some cases, the cells in the 3D cell culture express INS, NKX6.1, ISL1, PAX4, and PDX1. In some cases, the cells in the 3D cell culture express INS, NKX6.1, PDX1, ISL1, ER01B, and PAX4. In some cases, the cells in the 3D cell culture express ISL1 and ER01B.

In some embodiments, the pancreatic β cells expresses at least one marker characteristic of an endogenous mature pancreatic β cell. Examples of such markers include insulin, C-peptide, PDX1, MAFA, NKX6-1, PAX6, NEUROD1, glucokinase (GCK), SLC2A1, PCSK1, KCNJ11, ABCC8, SLC30A8, SNAP25, RAB3A, GAD2, and PTPRN. In some examples the cells in the 3D cell culture express Pdx-1, Nkx6.1, Chromogranin-A, and C-peptide. In some examples the cells in the 3D cell culture express E-cad, CX36, and Zinc transporter 8. In some examples the cells in the 3D cell culture has a Zn(II) ion level in the cell culture is higher than a Zn(II) ion level in a single layer culture of counterpart cells.

In some embodiments, the pancreatic β cells do not express at least one marker (e.g., a marker not expressed by endogenous mature pancreatic β cells). Examples of markers not expressed in the the pancreatic β cells include a) a hormone selected from the group consisting of i) glucagon (GCG), and ii) somatostatin (SST); b) an acinar cell marker selected from the group consisting of i) amylase, and ii) carboxypeptidase A (CPA1), c) an at cell marker selected from the group consisting of i) GCG, Arx, Irx1, and Irx2, d) a ductal cell marker selected from the group consisting of i) CFTR, and ii) Sox9.

In some embodiments, at least 1%, at least 5%, at least 6%, at least 7%, at least 8%, at least 9%, at least 10%, at least 20%, at least 30%, at least 40%, at least 50%, at least 60%, at least 70%, at least 80%, at least 90%, or substantially 100% of the cells in the 3D cell culture express one or more marker of pancreatic β cells. In some examples, at least at least 1%, at least 5%, at least 6%, at least 7%, at least 8%, at least 9%, at least 10%, at least 20%, at least 30%, at least 40%, at least 50%, at least 60%, at least 70%, at least 80%, at least 90%, or substantially 100% of the cells in the 3D cell culture are the Stage 6 SC-β cells as described in Peterson et al. US20190169575 and Melton et al., US20180153941, which are incorporated by reference herein in their entirety.

In some embodiments, at least 2%, at least 5%, at least 10% or at least 20%, at least 30%, at least 40%, at least 50%, at least 60%, at least 80%, at least 90% cells, at least 95%, or at least 99% of the cells in the 3D cell cultures express C-peptide. In some examples, at least 10% or at least 20% cells in the 3D cell cultures express C-peptide.

In some embodiments, at least 2%, at least 5%, at least 10% or at least 20%, at least 30%, at least 40%, at least 50%, at least 60%, at least 80%, at least 90% cells, at least 95%, or at least 99% of the cells in the 3D cell cultures express Pdx-1. In some examples, at least 80% of the cells in the 3D cell cultures express Pdx-1.

In some embodiments, at least 2%, at least 5%, at least 10% or at least 20%, at least 30%, at least 40%, at least 50%, at least 60%, at least 80%, at least 90% cells, at least 95%, or at least 99% of the cells in the 3D cell cultures express Pdx-1 and Nkx6. In some examples, at least 60% of the cells in the 3D cell cultures express Pdx-1 and Nkx6.

In some embodiments, at least 2%, at least 5%, at least 10% or at least 20%, at least 30%, at least 40%, at least 50%, at least 60%, at least 80%, at least 90% cells, at least 95%, or at least 99% of the cells in the 3D cell cultures express Pdx-1, Nkx6, and Chromogranin-A. In some examples, at least 60% of the cells in the 3D cell cultures express Pdx-1, Nkx6, and Chromogranin-A.

In some embodiments, at least 2%, at least 5%, at least 10% or at least 20%, at least 30%, at least 40%, at least 50%, at least 60%, at least 80%, at least 90% cells, at least 95%, or at least 99% of the cells in the 3D cell cultures express Pdx-1, Nkx6.1, Chromogranin-A, and C-peptide. In some examples, at least 7% of the cells in the 3D cell cultures express Pdx-1, Nkx6.1, Chromogranin-A, and C-peptide.

Progenitor Cells

In some embodiments, the 3D cell culture comprises cells that are progenitors of pancreatic β cells. In some examples, such cultures may be used to study the development of pancreatic β cells, and/or testing compounds and/or genes playing a role in the development of pancreatic β cells.

The progenitor cells may comprise one or more, but not all markers of pancreatic β cells. In some examples, the progenitor cells may express NKX6.1 but does not express chromogranin A or C-peptide. In some examples, the progenitor cells may express NKX6.1 and chromogranin A, but not C-peptide. In some examples, the progenitors may be "Stage 4 cells," or "Stage 5 cells," as described in as described in Peterson et al. US20190169575 and Melton et al., US20180153941, which are incorporated by reference herein in their entirety. The progenitor cells may be a mixture of two or three of "Stage 4 cells," "Stage 5 cells," or "Stage 6 cells."

In some embodiments, the progenitor cells may comprise cells at a stage earlier than Stage 4 as described in US20190169575 and US20180153941. In some examples, the progenitor cells may comprise stem cells (embryotic stem cells or induced pluripotent cells) or cells with pluripotency.

Selectable Markers

In some embodiment, one or more the cells in the 3D cell culture may comprise one or more selectable markers. The selectable markers may be used to label, select, monitor, or sort specific type(s) of cell in the cell culture.

Selectable markers may be genes, RNA, or proteins that when expressed, confer upon cells a selectable phenotype, such as resistance to a cytotoxic or cytostatic agent (e.g., antibiotic resistance), nutritional prototrophy, or expression of a particular protein that can be used as a basis to distinguish cells that express the protein from cells that do not.

For example, a selectable marker may be genes (or the coded products) that are not endogenous or native to the cells and that encodes a protein that can be readily assayed. Examples of selectable markers include fluorescent, luminescent, enzymatic and resistance genes. Examples of selectable markers include detectable marker genes, e.g., genes encoding fluorescent proteins such as green fluorescent protein (GFP), cyan fluorescent protein (CFP), yellow fluorescent protein (YFP), and auto-fluorescent proteins including blue fluorescent protein (BFP), glutathione-S-transferase (GST), horseradish peroxidase (HRP), chloramphenicol acetyltransferase (CAT) beta-galactosidase, beta-glucuronidase, luciferase, HcRed, DsRed, cell surface markers, antibiotic resistance genes such as neo, and the like. Examples of selectable markers include as neomycin resistance gene (neo), puromycin resistance gene (puro), guanine phosphoribosyl transferase (gpt), dihydrofolate reductase (DHFR), adenosine deaminase (ada), puromycin-N-acetyltransferase (PAC), hygromycin resistance gene (hyg), multidrug resistance gene (mdr), thymidine kinase (TK), hypoxanthine-guanine phosphoribosyltransferase (HPRT), and hisD gene.

Cell Density and Numbers

The 3D cell culture may comprise a suitable number of cells. The number of cells may be small enough so the culture can fit into a well of a multi-well plate. For example, the cell culture may comprise up to $10^7$, up to $9\times10^6$, up to $8\times10^6$, up to $7\times10^6$, up to $6\times10^6$, up to $5\times10^6$, up to $4\times10^6$, up to $3\times10^6$, up to $2\times10^6$, up to $1\times10^6$, up to $9\times10^5$, up to $8\times10^5$, up to $7\times10^5$, up to $6\times10^5$, up to $5\times10^5$, up to $4\times10^5$, up to $3\times10^5$, up to $2\times10^5$, up to $1\times10^5$, up to $9\times10^4$, up to $8\times10^4$, up to $7\times10^4$, up to $6\times10^4$, up to $5\times10^4$, up to $4\times10^4$, up to $3\times10^4$, up to $2\times10^4$, or up to $1\times10^4$ cells.

In certain embodiments, the cell culture comprises a large number of cells, which can be used for transplantation, e.g., in cell therapy for treating a disease. For example, the cell culture comprising a large number of cells may comprise at least $5\times10^5$, at least $1\times10^6$, at least $2\times10^6$, at least $4\times10^6$, at least $6\times10^6$, at least $8\times10^6$, at least $10^7$, at least $2\times10^7$, at least $4\times10^7$, at least $6\times10^7$, at least $8\times10^7$, at least $10^8$, at least $2\times10^8$, at least $4\times10^8$, at least $6\times10^8$, at least $8\times10^8$, or at least $10^9$ cells.

The 3D cell culture may have a suitable cell density. For example, the cell culture may have up to $500\times10^3$ cells/mm$^2$, up to $450\times10^3$ cells/mm$^2$, up to $400\times10^3$ cells/mm$^2$, up to $350\times10^3$ cells/mm$^2$, up to $300\times10^3$ cells/mm$^2$, up to $250\times10^3$ cells/mm$^2$, up to $200\times10^3$ cells/mm$^2$, up to $190\times10^3$ cells/mm$^2$, up to $180\times10^3$ cells/mm$^2$, up to $170\times10^3$ cells/mm$^2$, up to $160\times10^3$ cells/mm$^2$, up to $150\times10^3$ cells/mm$^2$, up to $145\times10^3$ cells/mm$^2$, up to $140\times10^3$ cells/mm$^2$, up to $135\times10^3$ cells/mm$^2$, up to $130\times10^3$ cells/mm$^2$, up to $125\times10^3$ cells/mm$^2$, up to $120\times10^3$ cells/mm$^2$, up to $115\times10^3$ cells/mm$^2$, up to $110\times10^3$ cells/mm$^2$, up to $10^5\times10^3$ cells/mm$^2$, up to $100\times10^3$ cells/mm$^2$, up to $95\times10^3$ cells/mm$^2$, up to $90\times10^3$ cells/mm$^2$, up to $85\times10^3$ cells/mm$^2$, up to $80\times10^3$ cells/mm$^2$, up to $75\times10^3$ cells/mm$^2$, up to $70\times10^3$ cells/mm$^2$, up to $65\times10^3$ cells/mm$^2$, up to $60\times10^3$ cells/mm$^2$, up to $55\times10^3$ cells/mm$^2$, up to $50\times10^3$ cells/mm$^2$, up to $45\times10^3$ cells/mm$^2$, up to $40\times10^3$ cells/mm$^2$, up to $39\times10^3$ cells/mm$^2$, up to $38\times10^3$ cells/mm$^2$, up to $37\times10^3$ cells/mm$^2$, up to $36\times10^3$ cells/mm$^2$, up to $35\times10^3$ cells/mm$^2$, up to $30\times10^3$ cells/mm$^2$, up to $20\times10^3$ cells/mm$^2$, up to $10\times10^3$ cells/mm$^2$, up to $5\times10^3$ cells/mm$^2$, up to $1\times10^3$ cells/mm$^2$, up to $8\times10^2$ cells/mm$^2$, up to $6\times10^2$ cells/mm$^2$, up to $4\times10^2$ cells/mm$^2$, up to $2\times10^2$ cells/mm$^2$, up to $1\times10^2$ cells/mm$^2$, up to 80 cells/mm$^2$, up to 60 cells/mm$^2$, up to 40 cells/mm$^2$, up to 20 cells/mm$^2$, or up to 10 cells/mm$^2$.

Survival Time

The cells in the 3D cell culture may remain viable for a desired period of time. For example, the cells in the 3D cell culture may remain viable for at least 1 day, at least 3 days, at least 5 days, at least 1 week, at least 2 weeks, at least 3 weeks, at least 4 weeks, at least 2 months, at least 3 months, at least 4 months, at least 5 months, at least 6 months, at least 7 months, at least 8 months, at least 9 months, at least 10 months, at least 11 months, at least 1 year, or at least 2 years. Embodiments of monitoring cell viability can be by staining and optical measurements, or visual observation.

Devices and Systems

In another aspect, the present disclosure provides devices for 3D cell culture. In some embodiments, the devices comprise a membrane attached with a mold. Cells may be seeded and cultured on the membrane within a compartment of the mold. A pedestal may be attached to the membrane on the other side of the mold. The device may have a size small enough to fit into a well in a multi-well plate, e.g., a 96-well plate.

FIG. 1 shows an exemplary device described herein. Device 100 comprises a top mold 110, a membrane 120, and a pedestal 130 at the bottom. The mold has a straight edge 140, has a compartment 150. The cells are to be seeded and cultured on the membrane within compartment 150. When device 100 is placed in a well of a multi-well container, edge 140 can leave space for pipette tips (e.g., a tip of a multi-pipette) to reach to the well for pipetting reagents and media.

The devices may be used for high-throughput analysis and screening of perturbations in the 3D cell culture environment. In the context of environmental factors, the perturbations may comprise alterations to the pH, oxygen levels, carbon dioxide levels, humidity, osmotic pressure, and temperature. The devices may comprise a plurality of individual discrete volumes, each of which comprises a 3D cell culture. The 3D cell culture may be in a disc shape and configured to culture on the membrane within compartment 150.

Mold

The mold of the device may have a size allowing it to fit to a small container (e.g., a well in a multi-well plate. The size of the mold may fit into a well of a 24-well plate, 48-well plate, 96-well plate, 128-well plate, or even smaller wells. For example, the mold may have a diameter of up to 25 mm, up to 22 mm, up to 21 mm, up to 20 mm, up to 19 mm, up to 18 mm, up to 17 mm, up to 16 mm, up to 15 mm, up to 14 mm, up to 13 mm, up to 12 mm, up to 11 mm, up to 10 mm, up to 9 mm, up to 8 mm, up to 7 mm, up to 6 mm, up to 5 mm, up to 4 mm, up to 3 mm, up to 2 mm, up to 1 mm, up to 0.9 mm, up to 0.8 mm, up to 0.7 mm, up to 0.6 mm, up to 0.5 mm, up to 0.4 mm, up to 0.3 mm, up to 0.2 mm, or up to 0.1 mm.

In some examples, the device may have a size sufficient for culturing a desired number of cells. For example, the mold may have a diameter of at least 5 mm, at least 10 mm, at least 15 mm, at least 20 mm, at least 25 mm, at least 30 mm, at least 40 mm, at least 50 mm, at least 60 mm, at least 80 mm, at least 100 mm, at least 200 mm, or at least 500 mm.

The numbers of diameter herein may refer to an outer diameter, e.g., the length of the longest line that can be drawn that connects two points on the outer boundary of the mold. The numbers of diameter herein may also refer to an inner diameter, e.g., the length of the longest line that can be drawn that connects two points on the boundary an inner compartment of the mold. It is understood that when referring to a diameter of a structure, the structure does not necessarily have a circular or cylindric shape. In one example, the mold has a diameter of up to 7 mm. In another example, the mold has a diameter of up to 3 mm. In one example, the mold has a diameter of up to 1 mm.

When placed in a container (e.g., a well in a multi-well plate), the mold may have an outer edge with a shape that leaves some space in the container. The space may be used to add or remove medium or reagents in the container, e.g., using a pipette tip. For example, a part of the outer edge may be straight.

Membranes

The device may comprise a membrane on which the cells are seeded and cultured. The membranes may be in contact with reagents or cell culture media.

The membrane may be made from a material suitable for cell culture. In some examples, the membrane may be a polymer membrane. The materials for making the membrane include homopolymers, random polymers, copolymers, block polymers, coblock polymers (e.g., di, tri, etc.), linear or branched polymers, and crosslinked or non-crosslinked polymers. Examples of the materials include glass fibers, polyethylenes, polypropylenes, polyamides (e.g., nylon), polyesters (e.g., dacron), polystyrenes, polyacrylates, polyvinyl compounds (e.g., polyvinylchloride; PVC), polycarbonates, polytetrafluoroethylenes (PTFE; TEFLON), thermanox (TPX), nitrocellulose, polysaccharides (e.g., celluloses, chitosan, agarose), polypeptides (e.g., silk, gelatin, collagen), polyglycolic acid (PGA), and dextran. In some examples, the membrane is a Polytetrafluoroethylene (PTFE) membrane. In certain examples, the membrane is a Polyethylene terephthalate membrane.

The membrane may be permeable or semi-permeable. For examples, the components in cell culture media may cross the membrane and reach the cells cultured on the membrane. In some embodiments, the membrane may have pores that allow molecules to pass across the membrane (e.g., from culture media to cells or vice versa). For example, the pores may have an average size of up to 5 µm, up to 3 µm, up to 4 µm, up to 2 µm, up to 1 µm, up to 0.8 µm, up to 0.5 µm, or up to 0.2 µm.

The membrane may be coated. The coating may comprise one or more molecules that are a part of a microenvironment of the cell culture that resemble the in vivo microenvironment of a tissue (e.g., pancreatic islets). In some embodiments, the coating may comprise one or more components of extracellular matrices (ECMs) e.g., vasculature extracellular matrices. ECM is a complex network of secreted extracellular molecules. Components of ECM include various glycoproteins (collagens, such as collagen I, collagen III, collagen IV, collagen VI) and glycosaminoglycans (GAG) (e.g., proteoglycans and hyaluronic acid), proteins such as fibrin, elastin, fibronectins, laminins, and nidogens, and minerals such as hydroxyapatite, or fluids such as blood plasma or serum with secreted free flowing antigens, cellular growth factors. In some examples, the coating comprises collagen IV and laminin.

In one example embodiment, a mold is attached to a first surface of the membrane. The mold may be any as previously described herein. The first surface of the membrane may be considered the surface facing away from a well, if applicable. The first surface may be defined as the side of the membrane where the cell culture is seeded on the membrane, or may be opposite the side of the membrane where the cell culture is seeded on the membrane. The first surface may also be considered where the cell culture is seeded on the membrane and within the mold. In one example embodiment, the first and second surface of the polymer membrane may be interchangeable.

Pedestal

The device may comprise a pedestal at the bottom, e.g., to mitigate the generation of air bubbles under the membrane or cell culture, and maintain media circulation. The pedestal may have a size allowing the entirety of the device fit into a container, e.g., a well of a multi-well plate. Similar to the shape of the mold, the pedestal may have a shape that leaves some space for pipetting the reagents and media in the container. In one example, the pedestal may have a semi-circular shape. In one example embodiment, the pedestal is attached to a second surface of the membrane. The second surface of the membrane may be the surface facing a well, if applicable. The second surface of the membrane may also be considered the surface opposite where the cell culture first interacts or is seeded on the membrane.

Cell Culture Systems

The present disclosure also include systems for 3D cell culturing. The systems may comprise a combination of cells, devices, containers, and/or reagents for 3D cell culture. In some embodiments, the systems comprise the 3D cell culture on the device described herein. In some embodiments, the system may comprise a multi-well container, one or more wells of the multi-well container comprises the cell culture herein, the device herein, or cell culture on the device herein. Such system may be provided in kits for preparing 3D cell cultures, or as a pre-made 3D culture or a library of 3D cultures.

In some examples, the present disclosure provides a library of 3D cell cultures comprising a plurality of the 3D cell cultures herein. In some cases, the library is on a multi-well plate (e.g., 48-well plate, 96-well plate, or 384-well plate). The library may be comprised in a kit.

Cell Culture Media

In one embodiment, the device is in a container with a cell culture medium. The cell culture media (CCM) may be natural or artificial. The artificial CCM may contain some natural products. Natural CCM may contain biological fluids, tissue extracts, or clots, for example. Artificial CCM may contain salt solutions, basal media, complex media, or media used in Natural CCM. Artificial CCM may be serum containing, serum-free, chemically defined, or protein-free.

CCM may contain a mixture of amino acids, carbohydrates, salts, vitamins, and other nutrients. CCM may have a buffering system such as natural buffering system, HEPES, or phenol red. Carbohydrates in CCMs may be glucose, galactose, maltose, fructose, or any other source of energy for the cells. Other nutrients may include proteins, peptides, fatty acids, lipids, trace elements, or additional media supplements. CCMs may also contain antibiotics. CCMs may also contain Pluronic F-68.

The CCM may be Dulbecco's Modified Eagle's Medium (DMEM), RPMI-1640, Eagle's Minimum Essential Medium (EMEM), Ham's nutrient mixtures, Iscove's Modified Dulbecco's Medium (IMDM), Neurobasal medium, McCoy's 5A medium, FreeStyle 293 expression media, ExpiCHO expression media, StemFlex culture media, Airway Epithelial Cell basal medium, alpha-modified minimum essential medium (α-MEM), human haematopoietic stem cell co-culture, StemMacs iPS-Brew media, TeSR-E8, mTeSR1, mTeSR Plus medium, GMEM (Glasgow Minimum Essential Medium), Opti-MEM I, SmGM-2, fibroblast growth media/FGM, StemPro-34 serum free growth medium, Essential 8 (E8) media, mTESRI medium, ECGM-2 media, EGM2-Bullet kit medium, Williams' Medium E, medium M254, CnT07 media, TNM-FH media, mammary epithelial cell growth basal medium (MEBM), complete skeletal muscle media, NeuroCult NS-A basal medium, Ham's F-10 and Fibroblast Growth Kit-Low Serum. See e.g. Arora, M. Cell Culture Media: A Review. MATER METHODS 2013, 3.

Methods of Making the 3D Cell Culture

The present disclosure further provides methods of making the 3D cell cultures. In general, the methods comprise seeding a plurality of cells to the device described herein, e.g., on the membrane within the mold, and aggregating the seeded cells to form a 3D cell culture.

In some embodiments, the seeded cells may be in a cell suspension, e.g., single cell suspension. The cell suspension may be made from primary tissues, e.g., pancreatic islets. In some cases, the cell suspension comprises cells from cultured cells.

In some cases, the seeded cells may be progenitors of a desired type cells. After formation of the 3D cell culture of the progenitor cells, the cells are allowed to further differentiate into the desired type of cells. For example, the progenitor cells may be pancreatic progenitor cells, which may be differentiated into pancreatic β cells. In some cases, the progenitor cells may be stem cells (e.g., embryotic stem cells or induced pluripotent cells, or cells capable of differentiating to a progeny cells).

The 3D cell culture may comprise one or more types of pancreatic islet cells, e.g., pancreatic α cells, pancreatic β cells, pancreatic δ cells, pancreatic F cells (e.g., PP cells), or pancreatic ε cells. In particular embodiments, the 3D cell culture allows for pancreatic β cells to be dissociated for 2D monolayer cell culture that can be reaggregated into SC β-cell discs cultured in the 3D cell culture and have the capability to re-establish 3D micro-environments inside conventional 96-well plates. In one embodiment, reaggregation reestablishes cell-cell and cell-ECM interactions at levels similar to SC β clusters cultured in 3D suspension cultures, recapitulating the viability, differentiation capacity, and function of the similar to SC β clusters cultured in 3D suspension cultures. In an aspect, 2D cells can reaggregate into a disc-like geometry while maintaining key features similar to SC β clusters cultured in 3D suspension cultures.

The compositions, systems, devices, and methods herein may be used to generate 3D cell cultures comprising various types of cells. The seeded cells may be, progeny of, or progenitor of, or derived from cells of brain, lung, liver, heart, spleen, pancreas, small intestine, large intestine, skeletal muscle, smooth muscle, skin, bones, adipose tissues, hairs, thyroid, trachea, gall bladder, kidney, ureter, bladder, aorta, vein, esophagus, diaphragm, stomach, rectum, adrenal glands, bronchi, ears, eyes, retina, genitals, hypothalamus, larynx, nose, tongue, spinal cord, or ureters, uterus, ovary, testis, and/or any combination thereof. The seeded cells may comprise trichocytes, keratinocytes, gonadotropes, corticotropes, thyrotropes, somatotropes, lactotrophs, chromaffin cells, parafollicular cells, *glomus* cells melanocytes, nevus cells, merkel cells, odontoblasts, cementoblasts corneal keratocytes, retina muller cells, retinal pigment epithelium cells, neurons, glias (e.g., oligodendrocyte astrocytes), ependymocytes, pinealocytes, pneumocytes (e.g., type I pneumocytes, and type II pneumocytes), clara cells, goblet cells, G cells, D cells, Enterochromaffin-like cells, gastric chief cells, parietal cells, foveolar cells, K cells, D cells, I cells, goblet cells, paneth cells, enterocytes, microfold cells, hepatocytes, hepatic stellate cells (e.g., Kupffer cells from mesoderm), cholecystocytes, centroacinar cells, pancreatic stellate cells, pancreatic α cells, pancreatic β cells, pancreatic δ cells, pancreatic F cells, pancreatic ε cells, thyroid (e.g., follicular cells), parathyroid (e.g., parathyroid chief cells), oxyphil cells, urothelial cells, osteoblasts, osteocytes, chondroblasts, chondrocytes, fibroblasts, fibrocytes, myoblasts, myocytes, myosatellite cells, tendon cells, cardiac muscle cells, lipoblasts, adipocytes, interstitial cells of cajal, angioblasts, endothelial cells, mesangial cells (e.g., intraglomerular mesangial cells and extraglomerular mesangial cells), juxtaglomerular cells, macula *densa* cells, stromal cells, interstitial cells, telocytes simple epithelial cells, podocytes, kidney proximal tubule brush border cells, sertoli cells, leydig cells, granulosa cells, peg cells, germ cells, spermatozoon ovums, lymphocytes, myeloid cells, endothelial progenitor cells, endothelial stem cells, angioblasts, mesoangioblasts, pericyte mural cells, and/or any combination thereof.

Examples of specific types of cells include Primary-h BMSC; Primary-hSkin FB; Primary-cow CC; Primary-rat BMSC; Primary-h CC; MC3T3-E1; Primary-hUVEC; Primary-rabbit CC; NIH 3T3; Primary-CC; Primary-rat Liver Hep; Primary-hSkin Keratinocyte; MG63; HEP-G2; L929; Primary-BMSC; Primary-rabbit BMSC; Primary-pig CC; Primary-hBone OB; MCF-7; Primary-rat Heart CM; Primary-h Foreskin FB; Primary-hAdipose SC; Primary-hFB; #N/A; Primary-hAdipose SC; Primary-FB; Primary-ratAortaSMC; Primary-Bone; Primary-dog CC; 3T3 (nonspecific); C2C12; MDA-MB-231; SaOS-2; Primary-mouse BMSC; Primary-rat CC; Primary-h Mesoderm Mes Pre C; Primary-rat Brain Neuronal; PC12; Primary-Cancerous; Primary-h Skin EC; Primary-rat BM OB; Primary-mouse Embryo SC; MCF-10A; Primary-h Bone OB-like; Primary-goat BMSC; Primary-h Aorta SMC; MDCK (Madin-Darby Canine Kidney); Primary-h ID Annulus C; Primary-ratBone OB; Primary-h Adipose Preadipocyte; Primary-SC; Primary-rat Skeletal Muscle Myoblast; Primary-Heart CM; Primary-cow AortaEC; Primary-dog BMSC; Primary-sheep BMSC; Primary-sheep CC; Primary-pig BMSC; Primary-cow BMSC; Primary-h BladderSMC; Primary-pig Aorta EC; Primary-h Cornea Epi C; Primary-h Aorta EC; Primary-h Cornea FB; Primary-pig Aorta SMC; Primary-mouse Liver Hep; A549; Primary-Bone OB; Primary-h Bladder Uro; Primary-h UV SMC; Swiss 3T3; Primary-Liver Hep; Primary-h Lig FB; Primary-h Coronary Artery SMC; Primary-OB-like; Primary-h Teeth Mes Pre C; HT1080; Primary-rat Heart FB; Primary-pig HV Intersticial C; C3A; Primary-h Breast Cancerous; Primary-h Foreskin Keratinocyte; Primary-h Oral Mucosa Keratinocyte; Primary-mouse Ovary Oocytes; Primary-h Vase SMC; 3T3-L1; Primary-h Lung FB; Primary-chicken Ganglia Neuronal; Primary-h U CStC; Primary-cow Aorta SMC; Primary-mouse Embryo FB; Primary-h Bronchi EpiC; CHO-K1; Primary-h Liver Hep; Primary-hSaphVEC; Primary-hTeethPDL; Primary-rat Skin FB; Primary-pig Liver Hep; PC-3; Primary-SMC; Primary-hMVEC; Primary-mouseFB; Primary-h Nasal Chondrocyte; Primary-hCorneaKeratinocyte; Primary-hOvaryCancerous; Primary-h U CBSC; Primary-rat Heart EC; Primary-Vasc; Primary-mouse Skin FB; Primary-h Tendon TC; Primary-rat Brain Astrocyte; Primary-rat Nerve SC; Ha CaT; Primary-h Gingiva FB; Primary-Neural; Primary-cow Bone OB; Primary-rat Adipose SC; Primary-mouse Bone OB; Primary-h Teeth PC; Primary-h Blood Mononuclear; Primary-rat Hippocampus Neuronal; D3; HeLa; HEK293; C17.2; Primary-h Skin Melanocyte; Primary-h Blood EC-like; HOSTE85; Primary-h UC SC-like; Primary-h Cornea SC; Primary-rat Aorta EC; Primary-h Saph VSMC; Primary-h UCBEC; Primary-mouse Heart CM; D10RL UVA; Primary-h Coronary Artery EC; Primary-h Aorta Myo FB; HT-29; Primary-h Tendon FB; RAW 264; Primary-rat Dental Pulp SC; 3T3-J2; H1; Primary-pig Teeth; Primary-rat Sciatic Schwann; Primary-rabbit Bone OB-like; Primary-sheep Aorta EC; Primary-rabbit Cornea Epi C; Primary-h Ovary Epi C; Primary-rabbit Ear Chondrocyte; SH-SY5Y; Primary-h Teeth FB; Primary-h Oral Mucosa FB; Primary-rabbit FB; C6; Primary-rat Testes Sertoli; Primary-cow Arterial EC; Primary-pigHVEC; Primary-cow Nucleus Pulposus Cells; Primary-rat Ganglia Neuronal; Primary-dog Bladder SMC; Primary-Vasc SMC; 129/SV; Primary-pig Ear Chondrocyte; ED27; Primary-rabbit Bone B; Primary-h Brain Glioblast; Primary-rat Adipose Preadipocyte; Primary-h Cartilage Synov; Primary-rat Pancreas Insulin; Primary-hEC; Primary-sheep Aorta SMC; Primary-h Endometrium EpiC; U251; Primary-h Endometrium StC; Primary-pig Bladder SMC; Primary-h HVIintersticial C; Primary-pig Esoph SMC; Primary-h NP Neuronal; Primary-rabbit Aorta SMC; Primary-h NSC; Primary-rabbit CorneaFB; Primary-h oral Cancerous; Primary-rabbit Lig FB; Primary-h SC; Primary-rat BMOB-like; Primary-h Skeletal Muscle Myoblast; COS-7; C-28/12; HK-2; Primary-h Uterus Cancerous; Primary-rat Ventricle CM; Primary-h Vase EC; Primary-sheep Carotid Artery SMC; HCT-116; ROS 17/2.8; Primary-h Vocal FB; UMR-106; Primary-mouse Aorta SMC; H9; R1; Primary-rat Fetal Neuronal; Primary-chicken Ear EpiC; Huh7; Primary-rat Vasc SMC; Primary-h NP SC; ES-D3; IMR-90; Primary-rat Bladder SMC; 293T; Primary-h Foreskin VascularEC; Primary-h Placenta EC; Primary-h Lung EpiC; Primary-h Prostate EpiC; U-87 MG; Primary-dog Carotid Artery SMC; Primary-rabbit Cornea StC; Primary-dog ID Annulus Fibrosus; Primary-chicken Embryo Chondrocyte; Primary-EC; HFF; Vero; HFL-1; Primary-h Adipose FB; Primary-cow FB; Primary-h UTSMC; Primary-rat Ventricle FB; AH 927; Primary-sheep Vasc FB; DU-145; ST2; B16.F10; Primary-h Nasal EpiC; Primary-ID Annulus C; Primary-h Dental Pulp SC; 3H10T1/2; Primary-Heart Valve; Primary-h Bone Alveolar; Primary-rabbit Tendon FB; Primary-mouse Kidney Insulin; HEPM; Primary-baboon Aorta SMC; HTK; Primary-mouse MDSC; Primary-rat Esoph EpiC; Primary-mouse Nerve SC; Primary-h Fetus OB-like; Primary-mouse Skeletal Muscle SC; hFOB 1.19; Primary-Nerve Schwann; Primary-h Ganglia Neuronal; Caco-2; Primary-h Kidney Renal; Primary-h Breast EpiC; Primary-h Liver SC; Primary-pig Bladder Uro; Primary-h Lung EC; Primary-h Breast FB; Primary-sheep Jugular Vein EC; Primary-pig Esoph EpiC; Primary-h Lymph EC; Primary-chicken CC; Primary-h Lymph T Cell; Primary-h Colon Adenocarcinoma; Primary-h Mammary EC; Primary-pig Vocal FB; Primary-h Mammary EpiC; Primary-rabbit Adipose SC; Primary-h Cornea EC; H9c2; Primary-h UT StC; Primary-cat Heart CM; Primary-mouse Pancreas EpiC; HS-5; Primary-sheep Skeletal Muscle Fetus Myoblast; Primary-cow ID; Primary-mouse BM OCpre; Primary-cow Knee Meniscus C; Hep-3B; Primary-cow Lig FB; HL-1; HuS-E/2; RWPE1; Primary-cow Retina EpiC; Primary-h VascMyoFB; IEC-6; Primary-mouse Fetal Hep; HS68; OVCAR-3; Primary-dog Knee MeniscusC; Primary-rabbit Mesoderm Mes PreC; Primary-dog Lig FB; Primary-rat Lung Alveolar; Primary-dog Skin Keratinocyte; CRL-11372; Primary-dog Vase SMC; HMEC-1; Primary-Embryo SC; T-47D1; Pimary-goatCC; Primary-h UVSC-like; Primary-guineapig Ear EpiC; Primary-Ligament; Primary-guineapig Skin FB; Primary-mouse Cortical Neuronal; Primary-hAdipose Adipocyte; Primary-mouse Liver SC; Primary-h Adipose FB-like; CAL72; J774; P19; Primary-h Amniotic fluid; Primary-rabbit Cornea EC; Primary-h Amniotic FSC; Primary-rat BMFB-like; ARPE-19; Primary-rat Kidney Mesangial; K-562; Primary-rat Nasal Ensheathing; Primary-h Bladder StC; Primary-chicken Embryo Proepicardium; ATDC5; Primary-sheep FB; Kasumi-1; Primary-Skeletal Muscle; Primary-h Bone Mes PreC; HMT-3522; Primary-h Bone Periosteal; A431; Primary-h Brain EC; Primary-h UTFB; KLE; 143b OST; BALB/3T3; Primary-h Vasc FB; LLC-PKI; Primary-h Vasc Pericyte; BHK21-C13; Primary-Mammary EpiC; M.DUNNI; C4-2B; ZR-75; HEC-1B; Primary-h Gingiva Keratinocyte; U178; Primary-h HN Cancerous; Primary-mouse Mammary EpiC; Primary-h Keratinocyte; Primary-mouse Sciatic N Schwann; OVCA429; Primary-h Kidney EpiC; Primary-pig Esoph FB; MBA-15; Primary-pig Mandible FB-like; Primary-h Liver Cancerous; Primary-rabbit Bladder Uro; GD25beta1A; Primary-rabbit ID AnnulusC; HSC-T6; Primary-rabbit NP Neuronal; DOV13; HEY; Primary-h Mammary FB; HTB-94; BZR-T33; Primary-chicken CorneaFB; MiaPaCa2; Primary-rat Mucosa Ensheathing; Primary-hOvaryFB; Primary-rat Salivary Acinar; Primary-h Ovary Oocyte; Primary-rat Testes Germ; Primary-h Pancreas Cancerous; Primary-chicken Embryo StC; Primary-h Pancreas Stellate Cells; Primary-sheep Carotid Artery FB; MLO-Y4; Primary-chicken Retina SC-like; Primary-h Prostate Cancerous; Primary-chicken Ten TC; Primary-h Saph V Myo FB; Primary-Synoviocyte; MTLn3; Primary-Vasc EC; Primary-h Skeletal Muscle Pre; RT4-D6P2T; C2; SCA-9; HOC-7; T31; Primary-h UC EpiC; TR146; HCS-2/8; EA.hy926; Primary-rat Embryo; SW480; Primary-sheep Fetus CC; Primary-dog Pancreas Insulin; KS-IMM; BPH-1; Primary-rat Pancreas SC; M2139; RIN-5F; Primary-hGallbladderCancerous; E14/TG2a; M4E; HES3; G8; Primary-hConjunctivaFB; Primary-dogSaphVEC; LN CaP; Primary-dog Saph V SMC; M4T; Primary-h Fetus CC; BR-5;

Primary-pig UT Uro; Primary-Hippocampus Neuronal; PE-0041; Primary-dog Skin FB; Primary-rabbit Skeletal Muscle MyoBlast; Primary-cow Dental pulp; CGR8; Primary-dog Teeth PDL; Primary-rat Fetus Hep; Primary-dog Tendon FB; Primary-rat Mammary; Primary-h Knee C; Primary-rat SMC; BRC6; Primary-sheep Artery FB; Primary-dog Vasc EC; Primary-cow Mammary Alveolar; pZIP; 293 cell line; BMC9; Primary-h Lung Cancerous; SKOV-3; IOSE; TEC3; MCF-12A; Primary-rabbitBladderEpiC; Gli36DeltaEGFR; Primary-rabbit Conjunctiva EpiC; Primary-h Lung Neuronal; Primary-rabbit Endometrium EpiC; 1205Lu; Primary-rabbit MDSC; 3T3-A31; Primary-rabbit Tendon Tenocyte; MDA-MB-435; Primary-h Cancerous; Primary-cow EC; Primary-rat Cornea FB; Primary-EpiC; Primary-rat Fetal Cardiac; Primary-h Meninges Arachnoidal; COS-1; Primary-Eye; Primary-rat Liver Oval C; GLUTag-INS; Primary-rat Oral Mucosa Keratinocyte; GM3348; CRFK; 21NT; Primary-rat Testes EC; Primary-h Nasal FB; Primary-h Dura MaterSC; Primary-h Nasal OB; Primary-dog NP Neuronal; Primary-h Nasal Secretory; Primary-sheep Lung FB; AC-1M59; BHPrE1; MIN6; Primary-UT; MKN28; RAT-2; MLO-A5; RT112; CRL-2266; S91; GM5387; SK-ChA-1; Primary-horse CC; SPL201; Primary-horse Tendon FB; Primary-h Fetus Mes PreC; D283; Primary-pig Thyroid EpiC; H1299; Par-C10; AE-6; Primary-rabbit Blood Platelet; Primary-goat Carotid EC; Primary-rabbit Bone OC; Primary-goat Carotid FB; Primary-cow Cornea FB-like; Primary-h Pancreas SC; Primary-rabbit CT Pericyte; Primary-goat Carotid SMC; Primary-rabbit Esophagus SMC; Primary-h Parotid Acinar; Primary-baboon Blood EC; A498; Primary-h Bronchi SMC; Primary-h Placenta SC; Primary-rabbit Sphincter SMC; Primary-cow Retina SC; 7F2; MM-Sv/HP; A10; Primary-h Prostate StC; Primary-buffalo Embryo SC-like; Primary-h Salivary Cancerous; CHO-4; Primary-h Salivary Salisphere; Primary-rat Cortical Neuronal; H13; Primary-rat Embryo Neuronal; Primary-guineapig Pancreas EpiC; Primary-rat Fetal OB; H144; CNE-2; MPC-11; 21 PT; Primary-cow Synovium; Primary-rat Liver EC; Primary-cow Fetus CC; BEAS-2B; H2122; LM2-4; Detroit 551; C18-4; FLC4; Ishikawa; Primary-rat Skin Keratinocyte; H35; Primary-rat Tendon; Primary-h SMC; HTR8; Primary-h Synovial CC; E8.5; H460M; HL-60; MUM-2B; CRL-1213; MUM-2C; CRL-12424; W20-17; Lovo; Primary-dog Blood EC; Primary-sheep Nasal CC; HAK-2; Primary-sheep Skin FB; Primary-h Testes Sertoli; Primary-h Thyroid Cancerous; Primary-Trachea; Primary-h Trachea; LRM55; Primary-h UASC-like; Primary-Colon FB; Primary-hUASMC; r-CHO; HAT-7; RN22; HC-11; Primary-h Eye Vitreous; AEC2; S2-020; HCC1937; CRL-2020; AG1522; SCC-71; N18-RE-105; SK-N-AS; Primary-h Uterus SMC; SLMT-1; IMR-32; STO; NB4; Swan 71; Primary-h Alveolar Periosteum; Primary-dog Oral Mucosa EpiC; Primary-h Amnion EP; Primary-h Fetus Schwann; Primary-dog Bone OB; Primary-pig UTSMC; 184A1; Panc 1; NCTC 2544; 46C; Primary-cow Cornea EC; B6-RPE07; Primary-hamster EC; cBAL111; Primary-hamster Retina Neuronal; HEPA-1Clc7; NEB1; CCE; NHPrEl; Primary-rabbit Conjunctiva FB; 410; Hepa RG; Primary-Keratinocyte; PMC42-LA; Primary-dog Cartilage Synov; 21MT; NOR-P1; Primary-rabbit Endometrium StC; Primary-Lymphnode Lymphocyte; DLD-1; Primary-Lymphnode T Cell; Primary-rabbit Lacrimal Gland Acinar; AB2.1; primary-rabbit Lung Pneumocyte; Primary-monkey Embryo; ES-2; Primary-monkey Kidney FB-like; Primary-rabbit Penis SMC; Primary-mouse Adipose StC; Primary-rabbit Skin FB; NR6; Primary-Blood SC; Primary-mouse BM Macrophage; 786-0; AT2; Primary-rat Adrenal Chromaffin; AT3; CCF-STTGI; Primary-mouse Bone Calvarial; Primary-rat Bladder Uro; HCT-8/E11; CE3; Primary-mouse Brain Neuronal; CFK2; Primary-mouse Breast Cancerous; L6; Primary-mouse Chondrocytes; HeyA8; Primary-mouse Colon EpiC; Primary-rat Cortical Astrocyte; Primary-dog CFB; Primary-buffalo Ovary EpiC; Primary-dog Cornea Chondrocyte; Primary-rat Embryo CM; Primary-mouse Embryo Neuronal; A2780; C5.18; Primary-dog MV EpiC; Primary-mouse Esophagus SC; Primary-rat Fetal Renal; HEK001; A357; EFO-27; Primary-chicken Bone OB; Primary-mouse Fetal Lung; Primary-rat Heart SC-like; Primary-mouse Germ; Primary-rat Kidney; EN Stem-ATM; Primary-rat Lacrimal Acinar; U-251 MG; Primary-dog Myofibroblasts; A4-4; Primary-rat Liver SC-like; Primary-cow Brain EC; Primary-rat Lung FB; Primary-mouse Kidney Renal; BEL-7402; NT2; HIAE-101; Primary-h BM Mononuclear; Primary-rat Ovary; Primary-mouse Lymph FB-like; Primary-rat Pancreas Islets; Primary-dog Esophageal EpiC; Primary-rat Renal EpiC; Primary-mouse Mast; Primary-chicken Embryo Blastoderm; NTera2/c1.D1; G-415; Null; Primary-rat Small Intestine; Primary-mouse Ovary Cumulus C; Primary-rat Teeth SC-like; HEL-299; Primary-rat Tendon Tenocyte; KB; b-End-2; Primary-mouse Pancreas Insulin; Primary-rat Vase EC; Primary-mouse Salivary Salishere; Primary-h Duodenum EpiC; Primary-h Bone Fetus OB; Primary-Respiratory EpiC; Primary-mouse Skeletal Muscle Myoblast; Primary-sheep Amniotic fluid; OC2; Primary-chicken Heart CM; Daudi; Primary-sheep Artery MyoFB; Primary-mouse Skin Keratinocyte; Primary-sheep Bone OB-like; Primary-mouse Small Intestine; Primary-chicken Heart ECM; Primary-mouse Spleen T cell; LNZ308; Primary-mouse Teeth Odontoblast; Primary-sheep ID Annulus Fibrosus; Primary-mouse Testes SC; Primary-sheep Jugular Vein SMC; Primary-mouse Testes Sperm; Primary-sheep Lung SC; Primary-mouse UT Uro; Primary-sheep Saph VEC; Primary-mouse Uterus EpiC; Primary-sheep Skin EC; OCT-1; Primary-sheep Vasc EC; HELF; Primary-sheep Vasc SMC; CAC2; HL-7720; OPC1; Primary-Teeth PDL; Primary-dog Heart SC; Primary-UCB Mononuclear; Primary-pig Artery Carotid EC; Primary-h Endometriotic CystStC; Primary-pig Artery Carotid SMC; Primary-Colon Cancerous; Primary-pig Artery Coronary SMC; QCE-6; Primary-pig Bladder FB; R221A; OSCORT; LS180; B35; RIF-1; Calu-1; RL-65; Calu-3; Primary-cow Adrenal ChrC; B5/EGFP; RT-112; Primary-pigEC; RW.4; Primary-pig ESC; S2-013; OVCAR-5; S5Y5; Primary-h Bone OC-like; SA87; INT-407; SAV-I; Primary-pig Fetus Hep; SCC-68; P69; HNPSV-1; CaSki; SK-CO15; Primary-pig Iliac EC; SK-N-DZ; Hep2; SKOV31p.1; Primary-pig Mandible Ameloblast; SNB 19; Primary-cow Joint Synovial; Primary-h Fetus FB; Primary-pig Mandible Odontoblast; SW1353; Primary-pig NP Neuronal; SW948; Primary-pig Oral Mucosa EpiC; CRL-2102; Primary-pig Pancreas Islets; T4-2; Primary-pig PulmonarySMC; TE-85; Primary-pig Salivary Acinar; THP-1; Primary-pig SynoviumSC; BME-UV1; KG-1; D4T; HUES-9; Primary-mouse Hippocampus Neuronal; ECV304; NRK; Primary-mouse Kidney Mesangial; D407; 10T1/2 cell line; and Primary-h Foreskin Melanocyte.

The seeded cells may be diseased cell, e.g., cells exhibit one or more characteristic of a disease. For example, the diseased cells may be from or progeny of cells from a patient with a disease. The disease cells may also comprise one or more genetic variations related to a disease. For examples the disease may be diabetes. Diabetes refers to a disease characterized by high blood sugar levels over a prolonged period. Examples of diabetes include type 1, type 2, cystic fibrosis-related, surgical, gestational diabetes, and mitochondrial diabetes. In some cases, diabetes can be a form of hereditary diabetes.

The seeded cells may be aggregated by centrifugation, e.g., by centrifugation of the device containing the cells or multi-well plate containing the devices and/or cells. The centrifugation may be performed at a speed sufficient to form the aggregate but not cause significant damage to the cells. For example, the cells may be centrifuged up to 50×g, up to 100×g, up to 150×g, up to 200×g, up to 250×g, up to 300×g, up to 350×g, or up to 400×g.

After aggregation, the cells may be cultured for a period of time. For example, the cells may be allowed to further proliferate and/or differentiate as needed before use. In some cases, the cells are cultured for at least 1 day, at least 2 days, at least 3 days, at least 4 days, at least 6 days, at least 8 days, at least 10 days, at least 12 days, at least 14 days, at least 3 weeks, at least 4 weeks, at least 2 months, at least 3 months, at least 4 months, at least 5 months, at least 6 months, at least 8 months, at least 10 months, or at least 12 months.

Introducing Genetic Variations

One or more genetic variations may be introduced to one or more cells of the 3D cell culture. The genetic variations may be introduced to the 3D cell culture before or after the forming the 3D cell aggregate.

Various methods may be used for introducing the genetic variations. The genetic variations may be introduced by RNA targeting agents, such as RNAi, miRNA, or ribozyme. In some cases, the genetic variations may be introduced gene editing systems or components thereof. Examples of gene editing systems include CRISPR-Cas systems, zinc finger nuclease systems, TALEN systems, and meganuclease systems.

Examples of methods for introducing genetic variations using CRISPR-Cas systems include those described in Shalem O, et al., High-throughput functional genomics using CRISPR-Cas9, Nat Rev Genet. 2015 May; 16 (5): 299-311; Sanjana N E, et al., Genome-scale CRISPR pooled screens, Anal Biochem. 2017 Sep. 1; 532:95-99; Miles L A, et al., Design, execution, and analysis of pooled in vitro CRISPR/Cas9 screens, FEBS J. 2016 September; 283 (17): 3170-80; Ford K, et al., Functional Genomics via CRISPR-Cas, J Mol Biol. 2019 Jan. 4; 431 (1): 48-65.

The CRISPR-Cas systems may include those with additional functional domains and proteins, such as base editors (e.g., those described in Cox DBT, et al., RNA editing with CRISPR-Cas13, Science. 2017 Nov. 24; 358 (6366): 1019-1027; Abudayyeh O O, et al., A cytosine deaminase for programmable single-base RNA editing, Science 26 Jul. 2019: Vol. 365, Issue 6451, pp. 382-386; Gaudelli N M et al., Programmable base editing of A·T to G·C in genomic DNA without DNA cleavage, Nature volume 551, pages 464-471 (23 Nov. 2017); Komor A C, et al., Programmable editing of a target base in genomic DNA without double-stranded DNA cleavage. Nature. 2016 May 19; 533 (7603): 420-4; Jordan L. Doman et al., Evaluation and minimization of Cas9-independent off-target DNA editing by cytosine base editors, Nat Biotechnol (2020)), prime editing systems (e.g., those described in Anzalone A V et al., Search-and-replace genome editing without double-strand breaks or donor DNA, Nature. 2019 Oct. 21. doi: 10.1038/s41586-019-1711-4), CAST systems (e.g., those described in Strecker J et al., RNA-guided DNA insertion with CRISPR-associated transposases. Science. 2019 Jul. 5; 365 (6448): 48-53; Klompe S E, et al., Transposon-encoded CRISPR-Cas systems direct RNA-guided DNA integration. Nature. 2019 July; 571 (7764): 219-225).

Examples of methods for introducing genetic variations using other gene editing systems and RNAi include those described in Peng Y, et al., Making designer mutants in model organisms. Development. 2014 November; 141 (21): 4042-54; Carroll D, et al., Genome engineering with targetable nucleases, Annu Rev Biochem. 2014; 83:409-39; Govindan G, et al., Programmable Site-Specific Nucleases for Targeted Genome Engineering in Higher Eukaryotes. J Cell Physiol. 2016 November; 231 (11): 2380-92; Gaj T, et al., ZFN, TALEN, and CRISPR/Cas-based methods for genome engineering, Trends Biotechnol. 2013 July; 31 (7): 397-405.

Methods of Screening

The 3D cell cultures herein may be used for screening agents (e.g., chemical compounds or biologics) that have an impact on the cells. In general, the methods of screening comprise contacting the 3D cell cultures with one or more candidate molecules and assessing the effects of the candidates on one or more characteristics of the cells in the culture. Desired molecules may be selected based on the result of the assessment. For example, in the cases where the cells comprise pancreatic β cells, the cultures may be used to screen molecules promoting pancreatic β proliferation, survival, or function.

The present disclosure provides methods for high-throughput screening of perturbations in a 3D cell-culture environment. Such methods may comprise introducing individual perturbations or combinations of perturbations of a set of perturbations into the individual discrete volumes of the device herein; and determining a change in an initial cell state or phenotype of the 3D cell culture in each individual discrete volume, wherein the change in the initial state or phenotype of the 3D cell culture identifies a perturbation or combination of perturbations that result in a desired state or phenotype of the 3D cell culture. In some cases, the determination of a change in an initial state or phenotype of the 3D cell culture comprises performing gene and/or genome sequencing, a gene expression analysis, an epigenetic analysis, a cell phenotype analysis, a cell morphology analysis, a growth analysis, a differentiation analysis, a cell volume analysis, a cell viability analysis, a cell metabolism analysis, a cell communication or signal transduction analysis, a cell reproduction analysis, a cell response analysis, a cell production or secretion analysis, a cell function analysis, an insulin secretion analysis, assessment of architecture of the 3D cell culture, or a combination thereof.

Examples of agents that may be identified or screened using the compositions, systems, devices, and methods include small molecules, nucleic acids, polypeptides, peptides, drugs, ions and salts thereof. An agent may be any chemical, entity or moiety, including without limitation synthetic and naturally-occurring proteinaceous and non-proteinaceous entities. In some embodiments, an agent is nucleic acid, nucleic acid analogues, proteins, antibodies, peptides, aptamers, oligomer of nucleic acids, amino acids, or carbohydrates including without limitation proteins, oligonucleotides, ribozymes, DNAzymes, glycoproteins, siRNAs, lipoproteins, aptamers, and modifications and combinations thereof. In certain embodiments, agents are small molecules having a chemical moiety. For example, chemical moieties include unsubstituted or substituted alkyl, aromatic, or heterocyclyl moieties including macrolides, leptomycins and related natural products or analogues thereof. Compounds can be known to have a desired activity and/or property, or can be selected from a library of diverse compounds. The agents also include the gene editing systems or components thereof, e.g., CRISPR-Cas systems.

In some embodiments, the methods comprise screening a library of compounds or biologic molecules (e.g., polynucleotides or nucleic acids). The library may be a library of polynucleotides, e.g., libraries of natural polypeptides in the form of bacterial, fungal, plant, and animal extracts or modified forms thereof. The natural and synthetically produced libraries are produced, according to methods known in the art, e.g., by standard extraction and fractionation methods. Examples of methods for the synthesis of molecular libraries can be found in the art, for example in: DeWitt et al., Proc. Natl. Acad. Sci. U.S.A. 90:6909, 1993; Erb et al, Proc. Natl. Acad. Sci. USA 91:11422, 1994; Zuckermann et al., J. Med. Chem. 37:2678, 1994; Cho et al, Science 261:1303, 1993; Carrell et al, Angew. Chem. Int. Ed. Engl. 33:2059, 1994; Carell et al, Angew. Chem. Int. Ed. Engl. 33:2061, 1994; and Gallop et al, J. Med. Chem. 37:1233, 1994. Furthermore, if desired, any library or compound is readily modified using standard chemical, physical, or biochemical methods.

Numerous methods are also available for generating random or directed synthesis (e.g., semi-synthesis or total synthesis) of any number of polypeptides, chemical compounds, including saccharide-, lipid-, peptide-, and nucleic acid-based compounds. Synthetic compound libraries are commercially available from Brandon Associates (Merrimack, N.H.) and Aldrich Chemical (Milwaukee, Wis.). Alternatively, chemical compounds to be used as candidate compounds can be synthesized from readily available starting materials using standard synthetic techniques and methodologies known to those of ordinary skill in the art. Synthetic chemistry transformations and protecting group methodologies (protection and deprotection) useful in synthesizing the compounds identified by the methods described herein are known in the art and include, for example, those such as described in R. Larock, Comprehensive Organic Transformations, VCH Publishers (1989); T. W. Greene and P. G. M. Wuts, Protective Groups in Organic Synthesis, 2nd ed., John Wiley and Sons (1991); L. Fieser and M. Fieser, Fieser and Fieser's Reagents for Organic Synthesis, John Wiley and Sons (1994); and L. Paquette, ed., Encyclopedia of Reagents for Organic Synthesis, John Wiley and Sons (1995), and subsequent editions thereof. Libraries of compounds may be presented in solution, or on beads, chips, bacteria, spores, plasmids or on phage. Such compounds and molecules libraries may be used in the screening methods herein.

Candidate agents of interest for screening also include nucleic acids, for example, nucleic acids that encode siRNA, shRNA, antisense molecules, or miRNA, or nucleic acids that encode polypeptides. Many vectors useful for transferring nucleic acids into target cells are available. The vectors may be maintained episomally, e.g. as plasmids, minicircle DNAs, virus-derived vectors such cytomegalovirus, adenovirus, etc., or they may be integrated into the target cell genome, through homologous recombination or random integration, e.g. retrovirus derived vectors such as MMLV, HIV-1, ALV, etc. Vectors may be provided directly to the subject cells. In other words, the pluripotent cells are contacted with vectors comprising the nucleic acid of interest such that the vectors are taken up by the cells.

Candidate agents of interest for screening also include polypeptides. Such polypeptides may optionally be fused to a polypeptide domain that increases solubility of the product. Examples of such domains include endosomolytic domains, e.g. influenza HA domain; and other polypeptides that aid in production, e.g. IF2 domain, GST domain, GRPE domain, and the like. In some cases, the polypeptide may comprise the polypeptide sequences of interest fused to a polypeptide permeant domain. A number of permeant domains are known in the art and may be used in the non-integrating polypeptides of the present invention, including peptides, peptidomimetics, and non-peptide carriers. The polypeptide may be formulated for improved stability. For example, the peptides may be PEGylated, where the polyethyleneoxy group provides for enhanced lifetime in the blood stream. The polypeptide may be fused to another polypeptide to provide for added functionality, e.g. to increase the in vivo stability. The candidate polypeptide agent may be produced from eukaryotic produced by prokaryotic cells, it may be further processed by unfolding, e.g. heat denaturation, DTT reduction, etc. and may be further refolded.

In some cases, the candidate polypeptide agents to be screened are antibodies. The term "antibody" or "antibody moiety" is intended to include any polypeptide chain-containing molecular structure with a specific shape that fits to and recognizes an epitope, where one or more non-covalent binding interactions stabilize the complex between the molecular structure and the epitope. The specific or selective fit of a given structure and its specific epitope is sometimes referred to as a "lock and key" fit. The archetypal antibody molecule is the immunoglobulin, and all types of immunoglobulins, IgG, IgM, IgA, IgE, IgD, etc., from all sources, e.g. human, rodent, rabbit, cow, sheep, pig, dog, other mammal, chicken, other avian, etc., are considered to be "antibodies." Antibodies utilized in the present invention may be either polyclonal antibodies or monoclonal antibodies. Antibodies are typically provided in the media in which the cells are cultured.

One or more of parameters or characteristics of the cells in the cell culture may be assessed. Examples of the parameters or characteristics include proliferation/growth, differentiation, gene expression, proteome, phenotype with respect to markers etc. of the cells and any cell component or cell product including cell surface determinant, receptor, protein or conformational or posttranslational modification thereof, lipid, carbohydrate, organic or inorganic molecule, nucleic acid, e.g. mRNA, DNA, etc. or a portion derived from such a cell component or combinations thereof. The assessment may give a quantitative result. In some instances a semi-quantitative or qualitative result of the assessment may be used. Readouts may include a single determined value, or may include mean, median value or the variance, etc. Characteristically a range of parameter readout values may be obtained for each parameter from a multiplicity of the same assays. Variability may be expected and a range of values for each of the set of test parameters may be obtained using standard statistical methods with a common statistical method used to provide single values.

The methods may be used for determining the therapeutic effects of one or more agents (e.g., on functions of pancreatic β cells). The term "therapeutic effect" refers to some extent of relief of one or more of the symptoms of a disorder or its associated pathology. The methods may further be used to determine an therapeutically effective amount of an agent. "Therapeutically effective amount" as used herein refers to an amount of an agent which is effective, upon single or multiple dose administration to the cell or subject, in prolonging the survivability of the patient with such a disorder, reducing one or more signs or symptoms of the disorder, preventing or delaying, and the like beyond that expected in the absence of such treatment. "Therapeutically effective amount" is intended to qualify the amount required to achieve a therapeutic effect. A physician or veterinarian having ordinary skill in the art can readily determine and prescribe the "therapeutically effective amount" (e.g., ED0 of the pharmaceutical composition required. For example, the physician or veterinarian could start doses of the compounds of the invention employed in a pharmaceutical composition at levels lower than that required in order to achieve the desired therapeutic effect and gradually increase the dosage until the desired effect is achieved.

The 3D cell cultures herein may be used to perform various screenings and assays. In some examples, the 3D cell cultures may be used in an assay to identify one or more candidate agents which promote or inhibit a cell's fate, e.g., cell proliferation, replication, cell death, cell function, cell susceptibility to immune attack, and cell susceptibility to dedifferentiation or differentiation. In some examples, the 3D cell cultures may be used in an assay to identify one or more candidate agents which promote the differentiation of at least one insulin-positive endocrine cell or a precursor thereof into at least one pancreatic β cell. The assays may involve contacting the the 3D cell cultures, with one or more candidate agents to be assessed for its ability to i) promote or inhibit a β cell fate, e.g., β cell proliferation, β cell replication, β cell death, β cell function, B cell susceptibility to immune attack, and β cell susceptibility to dedifferentiation or differentiation, or ii) promoting the differentiation of at least one insulin-positive endocrine cell or a precursor thereof into at least one pancreatic β cell and assessing whether the candidate agent possesses the ability to i) promote or inhibit a pancreatic β cell fate, e.g., β cell proliferation, β cell replication, β cell death, β cell function, β cell susceptibility to immune attack, and β cell susceptibility to dedifferentiation or differentiation, or ii) promoting the differentiation of at least one insulin-positive endocrine cell or a precursor thereof into at least one pancreatic β cell.

In some examples, the assay is an assay of cell proliferation. Such assays may be used in screening agents that promote or inhibit cell proliferation. The speed of proliferation may be assessed by measuring the cell population doubling level. The population doubling level refers to the total number of times the cells in the population have doubled since their primary isolation in vitro. The population doubling level can be determined by cell counting. Alternatively, the speed of proliferation can be assessed by a cellular proliferation assay, for example in which specific fluorescent probes measure DNA synthesis activity by BrdU incorporation and cell proliferation state by Ki67 expression (Thermo Scientific* Cellomics, Millipore).

The proliferation speed may be controlled by adjusting factors such as passage number, culture conditions, seeding density etc.

In some examples, the cells in the 3D cell culture herein may have an average population doubling time of from 6 to 48 hours, from 12 to 36 hours, from 18 to 30 hours, approximately 24 hours, from 12 to 96 hours, from 24 to 72 hours, or approximately 72 hours. In another embodiment, the cells population doubles on average more than once, more than twice, more than three times, more than four times or more than five times a week.

A plurality of assays may be run in parallel with different agent concentrations to obtain a differential response to the various concentrations. As known in the art, determining the effective concentration of an agent typically uses a range of concentrations resulting from 1:10, or other log scale, dilutions. The concentrations may be further refined with a second series of dilutions, if necessary. Typically, one of these concentrations serves as a negative control, i.e. at zero concentration or below the level of detection of the agent or at or below the concentration of agent that does not give a detectable change in the growth rate.

In some embodiments, the culture may be analyzed in vivo. For example, methods of in vivo analysis include various methods where the culture or cells thereof are transferred to an in vivo environment. In some embodiments, the culture or cells thereof may be implanted into the organ or subcutaneously into an experimental animal, e.g. syngeneic or immunodeficient mice, then allowed to grow for a suitable period of time, e.g. at least about 1 week, at least about 2 weeks, at least about 3-4 weeks, at least about 1, 2, 3, 4 or more months, etc. This assay can be modified to utilize various marker systems, e.g. luciferase expressing cells that permit periodic non-invasive imaging after luciferin injection. Growth and serial transplantability is compared between explants with and without candidate cells.

In some embodiments, the screening assays appropriate to the cell type and agent and/or environmental factor will be used in the methods. For example, changes in cell morphology may be assayed by standard light, or electron microscopy. The effects of treatments by the agent potentially affecting the expression of one or more genes may be assayed by measuring the expression level of the genes. As another example, the effects of treatments or compounds which potentially alter the pH or levels of various ions within cells may be assayed using various dyes which change in color at determined pH values or in the presence of particular ions. The use of such dyes is well known in the art. For cells which have been transformed or transfected with a genetic marker, such as the β-galactosidase, alkaline phosphatase, or luciferase genes, the effects of treatments or compounds may be assessed by assays for expression of that marker. In particular, the marker may be chosen so as to cause spectrophotometrically assayable changes associated with its expression.

In some embodiments, the disclosure provides a method for assessing the metabolism of a therapeutic agent by one or more types of cell in the composition or system. The method may comprise exposing the composition or system to a candidate agent, and determining the effect of the neuronal cells on the agent. For example, the effect may be measured by detecting, identifying, and/or quantifying metabolites of the agent.

The method may further comprise effects of the agent on expression and activity of genes or gene products. Detection of changes in expression of genes and/or gene products can be assayed by any method known in the art including immunohistochemistry, immunofluorescence, flow cytometry, polymerase chain reaction (PCR), quantitative PCR, real-time PCR, gene expression array, mRNA sequencing, high-throughput sequencing, Western blot, Northern blot, and ELISA.

In some cases, the contacting step refers to incubating the agent and composition/system together in vitro. The composition or system contacted with an agent can also be simultaneously or subsequently contacted with another agent. In some embodiments, the composition or system is contacted with at least two, at least three, at least four, at least five, at least six, at least seven, at least eight, at least nine, or at least ten agents.

High Throughput Screens

In some embodiments, the cell cultures, devices, systems, and methods may be used for high throughput screening. By "high-throughput", it is meant the screening of large numbers of candidate agents or candidate cells simultaneously for an activity or feature of interest. By large numbers, it is meant screening at least 5, at least 10, at least 20, at least 40, at least 60, at least 80, at least 100, at least 200, at least 300, at least 400, at least 500, at least 600, at least 800, at least 1000, at least 2000, at least 3000, at least 4000, or at least 5000 candidate agents.

In some embodiments, the high throughput screen may be formatted based upon the numbers of wells of the tissue culture plates used, e.g. using one or more 24-well, 48-well, 96-well, 384-well, 1536-well, or 3456-well plates. High throughput screens formatted in this way may be achieved by using, for example, transwell inserts, e.g., devices with wells with permeable supports, e.g. microporous membranes, that are designed to fit inside the wells of a multiwell tissue culture dish. In some instances, the transwells are used individual. In some instances, the transwells are mounted in special holders to allow for automation and ease of handling of multiple transwells at one time.

Screening of Agents Affecting Pancreatic β Cells

In some examples, the therapeutic effect may be the effect on pancreatic β cells proliferation. In some examples, the therapeutic effect may be the effect on pancreatic β cells' response to insulin (e.g., GSIS).

In some embodiments, the methods are used for screening compounds with a therapeutic agent for treating diabetes. In some embodiments, the therapeutic agent promotes β-cell proliferation. In other embodiments, the therapeutic agent increases insulin secretion. In some embodiments, the therapeutic agent provides protection from β-cell death. In other embodiments, the therapeutic agent is an inhibitor of cytokine-induced β-cell apoptosis. In some embodiments, the therapeutic agent prevents glucolipotoxicity-induced β-cell apoptosis.

In some embodiments, the candidate compounds from which the therapeutic agent is identified include CMGC kinase inhibitors. Examples of CMGC kinase may be DYRKIA, DYRKIB, DYRK2, CLK1, CLK2, and CLK4. In some embodiments, the therapeutic agent is a DYRKIA inhibitor. In some embodiments, the therapeutic agent is 5-IT or harmine.

In some embodiments, the therapeutic agent is an elastase inhibitor. Human neutrophil elastase (hNE), a member of the chymotrypsin superfamily of serine proteases is a 33-KDa enzyme stored in the azurophilic granules of the neutrophils. In neutrophils the concentration of NE exceeded 5 mM and its total cellular amount has been estimated to be up to 3 pg. Upon activation, NE is rapidly released from the granules into the extracellular space with some portion remaining bound to neutrophil plasma membrane (See Kawabat et al. 2002, Eur. J. Pharmacol. 451, 1-10). The main intracellular physiological function of NE is degradation of foreign organic molecules phagocytosed by neutrophils, whereas the main target for extracellular elastase is elastin (Janoff and Scherer, 1968, J. Exp. Med. 128, 1137-1155). In some embodiments, the elastase inhibitor is serpinB1.

In some embodiments, the therapeutic agent is selected from the group consisting of: insulin analogues, pramlintide, metformin, sulphonylureas, meglitinides, thiazolidinediones (TZDs), glucagon-like peptide 1 (GLP1) analogues, dipeptidyl peptidase 4 (DPP4) inhibitors, alpha-glucosidase inhibitors, sodium-dependent glucose cotransporter 2 (SGLT2) inhibitors, bromocriptine, diarylamide WS6, adenosine kinase inhibitor 5-iodotubercidin (5-IT), adenosine receptor agonist 5'-N-ethylcarboxamidoadenosine (NECA), sulphonylureas, TAK-875, gliptins, TUG891, AMG-151, MBX-2982, vorinostat, IL-1 receptor agonist anakinra, and HDAC inhibitors. In some embodiments, the therapeutic agent is selected from the group consisting of: DYRKIA inhibitors, elastase inhibitors, BRD0476, BRD3308, harmine, leucettine, 5-IT, sivelestat, and GNF4877.

In some embodiments, the candidate agents are diagnostic agents for diabetes. In some embodiments, the diagnostic agent binds to a protein of the β-cells, and the expression of the protein can be used to diagnose diabetes, for example by its correlation to insulin secretion. In some embodiments, the diagnostic agent binds to a pancreatic zinc transporter, for example, ZnT8. In some embodiments, the diagnostic agent comprises a detectably labeled moiety that can be used to detect the expression level of the ZnT8 protein. In some embodiments, the detectably labeled moiety is a fluorophore. Upon binding of the prodrug to β-cell, the diagnostic agent is released by zinc catalyzed ester, amide, or thioester group cleavage, and binds to ZnT8. Thus, the expression level of ZnT8 can be detected via the detection of the fluorophore, and which is known to correlate with insulin secretion and thus can be used to diagnose diabetes. See Huang et al., J. Bio. Chem. (2017) 292 (10): 4034-4043.

In some embodiments, the candidate agents are imaging agents, which can be used to detect and/or monitor β-cells. In some embodiments, the cargo compound comprises a fluorescent molecule. Upon binding of the prodrug to β-cell, the imaging agent is released by zinc catalyzed ester, amide, or thioester group cleavage, and allows imaging of the β-cell. In some embodiments, the imaging agent binds to a biomarker for islet beta cell, for example, GLP-1. In some embodiments, the imaging agent comprises a detectably labeled moiety that can be used to detect the expression level of the GLP-1 protein. In some embodiments, the detectably labeled moiety is a fluorophore. In some embodiments, upon binding of the prodrug to β-cell, the imaging agent is released by zinc catalyzed ester, amide, or thioester group cleavage, and binds to GLP-1. Thus, the expression level of GLP-1 can be detected via the detection of the fluorophore. See Li et al., Bioconjugate Chem. (2015) 26:1443-1450.

Zinc Prodrugs

In some examples, the cell cultures, devices, systems, and methods may be used to screen libraries of zinc prodrugs. Zinc products are prodrugs comprising a chelating ligand having a selective affinity for at least one metal cation linked to a cargo compound via an ester, amide, or thioester group, wherein binding of the metal cation to the chelating ligand catalyzes cleavage of the ester, amide, or thioester group and release of the cargo compound. In some embodiments, the prodrug is represented by (Car-H) m-S-(L) n (I-A), wherein L comprises a chelating ligand having a selective affinity for $Zn^{2+}$; S is a scaffold that comprises an optionally substitute aromatic or heteroaromatic ring or fused rings; H is a heteroatom selected from O, N, and S, which may be part of the aforementioned aromatic or heteroaromatic ring or fused rings; Car comprises (i) a cargo compound and optionally (ii) a self-immolative linker interconnecting the cargo group and H, wherein (i) or (ii) comprising an acyl group covalently bound to H to form an ester, amide, or thioester group; and each of m and n is at least one (e.g., 1, 2, 3, 4), wherein binding of Zn2+ to the chelating ligand catalyzes cleavage of the ester, amide, or thioester group and release of the cargo compound.

In some embodiments, the prodrug is represented by Formula I-B: Car-$H_2$-SIM-$H_1$-S-L (I-B), wherein L comprises a chelating ligand having a selective affinity for $Zn^{2+}$; S is a scaffold that comprises a first optionally substituted aromatic or heteroaromatic ring or fused rings; Car is a cargo group that may comprises a second optionally substituted aromatic or heteroaromatic ring or fused rings; $H_1$ and $H_2$ are each a heteroatom independently, e.g. selected from O, N, and S, wherein $H_1$ may be part of the first aromatic or heteroaromatic ring or fused rings, and $H_2$ may be part of the second aromatic or heteroaromatic ring or fused rings; wherein SIM is a self-immolative linker comprising a first acyl group covalently bound to $H_1$ to form an ester, amide, or thioester group and a second acyl group covalently bound to $H_2$ to form an ester, amide, or thioester group. In some embodiments, $H_1$ and $H_2$ are each independently selected from O and N.

In some embodiments, the self-immolative linker can be linked to the chelating ligand via an ester, amide, or thioester group (which encompasses a carbamate, urea, carbonate, carbonothioate, or carbamothioate group linking the self-immolative linker and the chelating ligand), and the self-immolative linker can also be linked to the cargo group via an ester, amide, or thioester group (which encompasses a carbamate, urea, carbonate, carbonothioate, or carbamothioate group linking the self-immolative linker and the cargo group). In some embodiments wherein the prodrug does not comprise a self-immolative linker, the cargo group can be linked to the chelating ligand via an ester, amide, or thioester group (which encompasses a carbamate, urea, carbonate, carbonothioate, or carbamothioate group linking the cargo group and the chelating ligand). In some embodiments, the self-immolative linker comprises at least one optionally substituted aromatic or heteroaromatic ring or fused rings for improving stability. Self-immolative linkers are described in DeWit et al., J. Am. Chem. Soc. 131:18327-18334 (2009); Blencowe et al., Polym. Chem. 2:773-790 (2011); Wei Sheng, Self-Immolative Chemistry: Structural Features and Applications in Designing Smart Materials (Mich. St. Univ. Jan. 15, 2014, available at www2.chemistry.msu.edu/courses/cem958/FS13_SS14/Wei_Sheng.pdf), each of which is incorporated by reference in its entirety.

Examples of zinc prodrugs that can be screened include those described in WO 2018/195486, which is incorporated by reference in its entirety.

The agents identified from the screening may be used for selective delivery of a cargo compound to β cells in vivo. Such methods comprise administering the agent to a subject in need thereof, wherein binding of Zn2+ to the chelating ligand of the prodrug in the β cells catalyzes cleavage of the ester, amide, or thioester group, thereby releasing the cargo compound in the β cells.

In some cases, the agents identified from the screening may be used for treating diabetes. The methods may comprise comprising administering the agent to a subject in need thereof, wherein binding of Zn2+ to the chelating ligand of the prodrug in the β cells catalyzes cleavage of the ester, amide, or thioester group, thereby releasing the therapeutic agent in the β cells.

In some cases, the agents identified from the screening may be used for promoting β cell proliferation and/or regeneration, comprising administering the agent to a subject in need thereof, wherein binding of Zn2+ to the chelating ligand in the β cells catalyzes cleavage of the ester, amide, or thioester group, thereby releasing the therapeutic agent in the β cells.

Additional Exemplary Applications

The cell cultures, devices, systems, or methods herein may be used for a variety of applications, e.g., studying the biology of the cells and corresponding tissues or organs, generating disease models, treating diseases, etc.

Disease Models

In some embodiments, the 3D cell culture may be used as a disease model, e.g., for studying the effects of mutations on the organism, for example, plant, animal, or cell and development and/or progression of the disease using measures commonly used in the study of the disease. Alternatively, such a disease model is useful for studying the effect of an active compound on the disease.

Examples of diseases include diabetes, obesity, cardiovascular diseases, lung diseases, liver diseases, skin diseases, or neurological disorders, or metabolic disorders. In some examples, the diseases may be pancreatic diseases such as pancreatic cancer, intraductal papillary mucinous neoplasm (IPMN), mucinous cystic neoplasm (MCN), serous cystic neoplasm (SCN), neuroendocrine tumor (NET), chronic pancreatitis (CP) and acute pancreatitis. In some cases, the 3D cell culture may be used for making models of the diseases described herein. The disease models may be generated using the diseased cells described herein.

In some embodiments, the disease models may be generated by contacting disease-inducing agents with the 3D cell culture. For example, diabetes models may be generated by contacting the 3D cell culture with free fatty acids (FFAs), glucose, and cytokines (in particular, high levels of glucose and/or high levels of FFAs).

In certain embodiments, disease models may be generated by co-culturing the 3C cell culture with diseased cells, e.g., pancreatic cancer cells, stellate cells and immune cells to create a human pancreatic cancer microenvironment in vitro.

In some methods, the disease model can be used to assess the efficacy of a potential gene therapy strategy. That is, a disease-associated gene or polynucleotide can be modified such that the disease development and/or progression is inhibited or reduced. In particular, the method comprises modifying a secretory protein with a polynucleotide such that protein from the inserted polynucleotide is produced and, as a result, the organism or cell has an altered response. Accordingly, in some methods, a genetically modified cell or organism may be compared with cell or organism predisposed to development of the disease such that the effect of the gene therapy event may be assessed.

The 3D cell culture may provide a model for studying the effects of the protein expression on a cellular function of interest. For example, a cellular function model may be used to study the effect of a modified target sequence on intracellular signaling or extracellular signaling. Alternatively, a cellular function model may be used to study the effects of a modified sequence on sensory perception. In some such models, one or more target sequences associated with a signaling biochemical pathway in the model are modified.

An altered expression of one or more peptides or proteins associated with a signaling biochemical pathway can be determined by assaying for a difference in the levels of the corresponding protein expressions between the test model cell and a control cell, when they are contacted with a candidate agent. Alternatively, the differential expression associated with a signaling biochemical pathway is determined by detecting a difference in the level of the encoded polypeptide.

Identification of Genes and Variations

In some embodiments, the 3D cell culture may be used to identify genes and variations thereof related to a disease, e.g., diabetes and other metabolic disorders related to pancreatic cell functions and proliferation. For example, one or more genetic variations may be introduced to the 3D cell culture, the growth rates, transcriptional states, cellular lineages and hierarchies, cell morphologies, cell-microenvironmental interactions, insulin secretion, sensitivity to glucose stimulation, etc., may be tested. The results may then be compared to a control, e.g., a counterpart composition or system in which no such genetic variation is introduced. Role of the variations and modified genes may be then determined based on the comparison.

In certain embodiments, genes are screened by perturbation of target genes within the cells in the cell culture. Methods and tools for genome-scale screening of perturbations include perturb-seq (see e.g., Dixit et al., "Perturb-Seq: Dissecting Molecular Circuits with Scalable Single-Cell RNA Profiling of Pooled Genetic Screens" 2016, Cell 167, 1853-1866; and Adamson et al., "A Multiplexed Single-Cell CRISPR Screening Platform Enables Systematic Dissection of the Unfolded Protein Response" 2016, Cell 167, 1867-1882; Joung J et al, Genome-scale CRISPR-Cas9 knockout and transcriptional activation screening. Nat Protoc. 2017 April; 12 (4): 828-863; Aregger M et al., Pooled Lentiviral CRISPR-Cas9 Screens for Functional Genomics in Mammalian Cells. Methods Mol Biol. 2019; 1869:169-188). Examples of the such methods also include those for introducing genetic variations described herein.

In certain embodiments, genes may be perturbed in single cells and gene expression analyzed. Not being bound by a theory, networks of genes that are disrupted due to perturbation of a signature gene may be determined. Understanding the network of genes effected by a perturbation may allow for a gene to be linked to a specific pathway that may be targeted to modulate the signature and treat a disease. Thus, in certain embodiments, perturb-seq is used to discover novel drug targets to allow treatment of the modeled disease.

In some embodiments, the method comprises (1) introducing single-order or combinatorial perturbations to the cell culture (e.g., before or after the cells form the 3D culture), (2) measuring genomic, genetic, proteomic, epigenetic and/or phenotypic differences in single cells and/or (3) assigning a perturbation(s) to the single cells.

The perturbations may comprise genetic perturbations, chemical agents, environment factors, or a combination thereof. In some embodiments, the set of perturbations comprises chemical agents affecting cell proliferation, e.g., pancreatic β cell mitogens. In some cases, the set of perturbations comprise a library of chemical agents comprising a Zinc-chelating group.

A perturbation may be linked to a phenotypic change, e.g., changes in gene or protein expression. In some embodiments, measured differences that are relevant to the perturbations are determined by applying a model accounting for co-variates to the measured differences. The model may include the capture rate of measured signals, whether the perturbation actually perturbed the cell (phenotypic impact), the presence of subpopulations of either different cells or cell states, and/or analysis of matched cells without any perturbation.

As discussed herein, differentially expressed genes/proteins, or differential epigenetic elements may be differentially expressed on a single cell level, or may be differentially expressed on a cell population level. Preferably, the differentially expressed genes/proteins or epigenetic elements as discussed herein, such as constituting the gene signatures, when as to the cell population level, refer to genes that are differentially expressed in all or substantially all cells of the population (such as at least 80%, preferably at least 90%, such as at least 95% of the individual cells). This can allow one to define a particular subpopulation of cells. As referred to herein, a "subpopulation" of cells preferably refers to a particular subset of cells of a particular cell type which can be distinguished or are uniquely identifiable and set apart from other cells of this cell type. The cell subpopulation may be phenotypically characterized, and is preferably characterized by the signature as discussed herein. A cell (sub) population as referred to herein may constitute of a (sub) population of cells of a particular cell type characterized by a specific cell state.

When referring to induction, or alternatively suppression of a particular signature, preferable is meant induction or alternatively suppression (or upregulation or downregulation) of at least one gene/protein and/or epigenetic element of the signature, such as for instance at least to, at least three, at least four, at least five, at least six, or all genes/proteins and/or epigenetic elements of the signature.

The genes or genetic variations may be assays by sequencing.

In certain embodiments, the measuring of phenotypic differences and assigning a perturbation to a single cell is determined by performing single cell RNA sequencing (RNA-seq). In preferred embodiments, the single cell RNA-seq is performed by any method as described herein (e.g., Drop-seq, InDrop, 10× genomics). In certain embodiments, unique barcodes are used to perform Perturb-seq. In certain embodiments, a guide RNA is detected by RNA-seq using a transcript expressed from a vector encoding the guide RNA. The transcript may include a unique barcode specific to the guide RNA. Not being bound by a theory, a guide RNA and guide RNA barcode is expressed from the same vector and the barcode may be detected by RNA-seq.

ScRNA-seq may be obtained from cells using standard techniques known in the art. Some exemplary scRNA-seq techniques are discussed elsewhere herein. As discussed elsewhere herein, a collection of mRNA levels for a single cell can be called an expression profile (or expression signature) and is often represented mathematically by a vector in gene expression space. See e.g. Wagner et al., 2016. Nat. Biotechnol; 34 (111): 1145-1160. This is a vector space that has a dimension corresponding to each gene, with the value of the ith coordinate of an expression profile vector representing the number of copies of mRNA for the ith gene. Note that real cells only occupy an integer lattice in gene expression space (because the number of copies of mRNA is an integer), but it is assumed herein that cells can move continuously through a real-valued G dimensional vector space.

Generating cell barcodes is described herein for single cell sequencing methods. In certain embodiments, a Unique Molecular Identifier (UMI) is added to each individual transcript and protein capture oligonucleotide. Not being bound by a theory, the UMI allows for determining the capture rate of measured signals, or preferably the binding events or the number of transcripts captured. Not being bound by a theory, the data is more significant if the signal observed is derived from more than one protein binding event or transcript. In preferred embodiments, Perturb-seq is performed using a guide RNA barcode expressed as a polyadenylated transcript, a cell barcode, and a UMI.

In some embodiment, the method further comprise performing epigenetic screening. In some examples, epigenetic screening is performed by applying CRISPRa/i/x technology (see, e.g., Konermann et al. "Genome-scale transcriptional activation by an engineered CRISPR-Cas9 complex" Nature. 2014 Dec. 10. doi: 10.1038/nature14136; Qi, L. S., et al. (2013). "Repurposing CRISPR as an RNA-guided platform for sequence-specific control of gene expression". Cell. 152 (5): 1173-83; Gilbert, L. A., et al., (2013). "CRISPR-mediated modular RNA-guided regulation of transcription in eukaryotes". Cell. 154 (2): 442-51; Komor et al., 2016, Programmable editing of a target base in genomic DNA without double-stranded DNA cleavage, Nature 533, 420-424; Nishida et al., 2016, Targeted nucleotide editing using hybrid prokaryotic and vertebrate adaptive immune systems, Science 353 (6305); Yang et al., 2016, Engineering and optimizing deaminase fusions for genome editing, Nat Commun. 7:13330; Hess et al., 2016, Directed evolution using dCas9-targeted somatic hypermutation in mammalian cells, Nature Methods 13, 1036-1042; and Ma et al., 2016, Targeted AID-mediated mutagenesis (TAM) enables efficient genomic diversification in mammalian cells, Nature Methods 13, 1029-1035).

Numerous genetic variants associated with disease phenotypes are found to be in non-coding region of the genome, and frequently coincide with transcription factor (TF) binding sites and non-coding RNA genes. Not being bound by a theory, CRISPRa/i/x approaches may be used to achieve a more thorough and precise understanding of the implication of epigenetic regulation. In one embodiment, a CRISPR system may be used to activate gene transcription. A nuclease-dead RNA-guided DNA binding domain, e.g., dCas, tethered to transcriptional repressor domains that promote epigenetic silencing (e.g., KRAB) may be used for "CRISPRi" that represses transcription. To use dCas as an activator (CRISPRa), a guide RNA is engineered to carry RNA binding motifs (e.g., MS2) that recruit effector domains fused to RNA-motif binding proteins, increasing transcription. A key dendritic cell molecule, p65, may be used as a signal amplifier, but is not required.

In one embodiment, CRISPR-Cas systems may be used to perturb protein-coding genes or non-protein-coding DNA. CRISPR-Cas systems may be used to knockout protein-coding genes by frameshifts, point mutations, inserts, or deletions. An extensive toolbox may be used for efficient and specific CRISPR-Cas systems mediated knockout as described herein, including a double-nicking CRISPR to efficiently modify both alleles of a target gene or multiple target loci and a smaller Cas protein for delivery on smaller vectors (Ran, F. A., et al., In vivo genome editing using *Staphylococcus aureus* Cas9. Nature. 520, 186-191 (2015)). A genome-wide sgRNA mouse library (~10 sgRNAs/gene) may also be used in a mouse that expresses a Cas protein (see, e.g., WO2014204727A1).

In one embodiment, perturbation is by deletion of regulatory elements. Non-coding elements may be targeted by using pairs of guide RNAs to delete regions of a defined size, and by tiling deletions covering sets of regions in pools.

In one embodiment, perturbation of genes is by RNAi. The RNAi may be shRNA's targeting genes. The shRNA's may be delivered by any methods known in the art. In one embodiment, the shRNA's may be delivered by a viral vector. The viral vector may be a lentivirus, adenovirus, or adeno associated virus (AAV).

In certain embodiments, whole genome screens can be used for understanding the phenotypic readout of perturbing potential target genes. In preferred embodiments, perturbations target expressed genes as defined by a gene signature using a focused sgRNA library. Libraries may be focused on expressed genes in specific networks or pathways. In other preferred embodiments, regulatory drivers are perturbed. In certain embodiments, Applicants perform systematic perturbation of key genes in neuronal cells in a high-throughput fashion. Applicants can use gene expression profiling data to define the target of interest and perform follow-up single-cell and population RNA-seq analysis. Not being bound by a theory, this approach will accelerate the development of therapeutics for human neurological disease as described herein.

In some embodiments, the methods may comprise identifying differentially expressed genes in 3D cell culture; filtering out genes that have relevant Gene Ontology annotations; filtering out genes that are not expressed by a minimal subset (e.g., <5%); filtering out genes that are involved in fundamental cellular processes (e.g., ribosomal); and/or filtering outlier/tangential results. One or more of the steps may be performed automatically. In some example, the methods may be used for identification of candidate targets for inhibiting glioma infiltration.

Methods for Treatment

The present disclosure further provides methods of treating a disease or health condition. The methods include administering the agent screened or identified by the cell cultures, devices, systems, or methods herein to a subject, e.g., a subject in need thereof.

In some embodiments, the 3D cell culture or cells therein may be used to treat a disease or health conditions. Cells in the 3D cell culture may exhibit characters that are not present in cells cultured in a 2D culture, and the characters may be important for successful treatment.

The methods entail administering to a subject in need thereof the 3D cell culture or cells therein, a microcapsule comprising the 3D cell culture or cells therein encapsulated therein, and/or a macroencapsulation device comprising the 3D cell culture or cells therein encapsulated therein. In some embodiments, the subject is in need of additional pancreatic β cells. In some embodiments, the subject has, or has an increased risk of developing diabetes. The 3D cell culture or cells therein can be administered to a subject for treatment of type 1 or type 2 diabetes. In some aspects, the subject has, or has an increased risk of developing, a metabolic disorder. In some aspects, administering to the subject comprises implanting the 3D cell culture or cells therein, a microcapsule comprising the 3D cell culture or cells therein, or a macroencapsulation device comprising the 3D cell culture or cells therein into the subject. The subject may be a human subject or an animal subject. In some embodiments, the cells may be implanted as dispersed cells or as clusters that may be infused into the hepatic portal vein. In some embodiments, cells may be provided in biocompatible degradable polymeric supports, porous non-degradable devices or encapsulated to protect from host immune response. Cells may be implanted into an appropriate site in a recipient. The implantation sites include, for example, the liver, natural pancreas, renal subcapsular space, omentum, peritoneum, subserosal space, intestine, stomach, or a subcutaneous pocket.

To enhance further differentiation, survival or activity of the implanted cells in vivo, additional factors, such as growth factors, antioxidants or anti-inflammatory agents, may be administered before, simultaneously with, or after the administration of the cells. These factors may be secreted by endogenous cells and exposed to the administered cells in situ. Implanted cells can be induced to differentiate by any combination of endogenous and exogenously administered growth factors known in the art. The amount of cells used in implantation depends on a number of various factors including the patient's condition and response to the therapy, and can be determined by one skilled in the art.

In some embodiments, the method of treatment further comprises incorporating the cells into a three-dimensional support prior to implantation. The cells can be maintained in vitro on this support prior to implantation into the patient.

Alternatively, the support containing the cells can be directly implanted in the patient without additional in vitro culturing. The support can optionally be incorporated with at least one pharmaceutical agent that facilitates the survival and function of the transplanted cells.

Artificial Islet or Pancreas

In accordance with an embodiment of the present invention, an artificial islet or pancreas is provided. The artificial islet or pancreas can be constructed using the 3D cell culture or cells therein generated according to the methods described herein.

An artificial pancreas may be a device that encapsulates and nurtures islets of Langerhans to replace the islets and β cells destroyed by type 1 diabetes. An artificial pancreas may contain a million islets or more, and may be implanted in the peritoneal cavity or under the skin where it can respond to changing blood glucose levels by releasing hormones, such as insulin. An artificial pancreas may be made using living (e.g., glucose-sensing and insulin secreting islets) and non-living components (e.g., to shield the islets from the diabetic's body and its destructive immune mechanism while permitting the islets to thrive).

EXAMPLES

Example 1

This example shows that a 3D culture platform enabled development of zinc-binding prodrugs for targeted proliferation of β-cells.

Current advances in treating β-cell loss in diabetes focuses on islet replacement therapies in type 1 diabetes or increasing the proliferation rate of β cells in type 2 diabetes. For targeted treatments to increase this proliferation rate, Applicant developed multiple proliferation-inducing prodrugs that target the high concentration of zinc ions in β cells relative to other cell types. Typical 2D cell cultures used for high-throughput compound screening do not mimic in vivo conditions, displaying a dramatically lowered zinc content, whereas currently used 3D culture systems may be laborious and expensive. Therefore, Applicant developed the Disque Platform (DP)—a high-fidelity culture system for 3D-reconstructed stem-cell-derived β cells (SC β cells). The cells were re-aggregated into thin, 3D discs that allowed a 3D-like culture to be contained in standard, 96-well plates. Applicant validated the DP against both standard 2D and 3D culture methods and employed it to test newly developed zinc-activated prodrugs, which released their cargo upon zinc chelation—so preferentially in β cells. The DP provided a reliable screening platform for β-cell-targeted drugs that bridges 2D screening and 3D culture methods.

Pancreatic β-cell loss is a common pathological feature of diabetes, leading to a β-cell deficiency and the consequent dysfunction in insulin production. There is currently no durable and effective treatment for β-cell loss as there are no progenitor cell population to replenish lost β cells, so constant monitoring and insulin injections are mandatory for life. Recently, pluripotent stem cell-derived β-cells (SC β-cells) have emerged as a promising approach to benefit a wider patient population than existing whole pancreas or islet transplantations as a sustainable source of cell-replacement therapy. However, SC β-cells have an extremely low proliferation capacity and thus there has been a great effort to screen and develop small molecules that would encourage β-cell proliferation. Unfortunately, these small molecules generally are not specific for β cells and often cause unmitigated proliferation in other cells at the necessary concentrations, leading to cytotoxic and genotoxic side effects.

Because β cells have over a million-fold higher Zn(II) concentration (10~20 mM) in insulin vesicles compared to α cells (1 nM) 9,10 and other cell types (~400 pM), Applicant found that hydrolytic reactions catalyzed by an excess of Zn(II) ions could be used to deliver active drugs to zinc-rich β cells. Applicant herein designed a zinc-binding prodrug system (ZnPD) that established a release control based on the chelation of zinc ions to provide a method for sustained and specific delivery of drugs to β cells. However, standard 2D cell-culture systems, typically used for the rapid compound screening, do not have zinc levels equivalent to physiological conditions. Conventional 3D culture systems, alternatively, preserve the morphological and biological complexity of pancreatic niches and recapitulate the myriad cell-to-cell and cell-to-matrix interactions that are important for maintaining appropriate intracellular zinc levels. Thus, the conventional 3D cell culture platforms lack the simplicity and throughput of conventional 2D culture methods, to screen multiple ZnPDs and find therapeutically relevant compounds.

As a result, Applicant established a reliable screening and culture platform, termed the Disque Platform (DP). The DP re-aggregated SC β cells into a thin disc-shaped layer within conventional well plates, and it recapitulated the 3D environments essential for β cells. As a screening tool for our newly developed ZnPDs, it also bridged the simplicity and high-throughput capability of 2D screening methods. The DP was validated against both 2D and 3D culture systems. Applicant then applied DP to the development of ZnPDs based on harmine, a DYRKIA inhibitor, which was recently identified as able to induce human β-cell proliferation, though with systemic cytotoxic and genotoxic effects at the necessary concentrations. The harmine-based ZnPD system comprised of a cleavable bond between harmine and a zinc chelator that resulted in an active form of harmine released only upon zinc chelation. Applicant then combined the two developments, using the DP to test harmine-based ZnPDs, verifying the results via a 3D-reconstructed culture system. With this process, Applicant detected increased harmine activity through SC β-cell proliferation, higher targeting efficiency, and decreased toxicity compared to unmodified harmine. Overall, the DP provided a simple and rapid screening method similar to 2D culture while retaining the cellular environment of a 3D culture, indicating the requirement for screening systems that better mimic native cell environments. These results were also translated in human primary islets and a scaled-up production of SC β-cells in SF.

Figure 2:
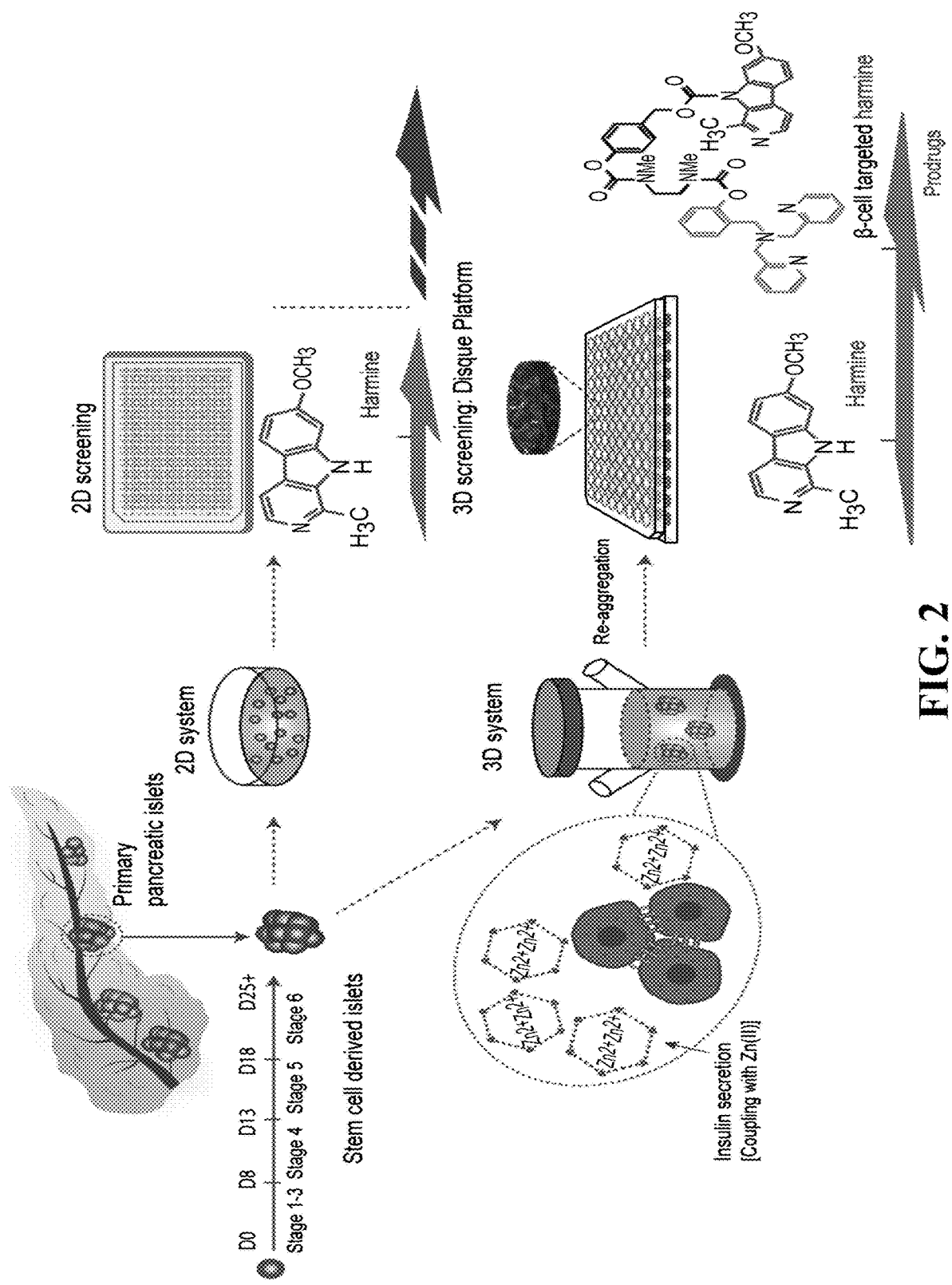
FIG. 2 depicts the need to establish a reliable platform that mimics the environments essential for β cells to screen prodrugs (e.g., β-cell targeted harmine). 2D screening platforms do not mimic in vivo conditions, displaying a dramatically lowered zinc content and shows less reliable screening of zinc chelating prodrugs. On the other hand, conventional 3D culture platforms, which better mimic the native β cell environments, are not amenable to high throughput screening. Therefore, a reliable 3D screening platform is needed for β-cell-targeted drugs.

Design and Optimization of the Disque Platform for Screening Zinc-Binding Prodrug (ZnPD) System Initial experiments measuring the zinc content of cells and junction expression markers [E-cadherin (E-Cad) and connexin-36 (CX-36)] in SC β-cells revealed significantly decreased gene expression and zinc levels in 2D culture compared to 3D culture. Because prodrugs utilize distinct physiological features in cells, this suggested that such 2D cultures that did not fully recapitulate 3D culture environments would not, in fact, be sufficient for the designed experiments in screening prodrug molecules. As a result, Applicant sought to establish a reliable screening and culture platform to bridge the simplicity and high-throughput capability of 2D culture methods and the 3D environments essential for mimicking the natural cellular make-up of β cells to effectively screen newly developed prodrugs (FIG. 2). In developing this platform, certain key features of 3D culture needed to be preserved in a 2D-type system: 1) the cell-cell and cell-matrix junctions, 2) high cell viability during the study period, 3) ability for cells to differentiate to fully functional β-cell micro-tissues, and 4) compatible with current readouts to assess the therapeutic effects of potential chemical factors.

Figure 3A:
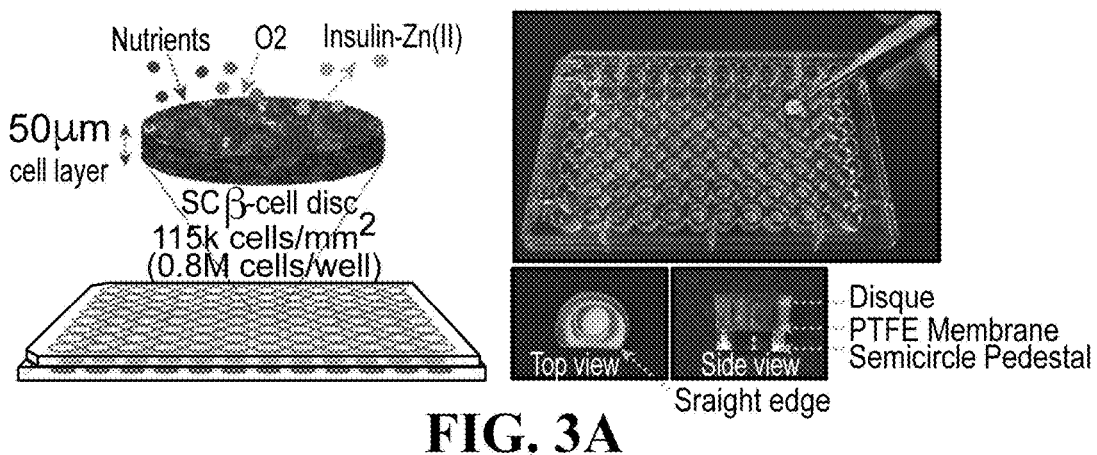
Figures 3B, 3C:
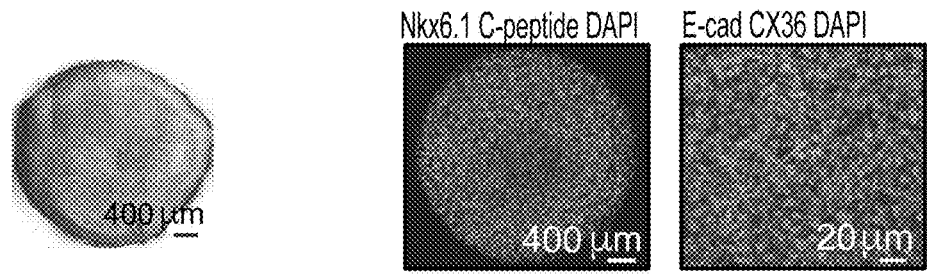
Figure 7:
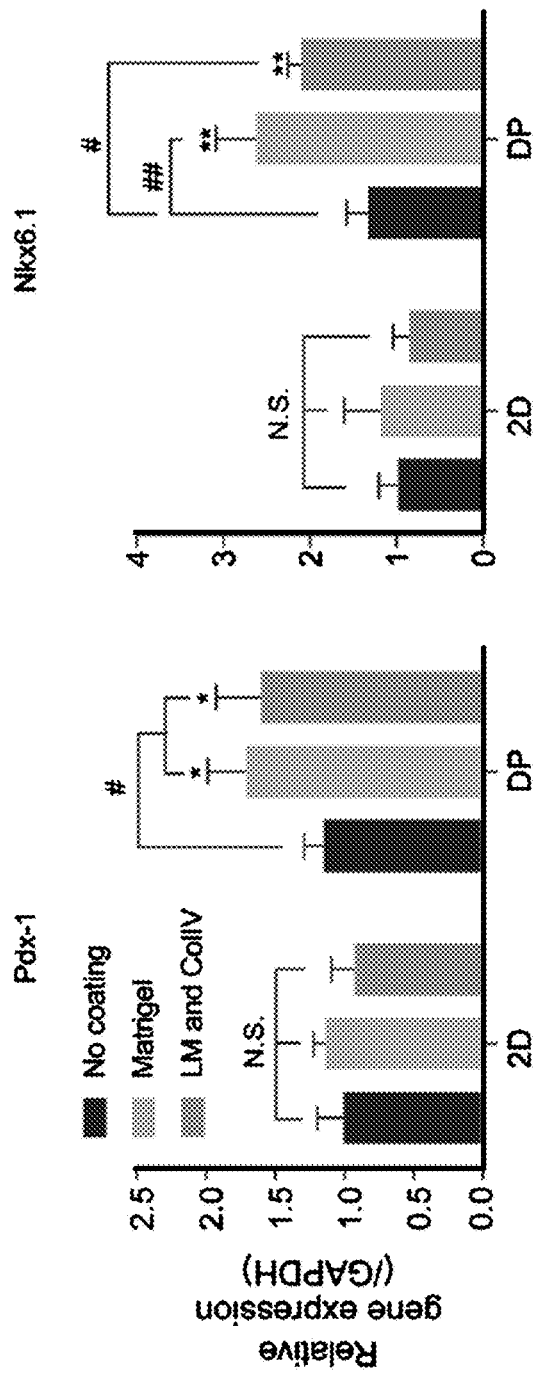
FIG. 7—Cell discs in Disque platform (DP) re-establish cell-extracellular matrix (ECM) interactions which are critical for pancreatic differentiation. Gene expression of pancreatic and duodenal homeobox 1 (Pdx1) and homeobox 6.1 (Nkx6.1) from pluripotent stem cell derived β cells (SC β cells) cultured on DP pre-coated with Matrigel or Laminin (LM)/Collagen IV (ColIV) (n=3, *; p<0.05, **; p<0.01 vs. 2D No coating, #; p<0.05, ##; p<0.01 vs. DP No coating).

Applicant herein developed the Disque platform (DP) as a multi-well culture system that allowed a rapid re-aggregation of SC β clusters into flat 3D discs that could be cultured in commercially available multi-well culture plates (FIG. 3A). SC β-cell discs were formed in a "Disque", which referred to a laser-cut acrylic mold made up of a circular compartment containing the cell disc and a straight edge to accommodate multi-pipette tip placement that simplified media changes and assays. A semi-permeable hydrophilic PTFE membrane with a 1.0 µm pore size was attached to the acrylic mold to support the cell discs. Furthermore, the semi-permeable membrane was precoated with vasculature extracellular matrices (ECMs) (e.g. collagen IV and laminin), which were the main components of the basement membrane in developing human islets and were important for β-cell survival, insulin secretion, architecture formation, and gene expression. In addition, to mitigate the generation of air bubbles beneath the Disque and maintain media circulation, Applicant elevated individual Disques by attaching a semi-circular pedestal to the bottom. To form the cell discs, SC β clusters were dispersed into single cells, which were seeded into the individual Disques ($0.8 \times 10^6$ cells/Disque). The Disques were centrifuged to re-form cell discs with controlled cell densities and dimensions in a regular flat-bottom 96-well plate (FIG. 3B). Cell discs grown using the ECM-coated DP promoted the gene expression of key pancreatic endoderm cell markers homeobox 6.1 (Nkx6.1) and pancreatic and duodenal homeobox 1 (Pdx-1) compared to the non-coated group (FIG. 7), though there were no significant differences between the gene expression of both markers in 2D culture conditions. Based on these experimental data, Applicant established the following parameters for the DP: the cell density was set to $115 \times 10^3$ cells/mm$^2$, the thickness was set to 50 µm, and the diameter was set to 3,000 µm for ease of operation (e.g. during cell seeding and Disque replacement).

Figure 3D:
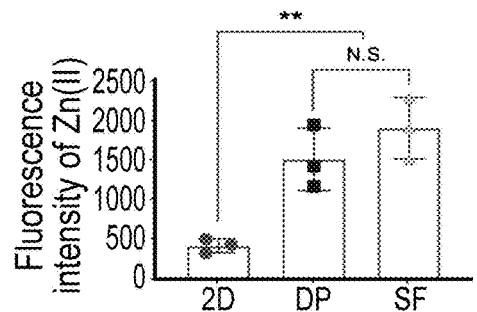
Figure 3E:
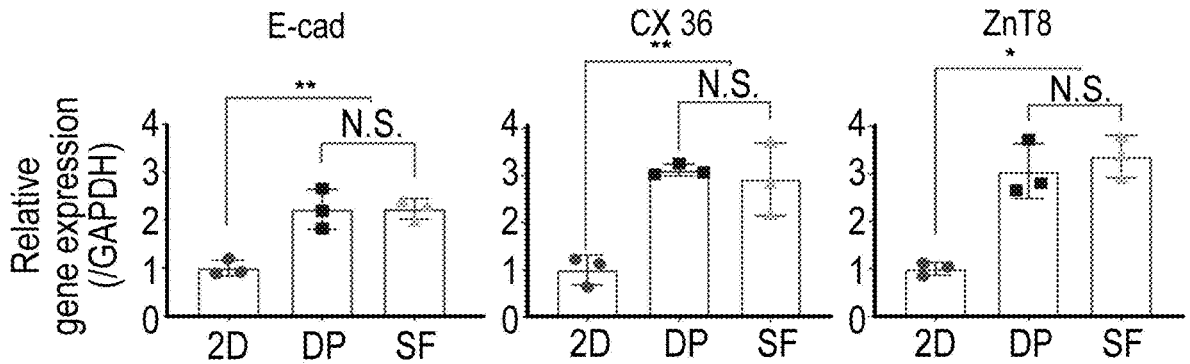

Validation of Disque Platform for Effective SC β-Cell Culture and Drug Screening After optimizing the DP, Applicant evaluated its ability to support the viability, differentiation, and function of cell discs compared to dissociated SC-cells (2D) and 3D SC β clusters cultured from SFs. Applicant found that the DP could promote direct contact between SC β cells and the formation of 3D micro-tissue with cell-cell junctions, which could better direct the course of β-cell differentiation and zinc levels compared to dispersed cells in 2D culture22. Immunofluorescent imaging showed that the cell discs successfully re-established cell-cell interactions (E-cad and CX36) among the homogenously distributed and densely packed SC β cells (FIG. 3C). Applicant were next interested in whether the Zn(II) concentration was reflected in the increased junction markers, as cell-cell contacts are important for zinc signaling, in DP and SF compared to 2D culture. Gene expression levels of E-cad, CX36, and ZnT8 from qRT-PCR, and the intracellular Zn(II) ions level from DP-cultured cells were similar to 3D SC β clusters from SF. In contrast, 2D culture showed significantly lower levels of the junction markers and Zn(II) ions (FIGS. 3D and 3E).

Next, Applicant found that the optimized cell culture parameters maintained a high cell viability despite occurring in static 3D culture (DP) rather than suspension culture during differentiation. Indeed, the DP achieved a comparable high viability to SF culture during pancreatic progenitor differentiation to mature SC β cells (stage 6, S6) (FIG. 3F). To validate the DP's efficacy in supporting SC β-cell viability and differentiation, Applicant collected pluripotent stem-cell-derived progenitor cells (SC-PCs) from the same biological batch and cultured them in parallel in DP and SF with the same differentiation protocol from the pancreatic progenitor cells (S4) to mature stem cell β cells (S6) 23. After 5 days in culture, confocal microscopy of the cell discs revealed a uniform distribution of live cells (FIG. 3F). Following 18 days of differentiation, Applicant observed a comparable viability profile between DP and SF and similar levels of co-expression of beta cell markers c-peptide (a component of pro-insulin) 24 and Nkx6.1 (FIGS. 3G and 3H).

Figure 8A:
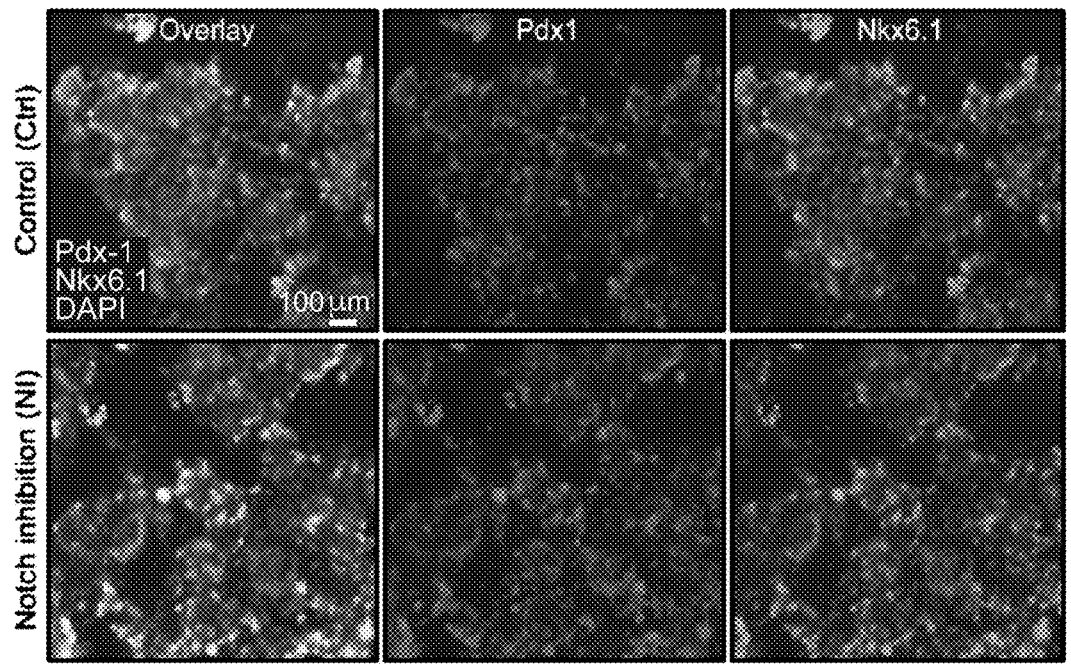
FIGS. 8A-8D-Assessing the behaviors of SC β-cells differentiation in response to notch signaling inhibition in DP. SC β cells (Stage 4 day 1 [S4d1] to S4d5) in DP were treated with notch inhibitor (NI, Y-secretase inhibitor, N—[N-(3,5-Difluorophenacetyl)-L-alanyl]-S-phenylglycine t-butyl ester (DAPT), 10 μM) for 4 days in culture.
Figure 8B:
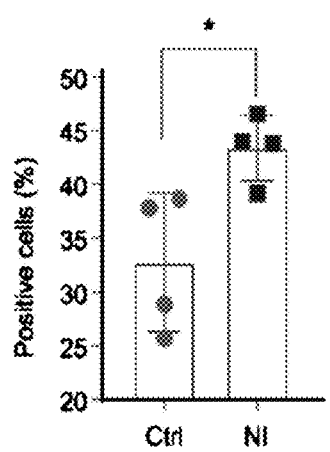
Figure 8C:
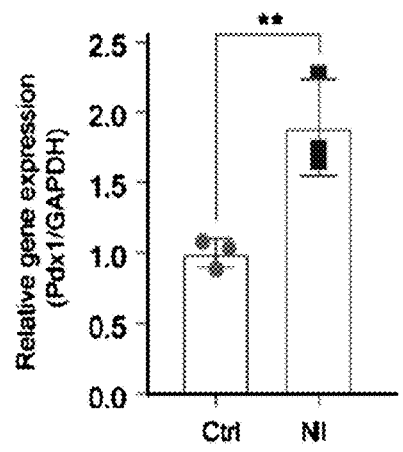
Figure 8D:
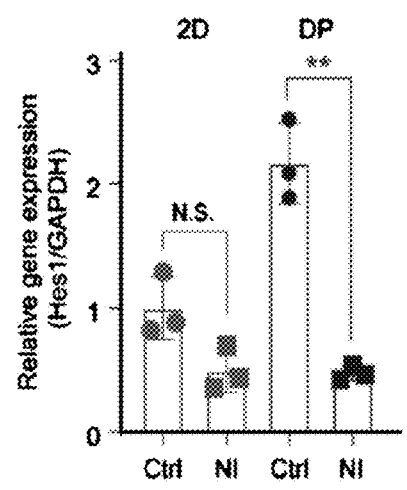

Next, Applicant further examined whether other junction signaling pathways critical for β-cell differentiation, such as the Notch signaling pathway, could be supported in the DP, as Notch inhibition in pancreatic progenitor cells is known to promote differentiation into the endocrine lineage and β-cell production. To measure this in the DP, Applicant supplemented the differentiation protocol of pancreatic progenitor cells with Notch inhibitor (NI) [γ-secretase inhibitor, N—[N-(3,5-Difluorophenacetyl)-L-alanyl]-S-phenylglycine t-butyl ester (DAPT) (10 µM)] and examined the cells at the end of pancreatic progenitor cells (stage 4 day 5 (S4d5)) by immunocytochemistry and gene expression analysis (FIGS. 8A-8D). Immunocytochemical staining for Pdx-1 and Nkx6.1 showed that Pdx-1-positive progenitor cells, which were usually trapped in an undifferentiated state due to Notch signaling, were significantly increased after Notch inhibition (FIG. 8A). Meanwhile, gene expression results from cells cultured in the DP showed an 80% increase in Pdx-1 expression and a 71% decrease in hairy and enhancer of split-1 (Hes1) expression, which was an essential downstream effector of Notch signaling predominantly expressed by pancreatic cells (FIGS. 8B-8D). Interestingly, the Hes1 expression in 2D culture was not responsive to lateral Notch inhibition (FIG. 8D). Altogether, these data indicated that the cells could be maintained and differentiated from pancreatic progenitor cells (S4) to SC β cells (S6) in the DP, and that there was a difference in the ability to recapitulate Notch inhibition between 2D and 3D-like culture systems. Upon establishing the differentiation capabilities of the DP, Applicant then reasoned whether differentiated SC β cells also elicited proper insulin secretion functionality. The DP also supported insulin secretion from SC β cells in response to glucose stimulation, and similar secretion indices were noted between DP and SF (FIG. 3J).

Zinc-Binding Scaffold for β-Cell-Specific Delivery of Harmine

Harmine, a DYRK1A inhibitor, has recently been discovered as an effective agent for β-cell proliferation; however, numerous reports have also identified it as an effective anti-tumor agent at high concentrations due to its ability to intercalate DNA and induce apoptosis. Consequently, this limits the therapeutic range of concentrations that can be used for β-cell proliferation. Furthermore, harmine analogues also highly induce proliferation of a cells as well as other endocrine cell populations, which further limits the efficacy of harmine for β-cell regeneration in diabetes. Thus, to use harmine as an agent specific for β-cell proliferation, a fine balance between maximizing dosage for obtaining robust proliferation responses and avoiding cytotoxic effects needs to be achieved.

Applicant, therefore, created a harmine-based ZnPD that specifically targeted β cells. The ZnPD comprised three components: an inactive form of harmine, a Zn(II)-binding ligand, and a self-immolative linker that linked these two components. Upon Zn(II) binding, the carbamate linkage hydrolyzes and triggers self-immolation to release an active harmine (FIG. 4A). Using BODIPY acid as a fluorescent cargo conjugated to the zinc-binding scaffold, Applicant synthesized ZnPD4 (FIG. 3B) to visualize the unmasking of fluorescent cargo in SC β cells. The carbamate linkage was cleaved upon Zn(II) binding, and selective fluorophore emission was observed in mature SC β cells (S6d11) in a dose-dependent manner (FIG. 4B). As a control, fluorescence was not emitted in pancreatic progenitor cells (S4d5) which did not participate in insulin production and therefore, have lower zinc concentration (FIG. 9A). Using SC β cells, unmasked ZnPD4 signal closely matched the distribution of c-peptide-positive SC β cells (S6) (FIG. 4C). Since c-peptide is a polypeptide cleaved off from pro-insulin and packaged along with insulin into the secretory granules, this distribution profile strongly suggested that ZnPD targeted the Zn(II)-rich secretory granules in β cells and not the pancreatic progenitor cells that do not produce insulin. Unlike α cells in adult islets, SC α cells often co-express c-peptide and glucagon, and it was understandable that ZnPD cleavage also occurred in some polyhormonal SC α cells. In addition, flow cytometry data also revealed that the ZnPD system was more selective toward c-peptide-producing cells by over 3-fold compared to non-c-peptide-positive cells (e.g., α cells, δ cells, pp cells) (FIG. 4D). To mimic in vivo zinc ion levels, Applicant pretreated cells with 50 mM zinc chloride. Interestingly, pre-treating SC β cells with 50 μM zinc chloride did not modify the ZnPD targeting, suggesting that β cell zinc homeostasis was highly regulated (FIGS. 9A, 9B). Overall, these data implied that the ZnPD could reduce its off-target activity in non-β-cell lines or other sub-populations of the pancreatic endocrine lineage and helped target the therapeutic effect of small molecule inducers to the insulin-producing SC β cells.

Screening and Validation of ZnPDs in Disque Platform

Figure 5A:
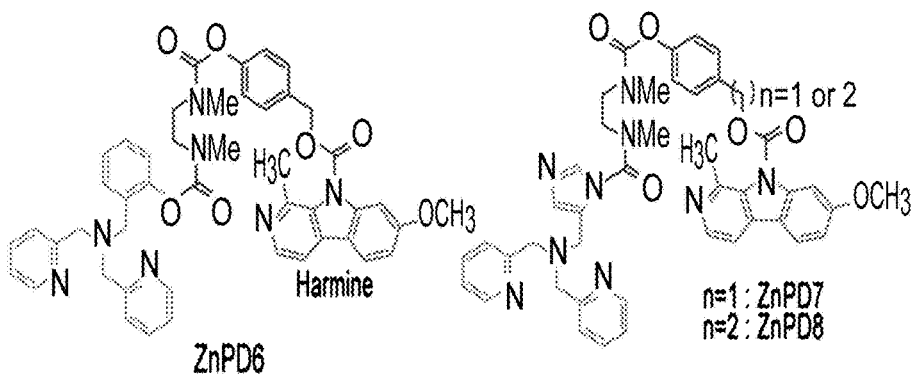
FIGS. 5A-5I: Applying the DP as a tool for testing ZnPDs reveals ZnPD6 as a targeted inducer for β-cell proliferation and differentiation. ZnPD conjugated with harmine cargo shows higher efficacy and longer duration compared to unmodified harmine in inducing proliferation of SC β cells and primary human β cells in DP, while screening in 2D culture is not able to reveal a difference.
Figure 5B:
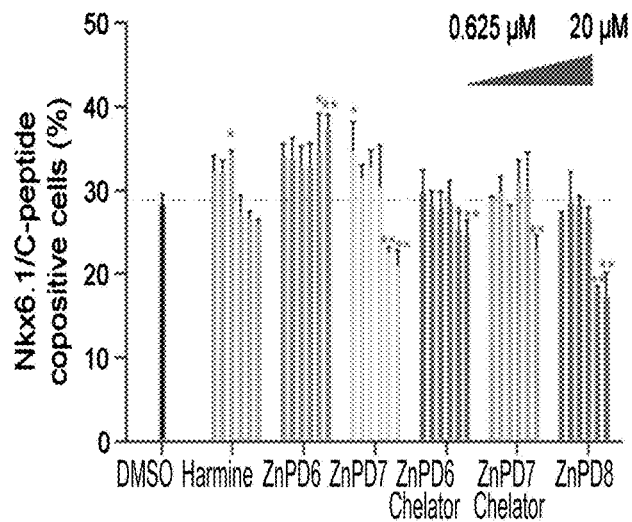
Figure 5C:
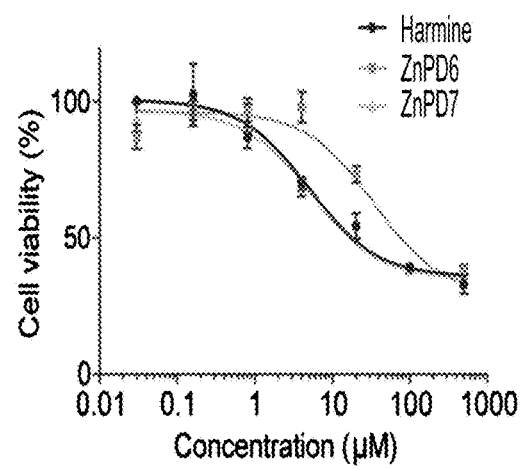
Figure 10:
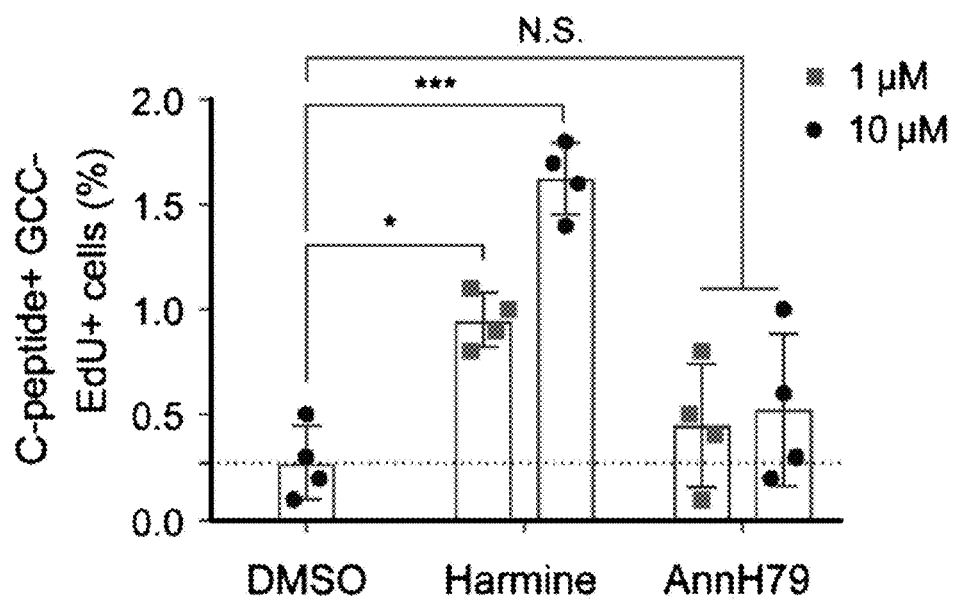
FIG. 10 Validation of DP with harmine β-cell proliferation inducers. Flow cytometry data quantified proliferation (EdU+) of SC β cells (C-peptide+GCG−) after treatment of the small molecules in the DP. AnnH79 is a harmine analog used as a negative control (n=4 for all other experimental groups, *; p<0.05, ***; p<0.001 vs. DMSO).
Figure 11:
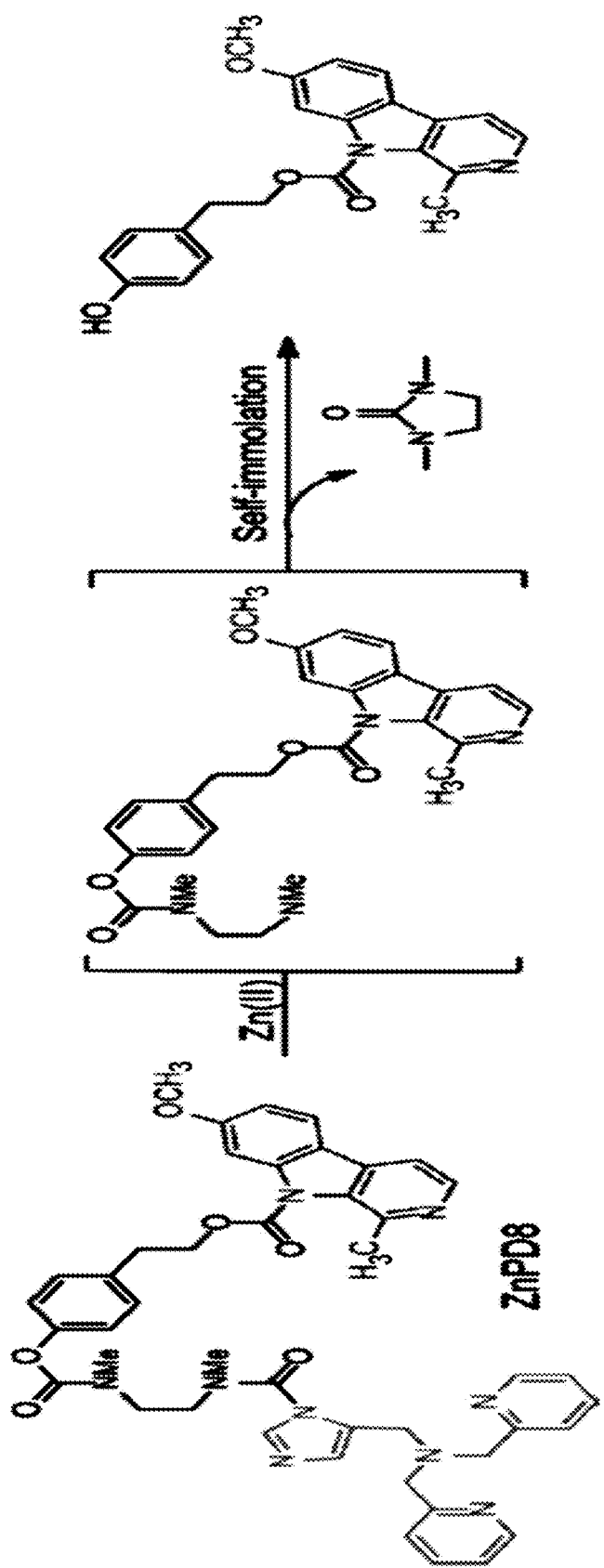
FIG. 11—Proposed mechanism of ZnPD8. Proposed mechanism of Zn(II)-mediated hydrolysis of ZnPD8 which serves as a negative control because it does not release the active cargo.

Following validation of the DP for its ability to support viability, differentiation, function, and small-molecule testing, Applicant developed proliferation-based ZnPDs. Applicant synthesized various proliferation-inducing ZnPDs (FIGS. 12A and 12B) with various cargoes (e.g., leucettine, sivelestat, and harmine), linkers, and Zn(II)-chelating groups, and tested them for their activity. From these studies, harmine-based ZnPD emerged as the most efficacious for enhancing the proliferation of SC β cells. Additionally, Applicant tested harmine analogue, AnnH79, that does not inhibit DYRK1A and used it as a negative control36. Assessing the population of proliferating monohormonal SC β cells by flow cytometry revealed a statistically significant increase with harmine compared to the DMSO control or negative control (FIG. 10). This data indicated that the DP can reliably replicate β-cell niches and can identify a known β cell-proliferating small-molecule inducer (harmine). Next, Applicant synthesized several ZnPDs that contained harmine as the active cargo (ZnPD6-8), with ZnPD8 acting as the negative control because it contained a non-cleavable linker that could not release harmine as a cargo (FIG. 11). Since the DP was developed for rapid testing of small molecules, Applicant used high content confocal screening for the primary DP screen to test multiple ZnPDs for the inductive effects of proliferation and function of SC β cells (FIG. 5A). Applicant successfully identified ZnPD6 and ZnPD7, as the best hits based on the co-expression of c-peptide and Nkx6.1 in SC β cells (analyzed with one-way analysis of variance) (FIG. 5B). Applicant also noticed an increase in β-cell populations for both active compounds ZnPD6 (31.9% and 22.2% over DMSO, 20 UM and 10 μM) and ZnPD7 (21.8% over DMSO, 1.25 μM), but not in the ZnPD8 control or the ZnPD6-7 chelators alone (FIG. 5B). There was no significant difference between the no treatment and DMSO (20 μM) group. The cytotoxicity curve revealed that harmine did have a cytotoxic effect over 10 μM, and a similar trend was observed in ZnPD7, while ZnPD6 elicited cytotoxicity only at higher doses (FIG. 5C). Accordingly, Applicant selected ZnPD6 over ZnPD7 for further examination because ZnPD6 induces higher propensity of copositive cells (Nkx6.1 and C-peptide) and can potentially be used at higher doses than non-modified harmine.

Figure 5D:
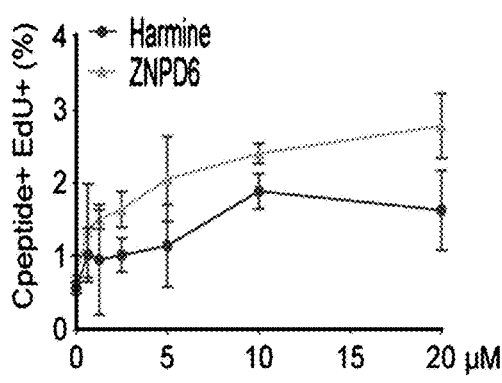
Figure 5E:
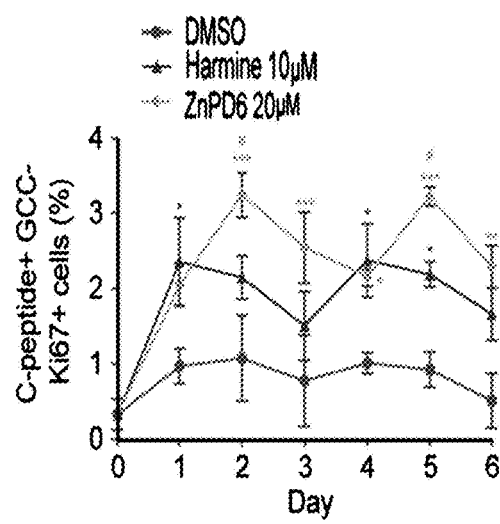
Figure 5F:
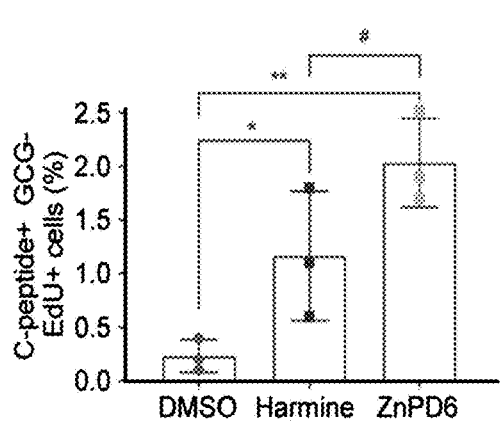
Figure 5G:
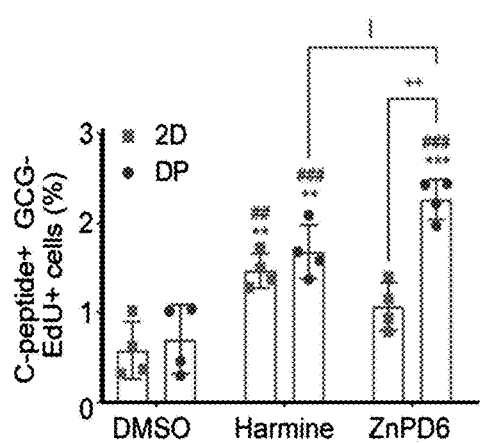

Applicant then compared ZnPD6 and harmine over the range of 0.625 to 20 μM based on the percentage of proliferating mature SC β cells using the c-peptide/EdU co-positive metric, wherein EdU is a proliferation marker that identifies cells undergoing DNA replication in the S phase (FIG. 5D). As Applicant found for ZnPDs, ZnPD6 was more effective than harmine at higher dosages (10 and 20 μM) and thus for subsequent analyses, ZnPD6 at 20 μM was chosen. Despite releasing the same drug following ZnPD cleavage, Applicant were interested in determining what caused the difference in cytotoxicity and proliferation between ZnPD6 and unmodified harmine. Applicant then examined harmine and ZnPD6 at their optimal concentrations for proliferation, 10 μM and 20 μM, respectively. Following 6 days of culture with drug treatments every 3 days, ZnPD6 exhibited a delayed but enhanced β-cell proliferation (C-peptide+GCG-Ki67+) response (FIG. 5E). This data suggests the attenuated cytotoxicity with ZnPD6 may be due to a decrease in the initial burst of harmine and a prolonged local concentration of harmine delivered to cells through a delayed release. Two treatments of ZnPD6 to primary human islets in DP also revealed-cell proliferation, and the inductive effect of ZnPD6 at 20 μM showed an 8.7-fold increase compared to the control and a 2.4-fold increase compared to harmine (10 μM) (FIG. 5F). ZnPD6 induced a greater increase in the population of proliferating β cells, 3.2-fold compared to DMSO and 1.3-fold compared to harmine, in the DP, while in a conventional 2D system, ZnPD6 did not show any significant differences in proliferation compared to DMSO (FIG. 5G), indicating the importance of screening compounds in a system that mimics the in vivo cellular environment.

Figure 5H:
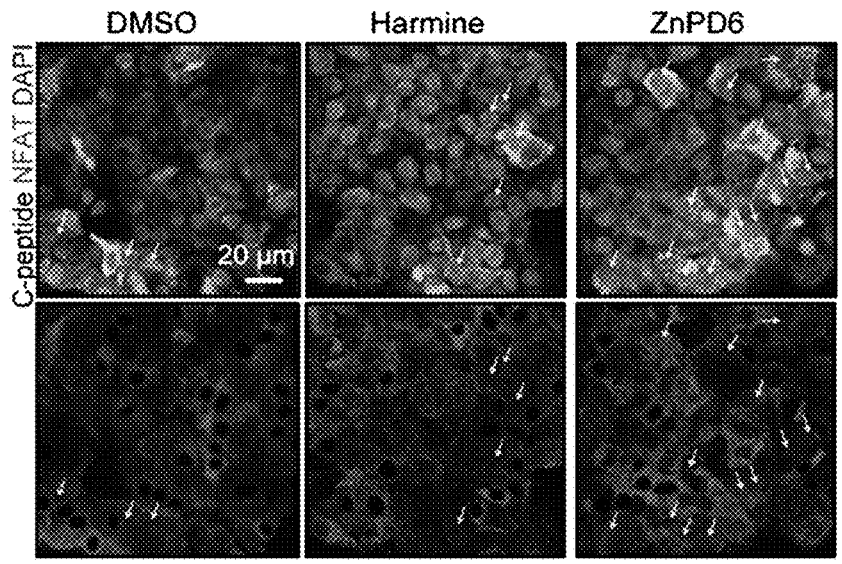
Figure 5I:
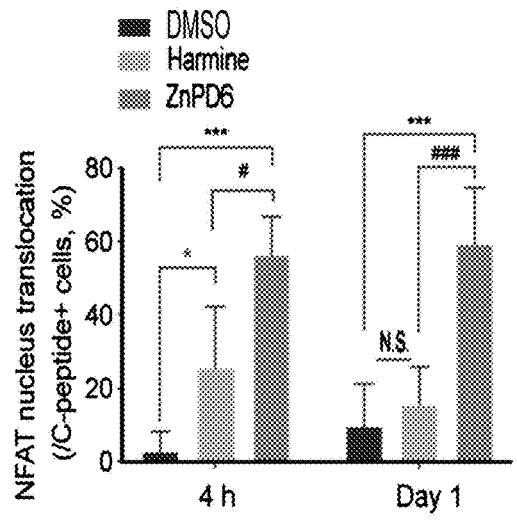
Figure 5I:
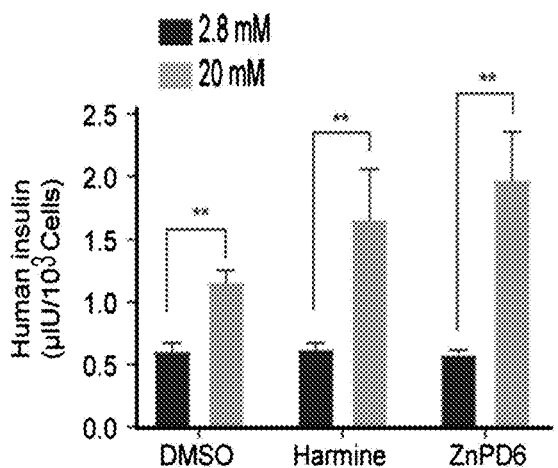

To confirm whether ZnPD6 could prolong the drug response, Applicant used NFAT1 protein nuclear translocation as a readout for DYRK1A inhibition, which was found to be maintained for up to 4 hours. Applicant found that ZnPD6 could prolong the duration of NFAT1 nuclear translocation to cause sustained proliferation vs unmodified harmine due to the cleavage delay. Applicant found that NFAT1 translocation of SC β cells was sustained for up to 24 hours with ZnPD6 treatment, while NFAT1 nuclear translocation decreased from 26% to 15% at 24 hours with harmine treatment (FIG. 5H). In addition, ZnPD6 showed higher targeting efficiency, reflected by NFAT1 translocation in C-peptide+β cells, such that a higher dose can be delivered to β cells in SC β clusters to enhance NFAT1 translocation. Therefore, ZnPD6 demonstrated a sustained action and greater targeting efficiency for c-peptide-positive cells. Lastly, insulin secretion from SC β cells treated with ZnPD6 in the DP was also appropriately responsive to glucose stimulation (FIG. 5I).

Examination of ZnPD6 in Spinner Flask

Applicant then wondered whether hits obtained from the DP could elicit similar proliferation and differentiation effects for SC β cells in an SF system typical for research and clinical use. Therefore, Applicant tested the efficacy of ZnPDs in a scaled-up production of SC β clusters in an SF (FIG. 6A). After treatment with ZnPD6, reconstructed confocal images showed an increased propensity for cells co-positive for EdU and c-peptide (glucagon negative), which are marked by white arrows in the representative images (FIG. 6B). In general, at the terminal stage of SC β-cell differentiation, there is still a large population of polyhormonal cells, so the population of proliferating monohormonal β-cells (c-peptide+GCG−) was also examined, and Applicant observed a 2.8-fold higher EdU incorporation in the ZnPD6-treated group compared to the control and 1.3-fold higher compared to harmine. There was no significant difference in proliferation between ZnPD6 and DMSO in α cells, indicating a selective release of harmine in β cells but not α cells (GCG+ cells) (FIG. 6C). ZnPD6 treatment also showed an increase in Nkx6.1 and insulin (Ins) gene expression compared to untreated control and harmine (FIG. 6D), suggesting a potential increase in functional insulin secretion. Accordingly, Applicant performed a GSIS test and revealed that upon glucose stimulation, SC β cells insulin secretion increased after compound treatment (FIG. 6E), with a GSIS index of 3.39 in DP, similar to 3.05 in SF. Overall, the results indicated that ZnPD6 was an effective molecule for enhancing proliferation and targeting, and that it maintained comparable functional performance when tested in both SF and DP.

The focus on developing a zinc-binding prodrug platform for targeting β cells led to the need for culture systems that better mimicked in vivo conditions than currently existing 2D culture systems in a more high-throughput fashion than the gold-standard 3D culture systems. Applicant, therefore, designed the DP to bridge the gap between the 2D and 3D culture platforms and permit a reliable, medium-to high-throughput, screening platform for β cells. Applicant validated the system against current 2D and 3D culture systems and utilized it in a biologically relevant application—demonstrating that our harmine-based ZnPDs did in fact selectively target β cells and increase β-cell proliferation.

Human pancreatic islets comprise intricate multi-cellular compositions, and many of their attributes are retained only when the cells remain as components of the islet. Once β cells have been dissociated for 2D monolayer cell culture, their functions and activity have been observed to differ from islets, as Applicant showed through their lower levels of junction markers and Zn(II), poor differentiation profiles, and less pronounced insulin secretion compared to 3D cultures. A key result from our DP method was that reaggregated SC β-cell discs cultured in the DP were able to re-establish 3D micro-environments inside conventional 96-well plates. As a result, cell-cell and cell-ECM interactions were reestablished at levels similar to SC β clusters cultured in 3D suspension cultures, recapitulating the viability, differentiation capacity, and function of the 3D gold standard. The results here demonstrated that cells can reaggregate into a disc-like geometry while maintaining key features. Ultimately, the multi-array construction of the DP is entirely compatible with small-molecule screening strategies and mainstream assays (e.g. HTS immunofluorescent imaging, enzyme-linked immunosorbent assay (ELISA), quantitative real-time polymerase chain reaction (qRT-PCR), and flow cytometry). These findings make the DP an attractive technology for performing drug screening with β cells with the convenience and throughput of current 2D culture methods while retaining the critical properties of the more cumbersome 3D methods.

As opposed to 2D environments, the DP allowed for cells to be cultured with greater resemblance to that of a native islet environment with increased junction markers and zinc concentration, therefore presenting a platform capable of interrogating the effects of different ZnPDs. With the ZnPD system, Applicant successfully appended a zinc-chelating probe onto harmine to act as a controlled release mechanism that was activated in the Zn(II)-rich insulin vesicles, and Applicant validated its function and selectivity using the DP. Functional studies revealed that the harmine-based ZnPD6 could induce proliferation better than harmine alone in mature monohormonal β cells, and that selective delivery and release in β cells resulted in the same effect as a high-dose treatment. Overall, this indicates that the ZnPD approach as a promising method for improving the efficacy of any drug intended for modulating β cells, primarily because it increased the maximum tolerated dose by decreasing the off-target effects while it lowered the minimum efficacious dose by accumulating the drug at the site of action. Applicant found that this would have a wide-ranging impact on therapeutic development in β cell targeting approaches.

The seeding density in this study for cells in the DP was at $115 \times 10^3$ cells/mm$^2$, which was equivalent to 0.8 million cells per well given the current thickness and diameter of the cell disc. In a pilot experiment, Applicant showed that cell discs with one third of the current diameter, or around 0.09 million cells per well, expressed similar levels of key β-cell differentiation markers.

In summary, Applicant developed the DP, a 3D culture system that recapitulated the cellular environment and interactions of SC β cells to foster viability, differentiation, and function, and used it to screen our established targeting system that selectively induces and prolongs β-cell proliferation. The simple and biomimetic design of the DP made it compatible with all standard HTS readouts, meaning it could immediately replace existing 2D experimental protocols. Because the DP reflected similar β-cell behaviors, expression of biological markers, and insulin secretion to 3D suspension cultures, this system allowed for the screening of critically important new β-cell-targeting therapeutics in an environment more predictive of native islets. Overall, the technology presented in this study can support a more rapid and cost-effective production of a sustainable source of islets in vitro as well as potentially reduce the side-effects of known small molecules for in vivo β-cell expansion towards a long-term transplantation remedy for diabetes patients.

Methods

Disque platform fabrication. 3.0 mm inner diameter Disques were engraved by laser cutter (Universal Laser Systems, Inc., Scottsdale, AZ, USA) from 1.5 mm thick acrylic sheets. A 1.0 μm pore size of hydrophilic PTFE membrane (Cole-Parmer, Vernon Hills, IL, USA) was attached to the bottom of a Disque using acrylic glue. The reverse side of the membrane was attached to a supporting pedestal engraved by a laser cutter. The Disques were sterilized by incubation with 70% ethanol (Sigma-Aldrich, St. Louis, MO, USA) overnight and UV radiation for 1 hour prior to placement into the bottom of a 96 well-plate (Corning, Corning, NY, USA).

Cell culture and differentiation. SC-cells at stage 4~6 were provided by the Melton Lab of the Harvard Stem Cell Institute at Harvard University and cultured in 50 mL spinner flasks (ABLE Biott, Tokyo, Japan). For 2D and DP culture, SC β clusters were dissociated into single-cells by replacing media with 1× TrypLE Express (Gibco, Thermo Fisher Scientific, Waltham, MA, USA) for incubation at 37° C. for 15 min, centrifuging at 250×g for 5 min, and washing with media twice. Dispersed SC β-cells were seeded at 115×10³ cells/mm² in the DP. The DP was precoated with 10 µg/mL laminin (Corning) and collagen IV (Corning) for 1 hour at room temperature. Seeded cells in DP were spun down at 250×g for 5 min for re-aggregation. Differentiation of SC β cells from stage 4 to 6 and media usage followed a known protocol23. Experiments with SC β-cells were performed with stage 6 day 10-15 cells unless otherwise stated. The human primary islets were provided from ProdoLab (Aliso Viejo, CA, USA) and seeded into the DP as described above. Culture media for human islets were also from ProdoLab (PIM(S) supplemented with PIM (ABS, G, & 3X)). All cells were cultured at 37° C. incubator with 5% CO2 and 100% humidity. Human islet and donor information: purity (90%), viability (95%), health (nondiabetic), age (48 years), gender (male), ethnicity (Caucasian), cause of death (head trauma), BMI (30.2).

Compound treatment. Cells were seeded into the DP and incubated with their respective media as outlined in the section above and allowed to settle for 24 hours (day 1). For compound treatment (ZnPDs and small molecule cargos), the media were replaced with new media supplemented with prodrug at different concentrations on day 3 and day 6 for a total treatment of 6 days. Cell analyses was performed after 7 days in culture. For targeting study with ZnPD4, cells were treated with ZnPD4 for 2 hours. For zinc pre-treatment groups, after seeding, the cells were incubated with 50 µM Zn(II) chloride (Sigma-Aldrich) for 24 hours (day 1) and washed with media twice before ZnPD4 treatment. For Notch signaling inhibition, media were supplemented with DAPT (Sigma-Aldrich) at 10 µM. For the dose-cytotoxicity study, cell viability was measured by AlamarBlue™ assay following the manufacturer's protocol (Invitrogen, Carlsbad, CA, USA).

Flow cytometry. Differentiated SC β-cells in the DP and SF were dispersed into single-cell suspension by incubation in 1×TrypLE Express (Gibco) at 37° C. for 15 min and then fixed with 4% paraformaldehyde (PFA) (Electron Microscopy Sciences, Hatfield, PA, USA) at 4° C. for 20 min and washed with PBS buffer. Cells were permeabilized with 0.1% Triton X-100 (Sigma-Aldrich) at room temperature for 30 min for EdU labelling following the manufacturer's protocol (Click-iT™ EdU, Invitrogen). For primary antibody labelling, cells were incubated with blocking buffer (5% donkey serum (Jackson Immunoresearch, West Grove, PA, USA) and 0.1% saponin (Sigma-Aldrich) in PBS buffer) at 4° C. for 1 hour, resuspended in blocking buffer with primary antibodies, incubated at 4° C. overnight then washed with blocking buffer twice. The following primary antibodies were used: rat monoclonal anti-Ki67 (1:500, ab156956, Abcam, Cambridge, MA, USA), mouse monoclonal anti-C-peptide (1:300, MAB14171, R&D Systems, Minneapolis, MN, USA), rabbit monoclonal anti-GCG (1:1000, ab92517, Abcam, Cambridge, MA, USA), goat polyclonal anti-Pdx-1 (1:500, AF2419, R&D Systems) and rabbit monoclonal anti-Nkx6.1 (1:500, ab221549, Abcam). For secondary antibody labelling, cells were incubated with blocking buffer with secondary antibodies at 4° C. for 45 min and washed with blocking buffer twice prior to analysis. The following secondary antibodies were used: 1:500 dilution: Alexa Fluor-405 goat anti-mouse IgG (Invitrogen), Alexa Fluor-488 goat anti-mouse IgG (Invitrogen), Alexa Fluor-488 goat anti-rat IgG (Invitrogen), and Alexa Fluor-647 donkey anti-rabbit IgG (Invitrogen). Zombie dye staining was performed prior to cell fixation and permeabilization, at 1:500 dilution (Zombie UV™, BioLegend, San Diego, CA, USA). Cells were analyzed using a BD FACSAria™ II flow cytometer (BD Biosciences, Franklin Lakes, NJ, USA). Analysis of the results was performed using the FlowJo (FlowJo LLC, Ashland, OR, USA) and BD FACSDiva™ (BD Biosciences) software.

Immunocytochemical staining. The Immunofluorescent staining was performed as previously described in the Flow cytometry section. The additional primary antibodies for immunocytochemical staining were used: rabbit polyclonal anti-NFAT1 (1:500, ab244310, Abcam, Cambridge, MA, USA), mouse monoclonal anti-E-cadherin (1:500, Abcam) and rabbit polyclonal anti-connexin 36 (1:500, Abcam). Secondary antibodies were stained using previously described antibodies noted within the flow cytometry method. Cells were then counter-stained with 4', 6-Diamidino-2-phenylindole (DAPI, MilliporeSigma, Burlington, MA, USA) or 2,5'-Bi-1H-benzimidazole (Hoechst, Invitrogen). HTS imaging was performed using the Opera Phenix™ High Content Screening System (PerkinElmer, Waltham, MA, USA). Fluorescent and bright-field imaging were performed using the Eclipse TE2000-U (Nikon, Tokyo, Japan). Confocal imaging and z-stack 3D reconstruction were performed using LSM 800 with Airyscan (Zeiss, Oberkochen, Germany). Analysis was performed using ImageJ (NIH) and Adobe Photoshop (Adobe, San Jose, CA, USA) software.

Cell viability test. To determine the viability of SC β-cells in the DP and SF, a Live/Dead Viability and Cytotoxicity Assay Kit (AlamarBlue™, Invitrogen) were used according to the manufacturer's instructions.

Gene Expression Analysis. To analyze the gene expression of SC β-cells, total RNA was isolated using the RNeasy Mini kit (Qiagen, Chatsworth, CA, USA) from each sample (n=3) according to the manufacturer's instructions. The RNA concentration was determined by measuring absorbance at 260 nm using a spectrophotometer. A reverse transcription reaction was performed with 500 ng pure total RNA using SuperScript III First-Strand Synthesis System (Invitrogen). qRT-PCR was performed using a 7900HT Real-Time PCR System (Applied Biosystems, Foster City, CA, USA). SYBR® Green Real-Time PCR Master Mixes (Applied Biosystems) was used for the reaction. The profiles of gene expression in SC β-cells were quantified for each target (human E-cad, CX-36, ZnT8, Pdx-1, Nkx6.1, Insulin, and glyceraldehyde 3-phosphate dehydrogenase (GAPDH), QuantiTect primary assay). The expression level of target genes was determined by the comparative Ct method, whereby the target is normalized to the endogenous reference (GAPDH) 40. The relative expression of each marker in SC β-cells cultured on the engineered surfaces was normalized to control.

Glucose-Stimulated Insulin Secretion. SC β-cell differentiation between 28 and 35 days was sampled in discs (115×10³ cells/mm²). Cell disc and SC β clusters were washed with PBS buffer followed by preincubation in low (2.8 mM) glucose KREBs buffer for 2 hours to remove residual insulin. Discs and SC β clusters were then washed with PBS buffer twice, incubated in low-glucose KREBs buffer for 30 min, and then the supernatant was collected. The clusters were further washed with PBS buffer twice, incubated in high glucose (20 mM) KREBs buffer for 30 min, and the supernatant was collected. These sequences were repeated for two additional times. Finally, clusters were incubated with 30 mM KCl (depolarization challenge)

in PBS buffer for 30 min and then the supernatant was collected. These clusters were next dispersed into single cells using TrypLE Express (Gibco) for cell counting. Supernatant samples containing insulin were processed using the Human Ultrasensitive Insulin ELISA kit (ALPCO Diagnostics) and normalized based on live cell numbers.

Znpds Synthesis. For Synthetic Procedures, See Below.

Statistics. All data was presented as mean±standard deviation (S.D.). For statistical evaluation, the statistical probability was calculated using ANOVA and statistic calculations were performed using GraphPad Prism 7 software (GraphPad Software, San Diego, CA, USA). The statistical significance of the data was determined at 95% ($p<0.05$), 99% ($p<0.01$), and 99.9% ($p<0.001$) confidence intervals.

REFERENCES

1 Matveyenko, A. V. & Butler, P. C. Relationship between β-cell mass and diabetes onset. Diabetes Obes. Metab. 10, 23-31 (2008).
2 Meier, J. J. et al. Pancreatic diabetes manifests when beta cell area declines by approximately 65% in humans. Diabetologia 55, 1346-1354 (2012).
3 Ryan, E. A. et al. Five-year follow-up after clinical islet transplantation. Diabetes 54, 2060-2069 (2005).
4 Lumelsky, N. et al. Differentiation of embryonic stem cells to insulin-secreting structures similar to pancreatic islets. Science 292, 1389-1394 (2001).
5 Soria, B. et al. Insulin-secreting cells derived from embryonic stem cells normalize glycemia in streptozotocin-induced diabetic mice. Diabetes 49, 157-162 (2000).
6 Zhang, D. et al. Highly efficient differentiation of human ES cells and iPS cells into mature pancreatic insulin-producing cells. Cell Research 19, 429-438, (2009).
7 Zulewski, H. et al. Multipotential nestin-positive stem cells isolated from adult pancreatic islets differentiate ex vivo into pancreatic endocrine, exocrine, and hepatic phenotypes. Diabetes 50, 521-533 (2001).
8 Jimenez, J., Riveron-Negrete, L., Abdullaev, F., Espinosa-Aguirre, J. & Rodriguez-Arnaiz, R. Cytotoxicity of the beta-carboline alkaloids harmine and harmaline in human cell assays in vitro. Exp Toxicol Pathol 60 (2008).
9 Laerke, E., Andreas, B. P., Ann, M. B. & Jorgen, R. Zinc, Alpha Cells and Glucagon Secretion. Curr. Diabetes Rev. 6, 52-57 (2010).
10 Solomou, A. et al. The Zinc Transporter Slc30a8/ZnT8 Is Required in a Subpopulation of Pancreatic α-Cells for Hypoglycemia-induced Glucagon Secretion. J. Biol. Chem. 290, 21432-21442 (2015).
11 Lemaire, K., Chimienti, F. & Schuit, F. Zinc transporters and their role in the pancreatic β-cell. Journal of Diabetes Investigation 3, 202-211 (2012).
12 Li, Y. V. Zinc and insulin in pancreatic beta-cells. Endocrine 45, 178-189 (2014).
13 Carpenter, M. C., Lo, M. N. & Palmer, A. E. Techniques for measuring cellular zinc. Arch Biochem Biophys 611, 20-29 (2016).
14 Ramachandran, K., Williams, S. J., Huang, H.-H., Novikova, L. & Stehno-Bittel, L. Engineering Islets for Improved Performance by Optimized Reaggregation in a Micromold. Tissue Engineering Part A 19, 604-612 (2012).
15 Chang, H.-C. et al. Multilayer architecture microfluidic network array for combinatorial drug testing on 3D-cultured cells. Biofabrication (2019).
16 Jin, Y. et al. Vascularized Liver Organoids Generated Using Induced Hepatic Tissue and Dynamic Liver-Specific Microenvironment as a Drug Testing Platform. Advanced Functional Materials 28, 1801954 (2018).
17 Amin, J. et al. A simple, reliable method for high-throughput screening for diabetes drugs using 3D β-cell spheroids. J. Pharmacol. Toxicol. Methods 82, 83-89 (2016).
18 Wang, P. et al. A high-throughput chemical screen reveals that harmine-mediated inhibition of DYRK1A increases human pancreatic beta cell replication. Nature Medicine 21, 383-388 (2015).
19 Stendahl, J. C., Kaufman, D. B. & Stupp, S. I. Extracellular matrix in pancreatic islets: relevance to scaffold design and transplantation. Cell Transplant. 18, 1-12 (2009).
20 Aamodt, K. I. & Powers, A. C. Signals in the pancreatic islet microenvironment influence beta-cell proliferation. Diabetes Obes Metab 19 Suppl 1, 124-136 (2017).
21 Kragl, M. & Lammert, E. in The Islets of Langerhans (ed Md Shahidul Islam) 217-234 (Springer Netherlands, 2010).
22 Lee, M. et al. Spheroform: Therapeutic Spheroid-Forming Nanotextured Surfaces Inspired by Desert Beetle Physosterna cribripes. Adv Healthc Mater 4, 511-515 (2015).
23 Pagliuca, Felicia W. et al. Generation of Functional Human Pancreatic B Cells In Vitro. Cell 159, 428-439 (2014).
24 Polonsky, K. et al. The Limitations to and Valid Use of C-Peptide as a Marker of the Secretion of Insulin. Diabetes 35, 379 (1986).
25 Carolan, P. J. & Melton, D. A. New findings in pancreatic and intestinal endocrine development to advance regenerative medicine. Current Opinion in Endocrinology, Diabetes and Obesity 20, 1-7 (2013).
26 Li, X.-Y., Zhai, W.-J. & Teng, C.-B. Notch Signaling in Pancreatic Development. International Journal of Molecular Sciences 17, 48 (2016).
27 Murtaugh, L. C., Stanger, B. Z., Kwan, K. M. & Melton, D. A. Notch signaling controls multiple steps of pancreatic differentiation. Proceedings of the National Academy of Sciences 100, 14920 (2003).
28 Song, H. & Zhang, Y. Regulation of pancreatic stellate cell activation by Notch3. BMC Cancer 18, 36 (2018).
29 Zhang, X. F. et al. Synthesis and mechanisms of action of novel harmine derivatives as potential antitumor agents. Sci Rep 6, 33204 (2016).
30 Yang, X. et al. JKA97, a novel benzylidene analog of harmine, exerts anti-cancer effects by inducing G1 arrest, apoptosis, and p53-independent up-regulation of p21. PLOS One 7, e34303 (2012).
31 Kumar, K. et al. Development of Kinase-Selective, Harmine-Based DYRKIA Inhibitors that Induce Pancreatic Human B-Cell Proliferation. Journal of Medicinal Chemistry 61, 7687-7699 (2018).
32 Shirakawa, J. & Kulkarni, R. N. Novel factors modulating human beta-cell proliferation. Diabetes Obes Metab 18 Suppl 1, 71-77 (2016).
33 Wang, Y. J. et al. Single-Cell Mass Cytometry Analysis of the Human Endocrine Pancreas. Cell Metab 24, 616-626 (2016).
34 Veres, A. et al. Charting cellular identity during human in vitro β-cell differentiation. Nature 569, 368-373 (2019).
35 Li, Y. V. Zinc and insulin in pancreatic beta-cells. Endocrine 45, 178-189 (2014).

36 Rüben, K. et al. Selectivity Profiling and Biological Activity of Novel β-Carbolines as Potent and Selective DYRKI Kinase Inhibitors. PLOS ONE 10, e0132453 (2015).

37 Maguire, O., Tornatore, K. M., O'Loughlin, K. L., Venuto, R. C. & Minderman, H. Nuclear translocation of nuclear factor of activated T cells (NFAT) as a quantitative pharmacodynamic parameter for tacrolimus. Cytometry A 83, 1096-1104 (2013).

38 Friedrich, J., Seidel, C., Ebner, R. & Kunz-Schughart, L. A. Spheroid-based drug screen: considerations and practical approach. Nature Protocols 4, 309 (2009).

39 Baraniak, P. R. & McDevitt, T. C. Scaffold-free culture of mesenchymal stem cell spheroids in suspension preserves multilineage potential. Cell and Tissue Research 347, 701-711 (2012).

40 Schmittgen, T. D. & Livak, K. J. Analyzing real-time PCR data by the comparative CT method. Nature Protocols 3, 1101-1108 (2008).

Additional Notes

Within the pancreas, β cells are dispersed in islets of Langerhans that consist of endocrine cells, vascularization's, neuronal cells and extensive cell-cell interactions generating a highly distinct pancreatic niche to support β cell function and viability. Specifically, adherent junctions [E-cadherin (E-cad)] initiate cell-cell contacts and maintain cell structure cohesiveness, while gap junctions [Connexin 36 (CX36)] regulate cell-cell signaling pathways that are important for insulin synthesis and release through the exchange of current-carrying ions between cells2-4. However, as illustrated in FIG. 2, currently existing 2D screening systems often insufficiently recapitulate the cell-cell interactions, junction expression, and zinc levels essential for the proper functioning and insulin secretion of β-cell islets, therefore making them inaccurate for screening and differentiating hits within a small molecule library.

Figure 13A:
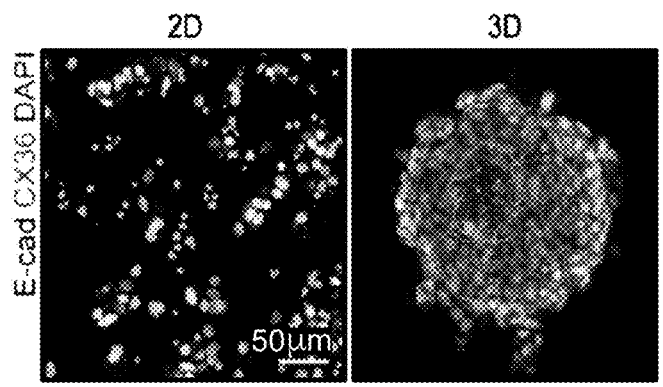
FIGS. 13A-13C A discrepancy exists between key cell junction markers and zinc levels in 2D and 3D culture systems.
Figure 13B:
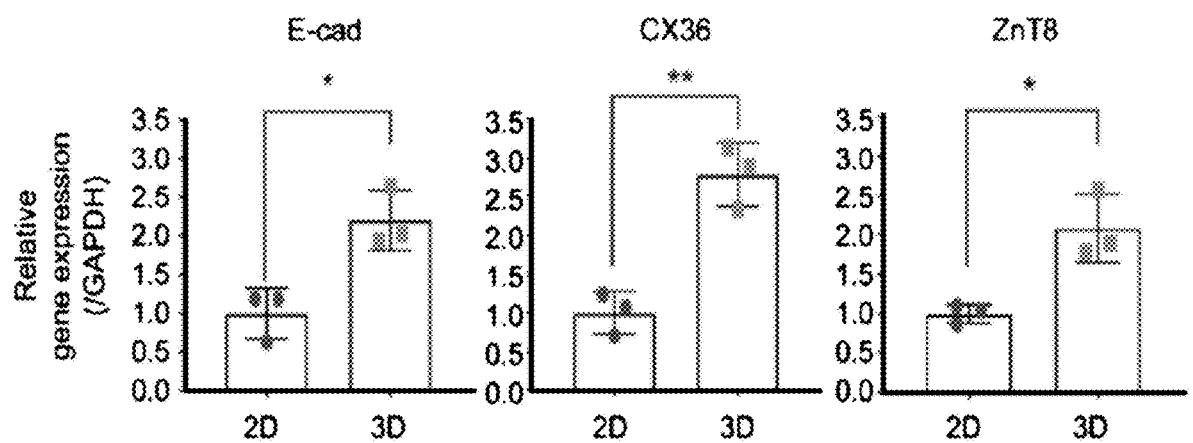
Figure 13C:
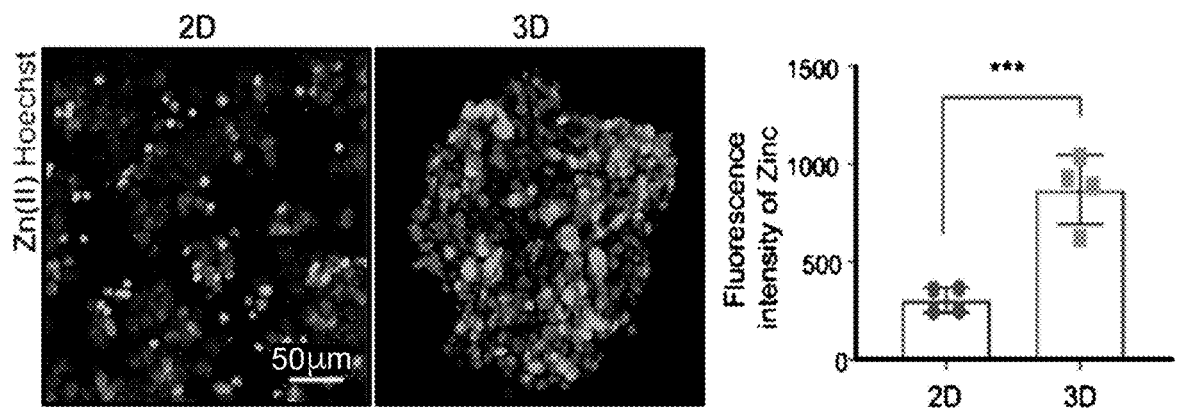
Figure 15:
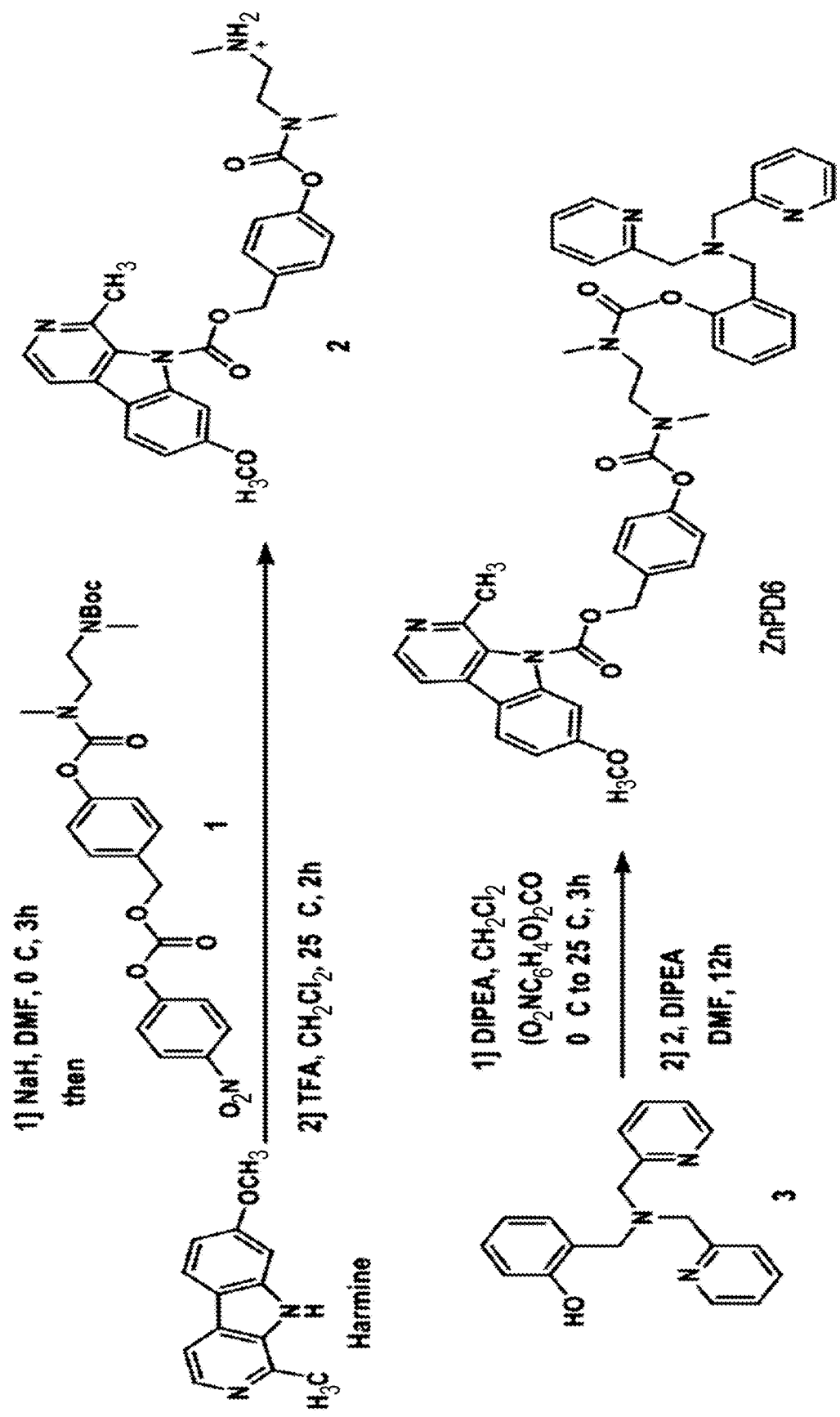
FIG. 15. Synthetic route for ZnPD6.
Figure 16:
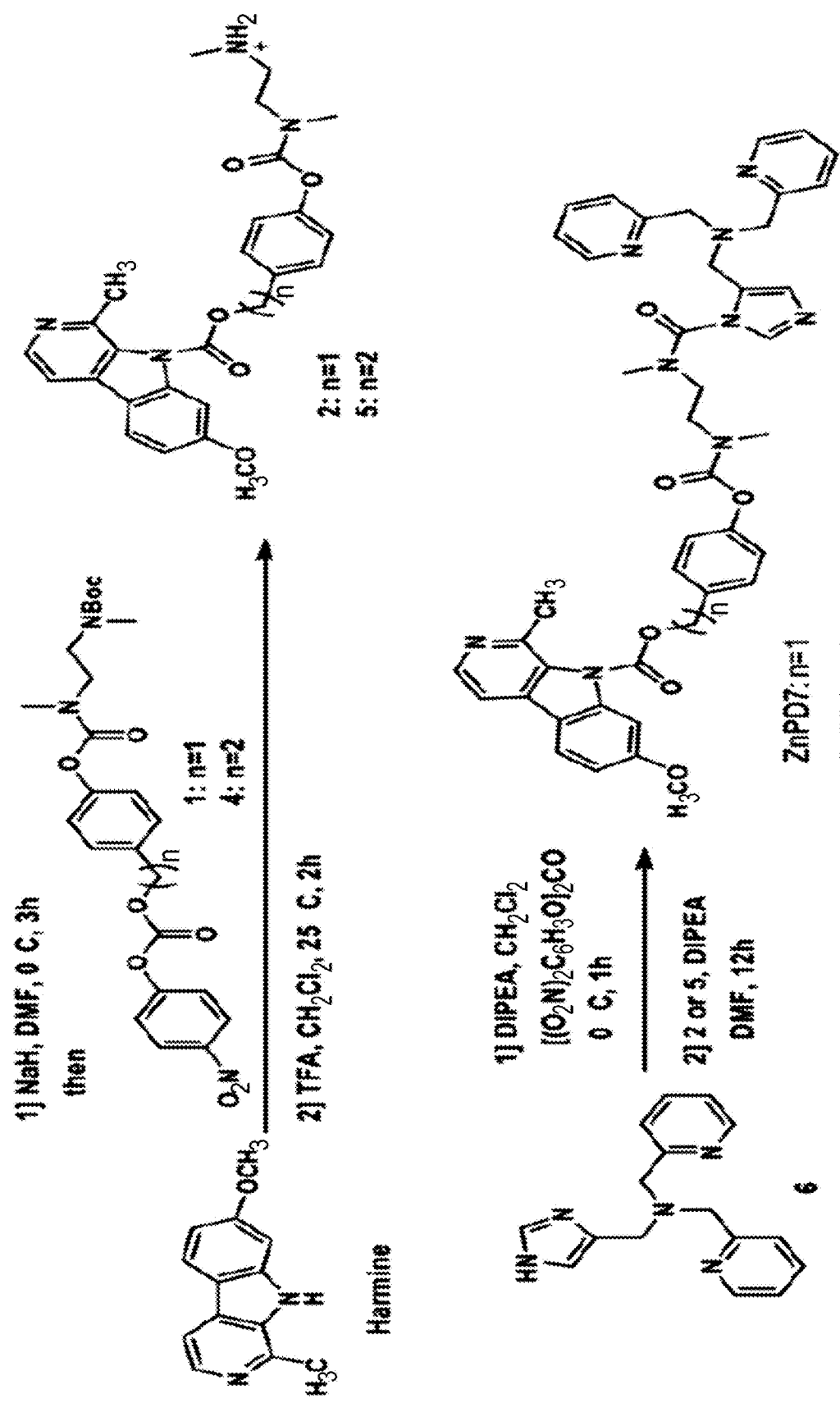
FIG. 16. Synthetic route for ZnPD7-8.
Figure 17:
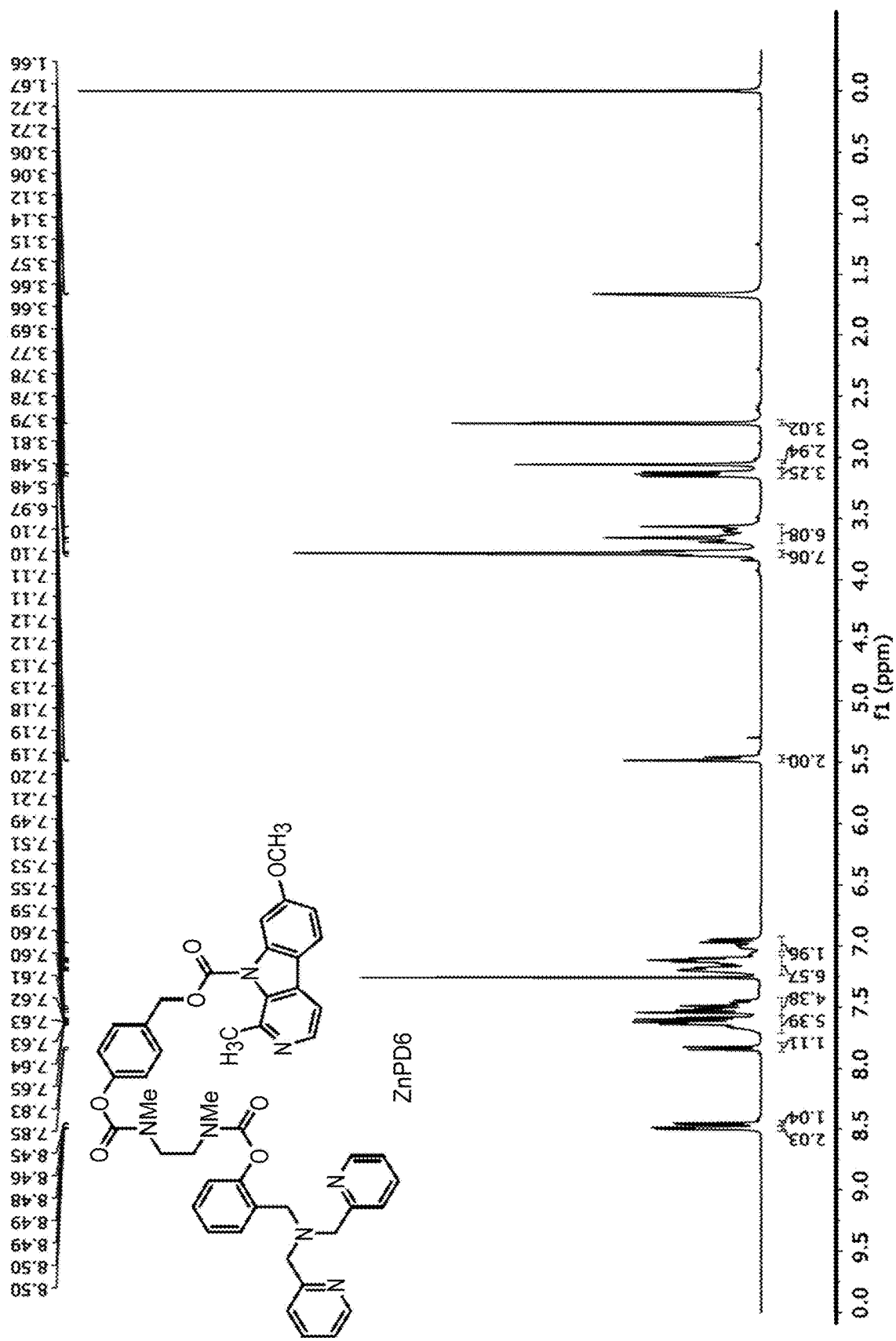
FIG. 17. $^1$H NMR spectrum of ZnPD6.
Figure 18:
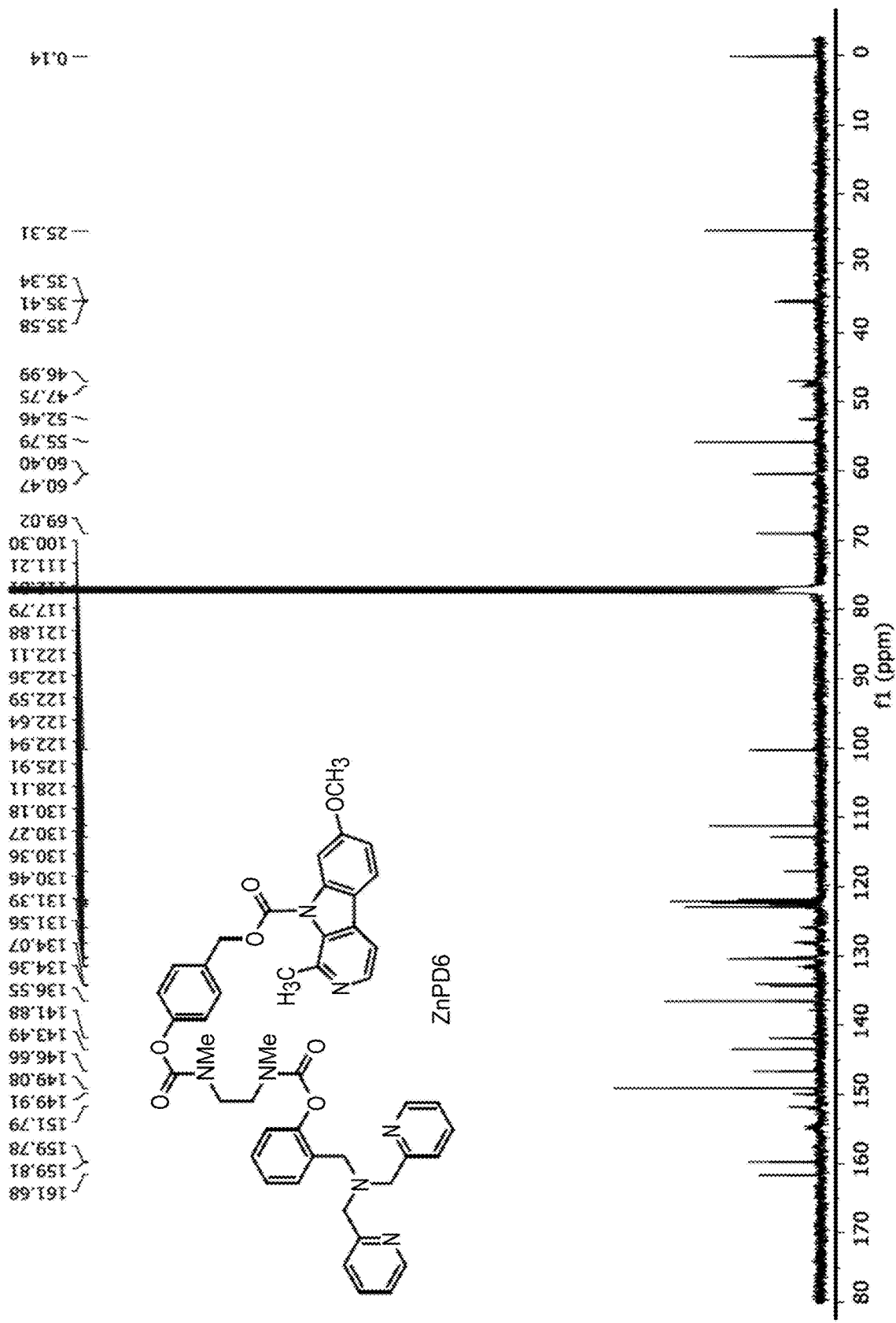
FIG. 18. $^{13}$C NMR spectrum of ZnPD6.
Figure 19:
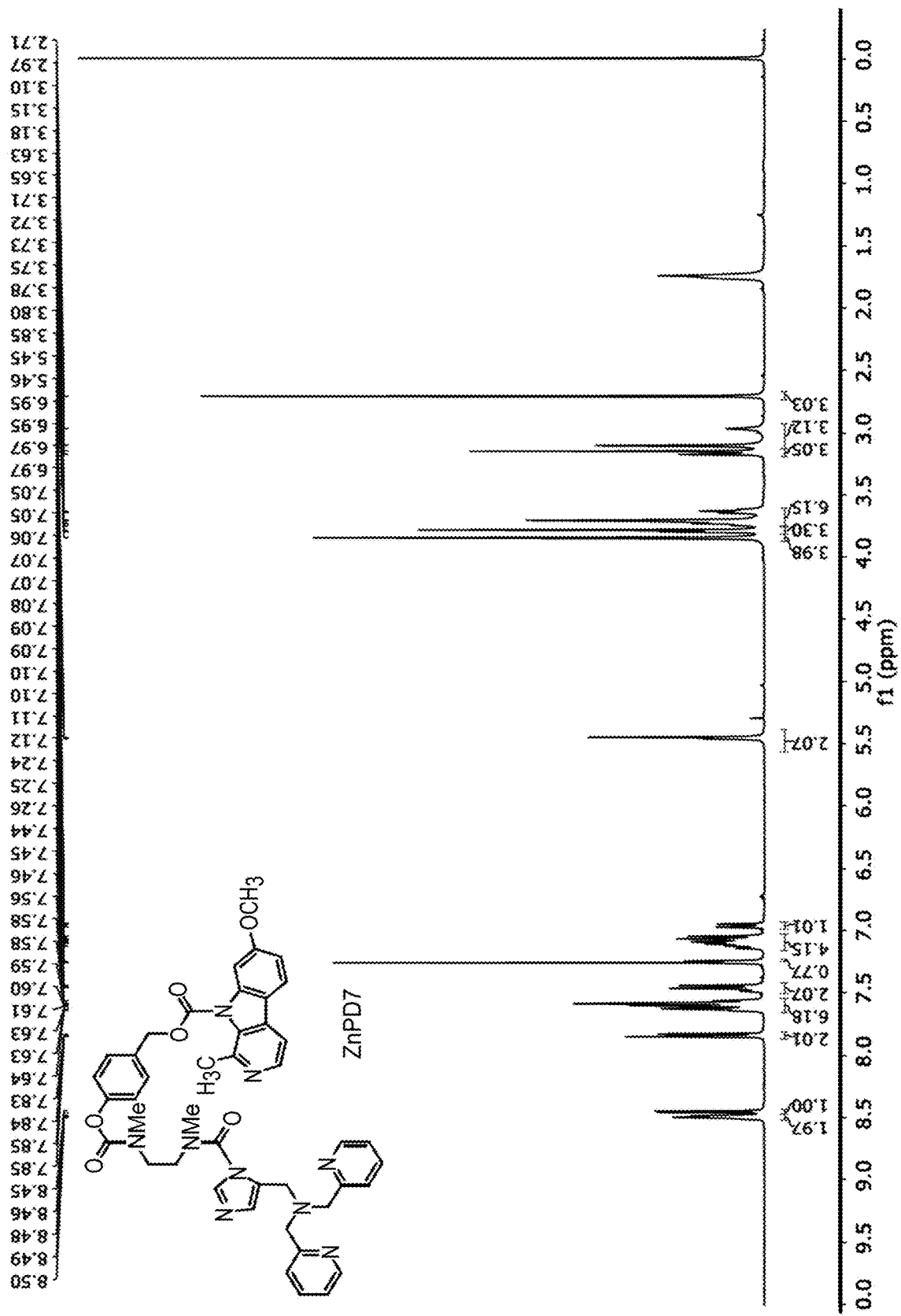
FIG. 19. $^1$H NMR spectrum of ZnPD7.
Figure 20:
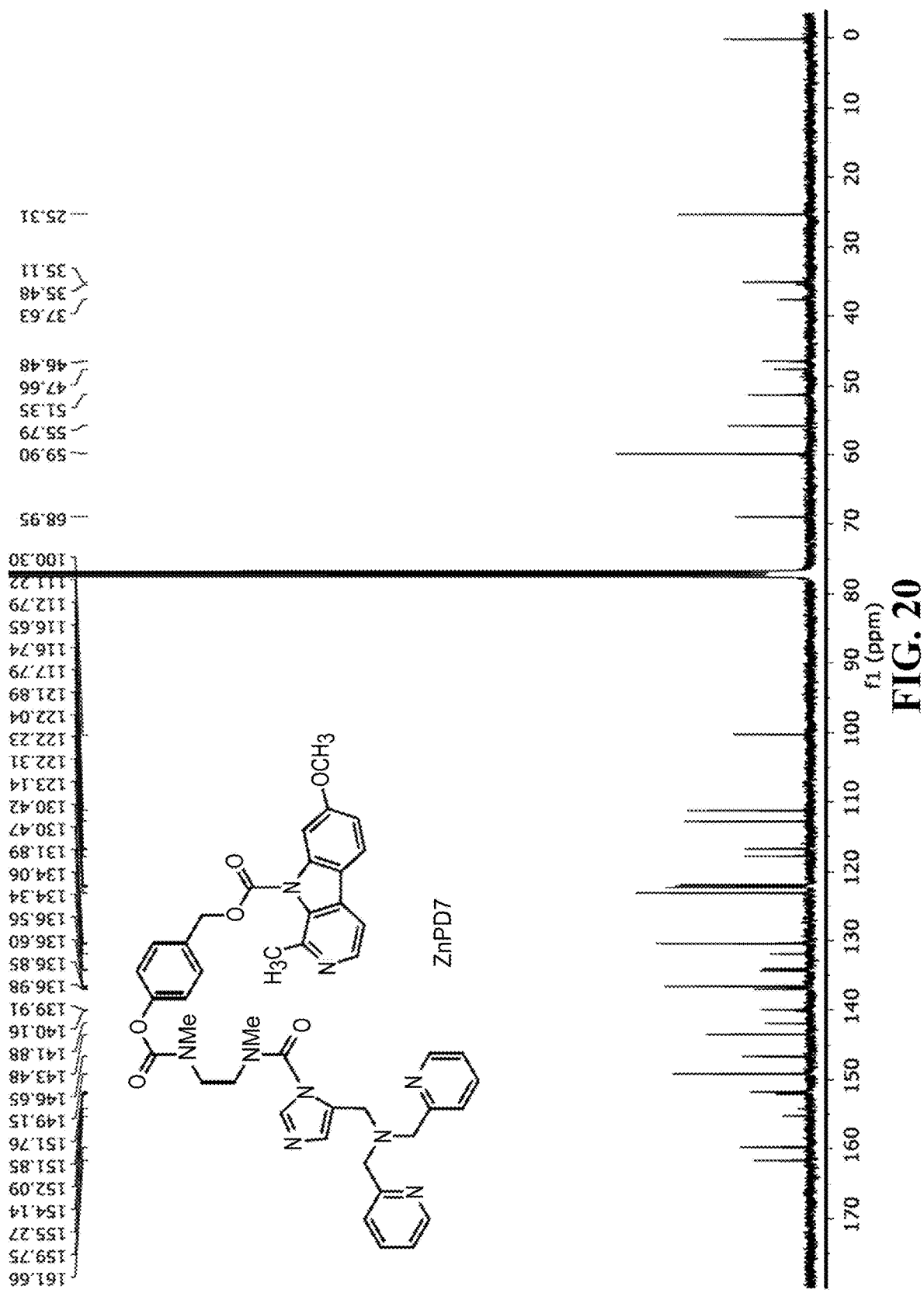
FIG. 20. $^{13}$C NMR spectrum of ZnPD7.
Figure 22:
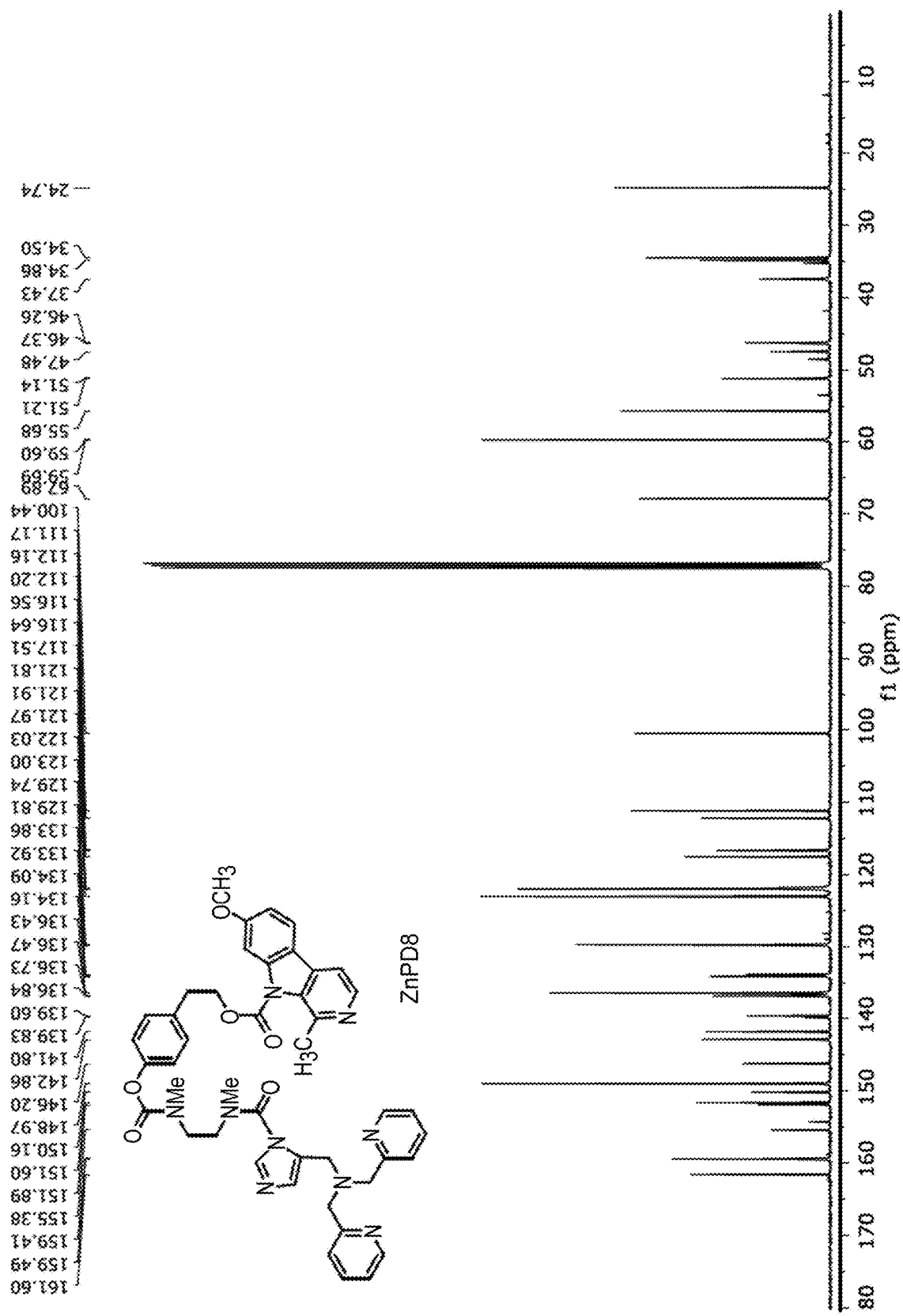
FIG. 22. $^{13}$C NMR spectrum of ZnPD8.

Due to the nature of the candidate zinc chelators, testing in β cells need physiological zinc levels for understanding and differentiating the effects of ZnPDs. Therefore, prior to synthesizing and screening ZnPDs, Applicant found that single cells in 2D would have disrupted cell-cell interactions leading to decreased cell function and zinc levels, making them an inappropriate screening platform for developing our technology. Applicant investigated whether 2D conventional culture systems could support the cellular and biophysical environment for accurate screening by comparing levels of key systems between 2D and the benchmark 3D culture system. As the 3D system, Applicant chose the most widely used for maintaining and differentiating large batches of SC β cells, the spinner flask (SF), which can provide a tunable, continuous fluid shear stress to support cell aggregates at similar sizes as islets. For the majority of experiments conducted in this study, Applicant used SC islets because they are reliable substitutes for human primary islets which are costly and often short in supply. Comparing 2D and 3D systems, immunofluorescent staining and Quantitative real-time polymerase chain reaction (qRT-PCR) analysis revealed significantly decreased gene expression of junction expression markers (E-Cad and CX-36) in SC β cells in the 2D group compared to the 3D group (FIGS. 13A, 13B). By establishing that cell-cell contacts were increased in 3D culture systems, Applicant then investigated whether Zn(II) ions and zinc transporters, which are vital for cell-cell signaling and zinc-insulin crystallization within secretory vesicles, were also increased in 3D systems. Correspondingly, the gene expression of zinc transporter 8 (ZnT8), which transports zinc ions for crystallization and storage of insulin, was also significantly increased in islets cultured in 3D (FIG. 13B). Intracellular zinc fluorescent intensity from cells in both 2D and 3D group were measured, and the conventional 2D culture system showed significantly lower the Zn(II) ions than the 3D system (2D: 304.8±64.5 and 3D: 867.3±176.5, 0.35 fold versus 3D) (FIG. 13C). These data suggest that 3D culture environments provided a more accurate β-cell phenotype to more reliably screen ZnPDs.

Optimization of Thickness and Diameter of the Cell Discs in DP

To determine optimal dimensions and seeding density of cell discs in the DP, Applicant linearly controlled the thickness of the cell discs to observe homogeneous distribution of cells within the Disques (FIG. 14A). Although the cells were centrifuged to achieve a rapid spatial re-arrangement in the Disques, Applicant found that their viability profile was not extensively compromised at low disc thicknesses. After SC-derived pancreatic progenitor cells (SC-PCs) were differentiated to the end of stage 4, the co-expression of Nkx6.1 and Pdx-114 was comparable between 50-μm DP cell discs and 3D islets from the current gold-standard suspension flask culture system (SF) (FIG. 9B). As the thickness increased (50-600 μm), both the viability and differentiation potentials of the SC β cells reduced exponentially (FIGS. 14B, 14C). As a known challenge to cultured embryoids and cell spheroids, Applicant hypothesized this might be due to the diffusion gradient from the periphery to the center of cell discs, especially for the high-molecular-weight growth factors that were supplemented during β-cell differentiation, such as activin A (26.2 kDa), KGF (18.9 kDa), and β-cellulin (10~15 kDa). Applicant tested this using a 10-kDa dextran probe, which showed a diffusive gradient through the outermost 50 μm of SC β clusters, which was consistent with the diffusion limit observed in literature (Supplementary Note 2D). Regardless, the diameter of cell discs (1,000~3,000 μm) had minimal influence on the expression of key β-cell markers (Nkx6.1 and Pdx-1) (FIG. 14E).

General Procedures and Materials

All reagents were purchased and used as received from commercial sources without further purification. Reactions were performed in round-bottom flasks stirred with Teflon-coated magnetic stir bars. Moisture and air-sensitive reactions were performed under a dry nitrogen/argon atmosphere. Moisture and air-sensitive liquids or solutions were transferred via nitrogen-flushed syringes. As necessary, organic solvents were degassed by bubbling nitrogen/argon through the liquid. The reaction progress was monitored by thin-layer chromatography (TLC) and ultra-performance liquid chromatography mass spectrometry (UPLC-MS). Flash column chromatography was performed using silica gel (60 Å mesh, 20-40 μm) on a Teledyne Isco CombiFlash Rf system. Analytical TLC was performed using Merck Silica gel 60 F254 pre-coated plates (0.25 mm); illumination at 254 nm allowed the visualization of UV-active material, and a phosphomolybdic acid (PMA) stain was used to visualize UV-inactive material. UPLC-MS was performed on a Waters ACQUITY UPLC I-Class PLUS System with an ACQUITY SQ Detector 2. Nuclear magnetic resonance (NMR) spectra were recorded on a Bruker 400 Spectrometer ($^1$H NMR, 400 MHz; $^{13}$C, 100 MHz) at the Broad Institute of MIT and Harvard. $^1$H and $^{13}$C chemical shifts are indicated in parts per million (ppm) relative to SiMe4 (δ=0.00 ppm) and internally referenced to residual solvent signals. NMR solvents were purchased from Cambridge Isotope Laboratories, Inc., and NMR data were obtained in CDCl$_3$. Data for 1H NMR are reported as follows: chemical shift value in ppm, multiplicity (s=singlet, d=doublet, t=triplet, dd=doublet of doublets, and m=multiplet), integration value, and coupling constant value in Hz.

Synthesis of linkers and Zinc-chelating ligand. The linker was prepared as described by Gillies et al., and the spectroscopy data was matched as reported[19]. The zinc-chelating ligand (compounds 3 and 6) were prepared as described by Nam et al., and Karlin et al. The spectroscopy data were matched with a report[20,21].

The NaH (52.8 mg, 1.32 mmol) was added to the solution of Harmine (140 mg, 0.66 mmol) in anhydrous dimethylformamide (4.12 mL, 0.1M) at 0° C. and the reaction was stirred at the same temperature for 2 hours. The linker (431.8 mg, 0.86 mmol) was dissolved in anhydrous dimethylformamide (3.0 mL) and added to the reaction mixture. The reaction was slowly warmed to room temperature and stirred for 12 hours. The reaction was quenched with an aqueous solution of saturated $NaHCO_3$ and extracted with dichloromethane. The organic layers were combined, washed with brine, dried over anhydrous $Na_2SO_4$, filtered, and concentrated in vacuo to give a crude residue, which was purified by flash column chromatography on silica gel, eluting with methanol in dichloromethane. The pale yellow foam product (compound 2) was obtained (248.5 mg, 64%) and carried forward to the next step. The carbamate (248.5 mg, 0.43 mmol) was dissolved in anhydrous dichloromethane (4.34 mL, 0.1 M) then trifluoroacetic acid (370 mg, 3.25 mmol) was added to the reaction mixture. The solution was stirred for 2 hours. The solvent was removed in vacuo, and dichloromethane was successively added and evaporated to remove residual trifluoroacetic acid and to provide the deprotected product. This product was carried over to the next step without further purification, wherein 4-nitrophenyl carbonate (157.4 mg, 0.52 mmol) and N,N-diisopropylethylamine (83.6 mg, 0.65 mmol) were added to the solution of zinc chelating ligand 3 (131.6 mg, 0.43 mmol) in dichloromethane (4.31 ml, 0.1M) at 0° C. The reaction mixture was slowly warmed up to room temperature over 3 hours. N,N-diisopropylethylamine (334.2 mg, 2.59 mmol) and trifluoroacetic acid salt of compound 2 (0.43 mmol) in dimethylformamide (3 ml) were added to the reaction mixture and stirred for 12 hours at room temperature. The solvent was removed in vacuo, and the residue was purified by flash column chromatography eluting with 0 to 10% methanol in dichloromethane (1% $NH_4OH$) to give the pure fraction of ZnPD6 as a yellow foam (91.3 mg, 26% yield). 1H NMR (400 MHZ, CDCl3) δ 8.52-8.48 (m, 2H), 8.46 (d, J=5.1 Hz, 1H), 7.84 (d, J=8.6 Hz, 1H), 7.71-7.57 (m, 5H), 7.57-7.43 (m, 4H), 7.24-7.09 (m, 6H), 6.99 (ddd, J=19.6, 8.0, 2.2 Hz, 2H), 5.48 (S, 2H), 3.85-3.73 (m, 7H), 3.73-3.53 (m, 6H), 3.17-3.02 (m, 6H), 2.72 (S, 3H). 13C NMR (100 MHz, $CDCl_3$) δ 161.7, 159.8 (2C), 151.8, 149.9, 149.1 (2C), 146.7, 143.5, 141.9, 136.6, 134.4, 134.1, 131.6, 131.4, 130.5, 130.4 (2C), 130.3, 130.2, 128.1, 125.9, 122.9 (2C), 122.6 (2C), 122.4, 122.1 (2C), 121.9, 117.8, 112.8, 111.2, 100.3, 69.0, 60.5, 60.4, 55.8 (2C), 52.5, 47.8, 47.0, 35.6, 35.4, 35.3, 25.3.

ZnPD7: The compound 2 was carried over to the next step without further purification, wherein 4-nitrophenyl carbonate (157.4 mg, 0.52 mmol) and N,N-diisopropylethylamine (83.6 mg, 0.65 mmol) were added to the solution of zinc chelating ligand 3 (131.6 mg, 0.43 mmol) in dichloromethane (4.31 ml) at 0° C. The reaction mixture was slowly warmed up to room temperature over 3 hours. N,N-diisopropylethylamine (334.2 mg, 2.59 mmol) and trifluoroacetic acid salt of compound 2 (0.43 mmol) in dimethylformamide were added to the reaction mixture and stirred for 12 hours at room temperature. The solvent was removed in vacuo, and the residue was purified by flash column chromatography eluting with 0 to 10% methanol in dichloromethane (1% $NH_4OH$) to give the pure fraction of ZnPD7 as a pale yellow foam (91.1 mg, 27.1% yield). 1H NMR (400 MHZ, CDCl3) δ 8.50 (t, J=5.1 Hz, 2H), 8.45 (d, J=5.1 Hz, 1H), 7.87-7.80 (m, 2H), 7.66-7.54 (m, 6H), 7.46 (t, J=9.0 Hz, 2H), 7.25-7.23 (m, 1H), 7.16-7.03 (m, 4H), 6.96 (dd, J=8.6, 2.3 Hz, 1H), 5.46 (d, J=5.0 Hz, 2H), 3.85 (s, 4H), 3.79 (d, J=5.9 Hz, 3H), 3.75-3.61 (m, 6H), 3.16 (m, 3H), 3.04 (m, 3H), 2.71 (s, 3H). 13C NMR (100 MHz, CDCl3) δ161.7, 159.8, 155.3, 154.1, 152.1, 151.9, 151.8, 149.2 (2C), 146.7, 143.5, 141.9, 140.2, 139.9, 137.0, 136.9, 136.6, 134.3, 134.1, 131.9, 130.5, 130.4 (2C), 123.1, 122.3, 122.0, 121.9, 117.8, 116.7, 112.8, 111.2, 100.3, 69.0, 59.9 (2C), 55.8, 51.4, 47.7, 46.5, 37.6, 35.5, 35.1, 25.3.

ZnPD8: The compound 5 was synthesized in the same way as described in ZnPD5 synthesis. The synthesis of ZnPD8 was carried the same as ZnPD7 synthesis. ZnPD7 as a pale yellow foam (118 mg, 29.2% yield). 1H NMR (400 MHZ, CDCl3) δ 8.46 (d, J=4.8 Hz, 2H), 8.42 (d, J=5.1 Hz, 1H), 7.83-7.77 (m, 2H), 7.62-7.52 (m, 6H), 7.25-7.13 (m, 3H), 7.10-7.02 (m, 2H), 7.01-6.87 (m, 3H), 4.62 (t, J=7.3 Hz, 2H), 3.82 (d, J=8.5 Hz, 7H), 3.73-3.54 (m, 7H), 3.16-3.00 (m, 7H), 2.69 (s, 3H). 13C NMR (100 MHz, CDCl3) δ 161.6, 159.5, 155.4, 154.2, 151.9, 151.6, 150.2, 149.0 (2C), 146.2, 142.9, 141.8, 139.8, 139.6, 136.8, 136.5 (2C), 136.4, 134.2, 134.1, 133.9, 129.8 (2C), 123.0 ((2C), 122.0 (2C), 121.9, 121.8, 117.5, 116.6, 112.2, 111.2, 100.4, 67.9, 59.7 (2C), 55.7, 51.2, 47.5, 46.3, 37.4, 34.9, 34.5, 24.7.

REFERENCES

Stendahl, J. C., Kaufman, D. B. & Stupp, S. I. Extracellular matrix in pancreatic islets: relevance to scaffold design and transplantation. Cell Transplant. 18, 1-12 (2009).

Benninger, R. K. P., Head, W. S., Zhang, M., Satin, L. S. & Piston, D. W. Gap junctions and other mechanisms of cell-cell communication regulate basal insulin secretion in the pancreatic islet. J Physiol 589, 5453-5466 (2011).

Calabrese, A., Caton, D. & Meda, P. Differentiating the effects of Cx36 and E-cadherin for proper insulin secretion of MIN6 cells. Experimental Cell Research 294, 379-391 (2004).

Ravier, M. A. et al. Loss of Connexin36 Channels Alters β-Cell Coupling, Islet Synchronization of Glucose-Induced Ca2+ and Insulin Oscillations, and Basal Insulin Release. Diabetes 54, 1798-1807 (2005).

Lemaire, K., Chimienti, F. & Schuit, F. Zinc transporters and their role in the pancreatic β-cell. J Diabetes Investig 3, 202-211 (2012).

Kim, J. et al. 3D cell printing of islet-laden pancreatic tissue-derived extracellular matrix bioink constructs for enhancing pancreatic functions. Journal of Materials Chemistry B 7, 1773-1781 (2019).

Chowdhury, A., Dyachok, O., Tengholm, A., Sandler, S. & Bergsten, P. Functional differences between aggregated and dispersed insulin-producing cells. Diabetologia 56, 1557-1568 (2013).

Li, Z. et al. Development of in vitro 3D TissueFlex® islet model for diabetic drug efficacy testing. PLOS One 8, e72612 (2013).

Pagliuca, Felicia W. et al. Generation of Functional Human Pancreatic β Cells In Vitro. Cell 159, 428-439 (2014).

Chimienti, F. et al. In vivo expression and functional characterization of the zinc transporter ZnT8 in glucose-induced insulin secretion. J Cell Sci 119, 4199-4206 (2006).

Ramachandran, K., Williams, S. J., Huang, H.-H., Novikova, L. & Stehno-Bittel, L. Engineering Islets for Improved Performance by Optimized Reaggregation in a Micromold. Tissue Engineering Part A 19, 604-612 (2012).

Chang, H.-C. et al. Multilayer architecture microfluidic network array for combinatorial drug testing on 3D-cultured cells. Biofabrication. (2019).

Jin, Y. et al. Vascularized Liver Organoids Generated Using Induced Hepatic Tissue and Dynamic Liver-Specific Microenvironment as a Drug Testing Platform. Advanced Functional Materials 28, 1801954 (2018).

Kelly, O. G. et al. Cell-surface markers for the isolation of pancreatic cell types derived from human embryonic stem cells. Nature Biotechnology 29, 750 (2011).

Gurdon, J. B., Mitchell, A. & Mahony, D. Direct and continuous assessment by cells of their position in a morphogen gradient. Nature 376, 520-521 (1995).

Gurdon, J. B., Harger, P., Mitchell, A. & Lemaire, P. Activin signalling and response to a morphogen gradient. Nature 371, 487-492 (1994).

Fraker, C. A. et al. Enhanced oxygenation promotes beta-cell differentiation in vitro. Stem Cells 25, 3155-3164, 2007-0445 (2007).

Lindström, A. & Carlsson, J. Penetration and Binding of Epidermal Growth Factor-Dextran Conjugates in Spheroids of Human Glioma Origin. Cancer Biotherapy 8, 145-158 (1993).

DeWit, M. A. & Gillies, E. R. A Cascade Biodegradable Polymer Based on Alternating Cyclization and Elimination Reactions. J. Am. Chem. Soc. 131, 18327-18334 (2009).

Song, D. et al. A fluorescence turn-on $H_2O_2$ probe exhibits lysosome-localized fluorescence signals. Chem. Commun. 48, 5449-5451 (2012).

Lee, Y. et al. Copper (I)/O2 chemistry with imidazole containing tripodal tetradentate ligands leading to mu-1, 2-peroxo-dicopper (II) species. Inorg. Chem. 48, 11297-11309 (2009).

Various modifications and variations of the described methods, pharmaceutical compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

What is claimed is:

1. A device for high-throughput analysis and screening of perturbations in three-dimensional cell-culture environment, comprising a plurality of individual discrete volumes, each individual discrete volume comprising:
    a cell culture device configured to fit within a well of a multi-well plate, the cell culture device comprising:
        a membrane suspended at a fixed height above a bottom of the well,
        a mold directly attached to a top surface of the membrane, the mold comprising a compartment disposed within a boundary of the mold such that an opening is formed between the boundary of the mold and the compartment, wherein a perimeter of the boundary of the mold comprises a substantially circular arc closed by a straight portion forming a straight edge, and
        a pedestal affixed to an opposite surface of the membrane relative to the mold; and
    a three-dimensional (3D) cell culture positioned within the compartment defined by the mold such that the three-dimensional (3D) cell culture is supported by the membrane, and wherein sides of the three-dimensional (3D) cell culture are constrained in shape and size by the mold,
    wherein the cell culture device is placed within a well of the multi-well plate, and wherein the 3D cell culture is configured to culture within the compartment of the mold on the top surface of the membrane.

2. The device of claim 1, wherein the 3D cell culture has a diameter of up to 15 mm, up to 7 mm, up to 3 mm, or up to 1 mm, optionally wherein the 3D cell culture has a disc shape.

3. The device of claim 1, wherein the 3D cell culture comprises up to $0.8 \times 10^6$ or up to 90,000 cells, or wherein the 3D cell culture has a cell density of up to $115 \times 10^3$ cells/mm$^2$ or $38 \times 10^3$ cells/mm$^2$.

4. The device of claim 1, wherein the 3D cell culture has a thickness of from 5 µm to 600 µm, or from 20 µm to 200 µm.

5. The device of claim 1, wherein the 3D cell culture comprises less than 10% apoptotic or hypoxic cells.

6. The device of claim 1, wherein the device further comprises a multi-well plate, optionally wherein the multi-well plate is a 48-well plate, 96-well plate, or 384-well plate.

7. The device of claim 1, wherein the membrane comprises a polymer membrane.

8. The device of claim 7, wherein the membrane is optionally a semi-permeable hydrophilic PTFE membrane;
    optionally wherein the membrane has a pore of less than 3 µm;
    optionally wherein the membrane is coated with one or more components of extracellular matrices; and
    optionally wherein the membrane is coated with laminin and/or collagen IV.

9. The device of claim 1, wherein the 3D cell culture comprises one or more of: trichocytes, keratinocytes, gonadotropes, corticotropes, thyrotropes, somatotropes, lactotrophs, chromaffin cells, parafollicular cells, *glomus* cells melanocytes, nevus cells, merkel cells, odontoblasts, cementoblasts corneal keratocytes, retina muller cells, retinal pigment epithelium cells, neurons, glias, ependymocytes, pinealocytes, pneumocytes, clara cells, goblet cells, G cells, D cells, Enterochromaffin-like cells, gastric chief cells, parietal cells, foveolar cells, K cells, D cells, I cells, goblet cells, paneth cells, enterocytes, microfold cells, hepatocytes, hepatic stellate cells, cholecystocytes, centroacinar cells, pancreatic stellate cells, pancreatic α cells, pancreatic β cells, pancreatic δ cells, pancreatic F cells, pancreatic ε cells, thyroid, parathyroid, oxyphil cells, urothelial cells, osteoblasts, osteocytes, chondroblasts, chondrocytes, fibroblasts, fibrocytes, myoblasts, myocytes, myosatellite cells, tendon cells, cardiac muscle cells, lipoblasts, adipocytes, interstitial cells of cajal, angioblasts, endothelial cells, mesangial cells, juxtaglomerular cells, macula *densa* cells, stromal cells, interstitial cells, telocytes simple epithelial cells, podocytes, kidney proximal tubule brush border cells, sertoli cells, leydig cells, granulosa cells, peg cells, germ cells, spermatozoon ovums, lymphocytes, myeloid cells, endothelial progenitor cells, endothelial stem cells, angioblasts, mesoangioblasts, pericyte mural cells, and any combination thereof.

10. The device of claim 1, wherein at least 10% or at least 20% of cells in the 3D cell culture express C-peptide.

11. The device of claim 1, wherein at least 80% of cells in the 3D cell culture express Pdx-1, Pdx-1 and Nkx6, or Pdx-1, Nkx6, and Chromogranin-A.

12. The device of claim 1, wherein at least 7% of cells in the 3D cell culture express Pdx-1, Nkx6.1, Chromogranin-A, and C-peptide.

13. The device of claim 1, wherein the 3D cell culture comprises cells that have a glucose-stimulated insulin secretion index of at least 2.

14. The device of claim 1, wherein the 3D cell culture comprises cells that express E-cad, CX36, and Zinc transporter 8.

15. The device of claim 1, wherein a Zn(II) ion level in the 3D cell culture is higher than a Zn(II) ion level in a single layer culture of counterpart cells.

16. The device of claim 1, wherein the 3D cell culture comprises one or more insulin vesicles.

17. The device of claim 1, wherein the 3D cell culture comprises cells in an aggregate on a surface, wherein the aggregate has a diameter up to 15 mm, up to 7 mm, up to 3 mm, or up to 1 mm, optionally having a cell density of up to about $115 \times 10^3$ cells/mm$^2$ or $38 \times 10^3$ cells/mm$^2$.

18. The device of claim 17, wherein the 3D cell culture comprises up to $0.8 \times 10^6$ or up to 90,000 cells, optionally wherein a thickness is from about 20 μm to about 200 μm.

19. The device of claim 17, wherein there are at least 10 million cells in aggregate on the surface and wherein the 3D cell culture has a thickness of from about 5 μm to about 600 μm.

20. The device of claim 17, wherein at least 7%, at least 10% or at least 20% of the cells express C-peptide.

21. The device of claim 17, wherein at least 80% of the cells express Pdx-1, at least 60% of the cells express Pdx-1 and Nkx6, or at least 60% of the cells express Pdx-1, Nkx6, and Chromogranin-A.

22. The device of claim 17, wherein at least 7% of the cells express Pdx-1, Nkx6.1, Chromogranin-A, and C-peptide.

23. The device of claim 17, wherein the cells have a glucose-stimulated insulin secretion index of at least 2.

24. The device of claim 17, wherein the cells express E-cad, CX36, and Zinc transporter 8.

25. The device of claim 17, wherein a Zn(II) ion level in the cell culture is higher than a Zn(II) ion level in a single layer culture of counterpart cells.

26. The device of claim 17, wherein the 3D cell culture comprises one or more insulin vesicles.

27. The device of claim 17, wherein the 3D cell culture has a less than 10% apoptotic or hypoxic cells.

28. The device of claim 17, wherein there are at least 100 million cells in aggregate on the surface.

29. The device of claim 17, wherein the 3D cell culture has a thickness of from about 20 μm to about 200 μm.

30. The device of claim 1, wherein the mold has a diameter of up to 15 mm, up to 7 mm, up to 3 mm, or up to 1 mm.

31. The device of claim 1, wherein the mold has a diameter of at least 25 mm.

32. The device of claim 1, wherein the straight edge is configured to allow space to add and/or remove media from a well of the multi-well plate.

33. The device of claim 1, wherein the pedestal is configured to:
 elevate the cell culture device within a well of a multi-well plate; and
 maintain media circulation within the well of the multi-well plate.

* * * * *